US008682622B1

(12) United States Patent  (10) Patent No.: US 8,682,622 B1
Brenner et al.  (45) Date of Patent: *Mar. 25, 2014

(54) SMOOTHNESS INDICATOR ANALYSIS SYSTEM

(75) Inventors: Mark W. Brenner, Ida Grove, IA (US); Raymond J. Bumann, III, Ida Grove, IA (US); Gary L. Godbersen, Ida Grove, IA (US); James W. Honea, Pleasanton, CA (US)

(73) Assignee: GOMACO Corporation, Ida Grove, IA (US)

( * ) Notice: Subject to any disclaimer, the term of this patent is extended or adjusted under 35 U.S.C. 154(b) by 110 days.

This patent is subject to a terminal disclaimer.

(21) Appl. No.: 12/942,382

(22) Filed: Nov. 9, 2010

Related U.S. Application Data

(63) Continuation-in-part of application No. 10/876,258, filed on Jun. 23, 2004, now abandoned, which is a continuation-in-part of application No. 10/098,981, filed on Mar. 15, 2002, now Pat. No. 7,044,680, which is a continuation-in-part of application No. 11/360,464, filed on Feb. 23, 2006.

(60) Provisional application No. 60/655,278, filed on Feb. 23, 2005.

(51) Int. Cl.
 *G06F 17/10* (2006.01)

(52) U.S. Cl.
 USPC .......................................................... 703/2

(58) Field of Classification Search
 USPC .......................................................... 703/2
 See application file for complete search history.

(56) References Cited

U.S. PATENT DOCUMENTS

| 3,341,706 A | | 9/1967 | Swift et al. |
|---|---|---|---|
| 3,383,913 A | | 5/1968 | Swift |
| 4,685,806 A | | 8/1987 | Arnberg |
| 4,695,806 A | | 9/1987 | Barrett |
| 4,700,223 A | | 10/1987 | Shoutaro et al. |
| 4,741,207 A | * | 5/1988 | Spangler .......................... 73/146 |
| 4,899,296 A | | 2/1990 | Khattak |
| 5,065,618 A | * | 11/1991 | Hodges et al. ................... 73/146 |

(Continued)

FOREIGN PATENT DOCUMENTS

WO  WO0144754  6/2001

OTHER PUBLICATIONS

Paveset; product information; submitted with assignee's prior pending application on Mar. 15, 2002; pp. 1-17; prior to Mar. 15, 2002.*

(Continued)

*Primary Examiner* — Hugh Jones
(74) *Attorney, Agent, or Firm* — Suiter Swantz pc llo

(57) ABSTRACT

A method for analyzing roadway information includes receiving a first set of elevation data points defining at least a portion of an existing surface, receiving a second set of elevation data points defining at least a portion of an intended surface, comparing the first set of elevation data points to the second set of elevation data points to determine whether a relative elevation difference exists between corresponding data points of the first set of elevation data points and the second set of elevation data points, and generating an automated report displaying a comparison of the first set of elevation data points to the second set of elevation data points. The report provides information useful for planning pavement projects and/or maintaining the paved road surface.

21 Claims, 39 Drawing Sheets

(56) References Cited

U.S. PATENT DOCUMENTS

| | | | |
|---|---|---|---|
| 5,075,772 | A | 12/1991 | Gebel |
| 5,203,923 | A | 4/1993 | Hartman |
| 5,294,210 | A | 3/1994 | Lemelson |
| 5,294,798 | A | 3/1994 | Hartman |
| 5,323,647 | A | 6/1994 | Blanco |
| 5,333,969 | A | 8/1994 | Blaha et al. |
| 5,362,177 | A * | 11/1994 | Bowhall et al. .............. 404/84.1 |
| 5,393,167 | A | 2/1995 | Fujita et al. |
| 5,546,123 | A | 8/1996 | Ikeda et al. |
| 5,549,412 | A * | 8/1996 | Malone ........................ 404/84.1 |
| 5,752,783 | A | 5/1998 | Malone |
| 6,334,735 | B1 | 1/2002 | Williams et al. |
| 6,749,364 | B1 | 6/2004 | Baker et al. |
| 6,821,052 | B2 | 11/2004 | Zurn |
| 7,044,680 | B2 * | 5/2006 | Godbersen et al. ............. 404/75 |
| 7,689,351 | B2 | 3/2010 | McCain |
| 7,850,395 | B1 * | 12/2010 | Brenner et al. ................ 404/75 |
| 2009/0310143 | A1 | 12/2009 | Gardiner |

OTHER PUBLICATIONS

Paveset 1999; product information; pdfs obtained from website paveset.com via waybackmachine; pp. 1-6; 1999.*

Paveset 2000; product information; pdfs obtained from website paveset.com via waybackmachine; pp. 1-3; 2000.*

Paveset 2001; product information; pdfs obtained from website paveset.com via waybackmachine; pp. 1-4; 2001.*

DeStanzio: Mill to Grade: A New Way to Pave; Article from the Asphalt Contractor, obtained from http://www.warrenpaving.com/newspaper-destanzio.html; Apr. 22, 2000, pp. 1-4.*

Test Procedure for Operating Pavement Profilograph and Evaluating Profiles, from Operating Pavement Profilograph and Evaluating Profiles Txdot Designation: Tex-1000-S; Texas Department of Transportation; pp. 1-9; 1999.*

Peyret et al.; The Computer Integrated Road Construction project; Automation in Construction 9_2000. 447-461.*

* cited by examiner

SMOOTHNESS INDICATOR ANALYSIS SYSTEM

CROSS-REFERENCE TO RELATED APPLICATIONS

The present application is a continuation-in-part of U.S. patent application Ser. No. 10/876,258, filed Jun. 23, 2004, entitled "SMOOTHNESS INDICATOR," now abandoned, which in turn is a continuation-in-part of U.S. patent application Ser. No. 10/098,981, filed Mar. 15, 2002, Publication Number US2003/0175077A1, entitled "METHOD AND APPARATUS FOR CALCULATING AND USING THE PROFILE OF A SURFACE," published Sep. 18, 2003, now U.S. Pat. No. 7,044,680, issued on May 16, 2006. The present application herein incorporates all of the above-identified U.S. Patent Applications by reference in their entirety.

Further, the present application claims the benefit under 35 U.S.C. §120 of U.S. patent application Ser. No. 11/360,464, filed Feb. 23, 2006, entitled "SMOOTHNESS INDICATOR ANALYSIS SYSTEM," which is herein incorporated by reference in its entirety.

Further, the present application claims the benefit under 35 U.S.C. §119(e) of U.S. Provisional Application Ser. No. 60/655,278, filed Feb. 23, 2005, entitled "SMOOTHNESS INDICATOR ANALYSIS SYSTEM," which is herein incorporated by reference in its entirety.

FIELD OF THE INVENTION

The present invention generally relates to the field of computer software, and more particularly, to a smoothness indicator analysis system for analyzing a profile of a road surface.

BACKGROUND OF THE INVENTION

Methods for finishing paved surfaces such as concrete presently use a paving machine to insert structural steel, slip form a slab, and screed and trowel the slab surface. Because contractors are frequently graded on the smoothness of the finished surface, it is desirable to profile the surface for determining whether modifications such as grinding are required.

Typically, pavement of a road is completed and the road surface is allowed to set up or cure to a point of hardness such that surface profile measurements may be taken for determining whether the surface meets smoothness requirements. The surface profile measurements are used to calculate index values for the road surface, such as Profile Index (PI) values and International Roughness Index (IRI) values.

After the paved surface has set up, a surface profile is taken with a profilograph, such as a California profilograph, which is wheeled along the road for creating a roughness profile of the road. Then, modifications to the road surface such as grinding may be conducted to meet specifications. This is a costly technique for altering the road surface.

Further, the importance of pavement planning is becoming more evident as contractors realize that well-planned pavement operations are cost effective. Contractors desire to analyze the subgrade of the road surface before the pavement of the road is completed for various reasons. For example, contractors can save paving material, reduce the cost of concrete slabs, and reduce the cost of road surface modifications if they predict an overall estimated volume of paving material based on subgrade conditions. Contractors also desire to predict repair prone areas for future pavement maintenance by locating thin or thick spots in a slab before the pavement of a road is completed.

Thus, it would be desirable to provide a method for measuring a surface profile while the road surface is in a plastic state, for immediate modification of the surface as well as correction of paving machine settings. It would be also desirable to provide a computerized user-friendly system to take surface profile data, analyze the same, and generate a comprehensive report useful for planning and maintaining pavement.

SUMMARY OF THE INVENTION

Accordingly, the present invention is directed to a smoothness indicator analysis system for analyzing elevation information collected and measured by a smoothness indicator and generating a comprehensive report useful for planning and maintaining pavement of a road.

In a first aspect of the present invention, a method for analyzing elevation profile data useful for planning pavement projects and maintaining the paved road surface may be provided. A method for analyzing roadway information comprises receiving a first set of elevation data points defining at least a portion of an existing surface, receiving a second set of elevation data points defining at least a portion of an intended surface, comparing the first set of elevation data points to the second set of elevation data points to determine whether a relative elevation difference exists between corresponding data points of the first set of elevation data points and the second set of elevation data points, and generating an automated report displaying a comparison of the first set of elevation data points to the second set of elevation data points. The report indicates at least one of (a) a relative high spot on the existing surface when a relative elevation difference exists between corresponding data points of the first set of elevation data points and the second set of elevation data points, (b) a relative low spot on the existing surface when a relative elevation difference exists between corresponding data points of the first set of elevation data points and the second set of elevation data points, or (c) a relative yield of the existing surface as compared to the intended surface.

In a second aspect of the present invention, an apparatus for analyzing roadway information comprises means for receiving a first set of elevation data points defining at least a portion of an existing surface, means for receiving a second set of elevation data points defining at least a portion of an intended surface, means for comparing the first set of elevation data points to the second set of elevation data points to determine whether a relative elevation difference exists between corresponding data points of the first set of elevation data points and the second set of elevation data points; and means for generating an automated report displaying a comparison of the first set of elevation data points to the second set of elevation data points. The report indicates at least one of (a) a relative high spot on the existing surface when a relative elevation difference exists between corresponding data points of the first set of elevation data points and the second set of elevation data points, (b) a relative low spot on the existing surface when a relative elevation difference exists between corresponding data points of the first set of elevation data points and the second set of elevation data points, or (c) a relative yield of the existing surface as compared to the intended surface.

In a third aspect of the present invention, a method for analyzing elevation profile data useful for planning pavement projects and maintaining the paved road surface may be provided. A method for analyzing roadway information comprises receiving a plurality of elevation data points of an existing surface, storing the plurality of elevation data points of the existing surface, generating an elevation profile of the existing surface based on the plurality of elevation data points, and determining a surface profile characteristic of travel of an automobile tire upon the existing surface.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 34 illustrates an exemplary report screen for the main graphic user interface shown in FIG. 33;

FIG. 37 is an illustration of a further example of a main graphic user interface of the information handling system shown in FIG. 32;

DETAILED DESCRIPTION OF THE INVENTION

Figure 1:
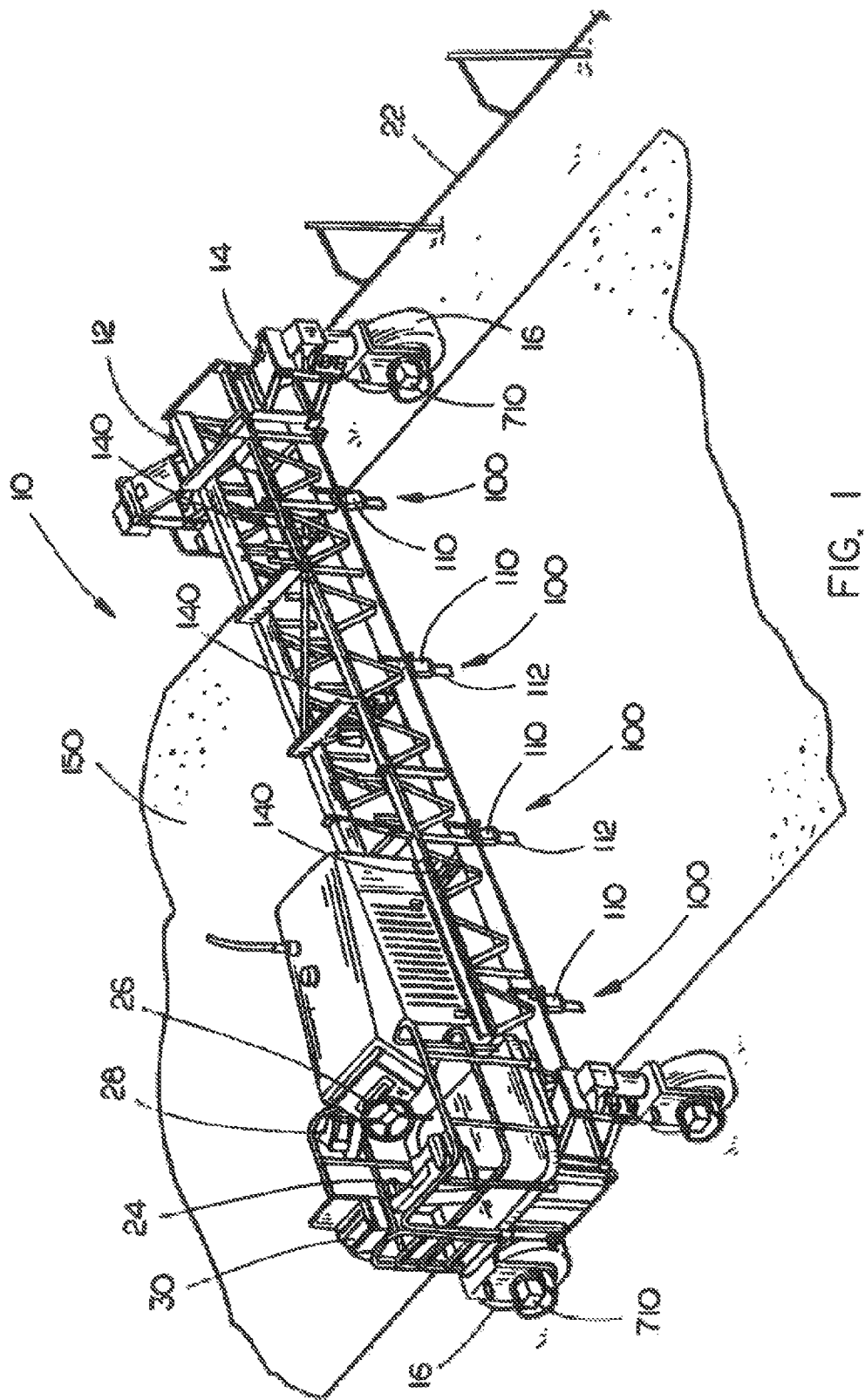
FIG. 1 is an isometric view illustrating a smoothness indicator in accordance with an exemplary embodiment of the present invention.
Figure 2:
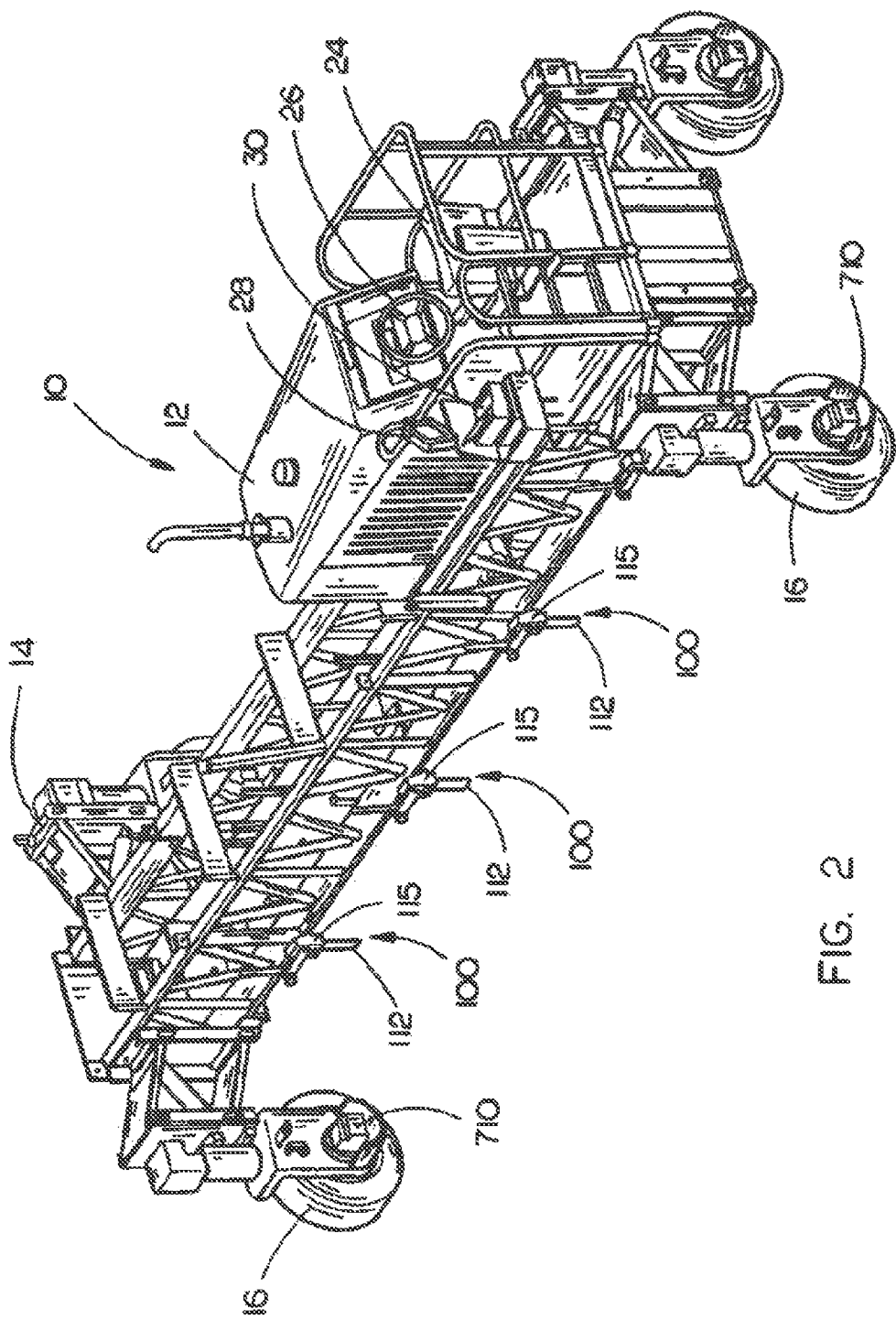
FIG. 2 is an isometric view of the smoothness indicator illustrated in FIG. 1.
Figure 3:
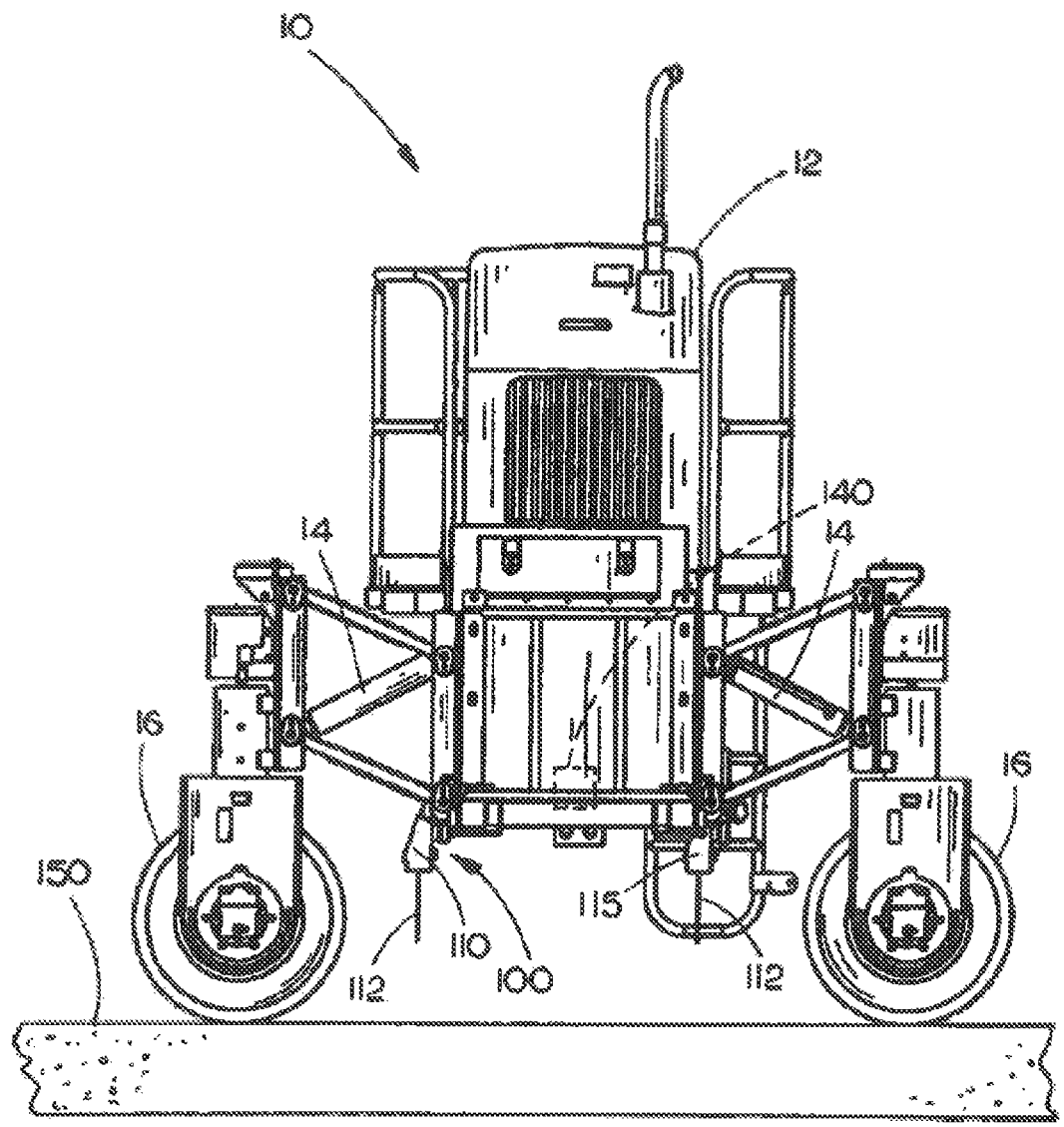
FIG. 3 is a side elevation view of the smoothness indicator illustrated in FIG. 1, wherein a side of the smoothness indicator is illustrated on a paved surface.
Figure 4:
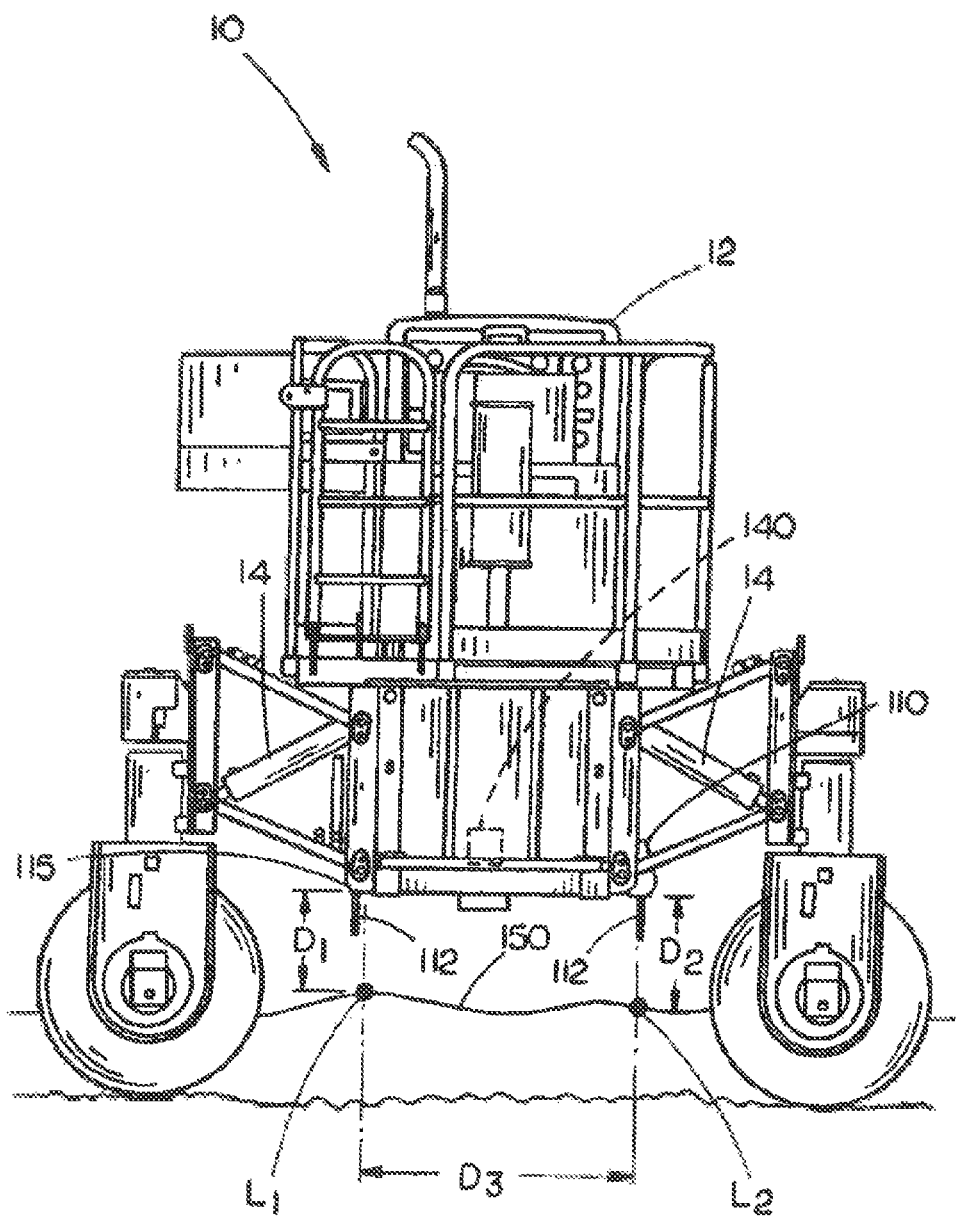
FIG. 4 is another side elevation view of the smoothness indicator illustrated in FIG. 1, wherein the smoothness indicator is illustrated straddling a paved surface.
Figure 5:
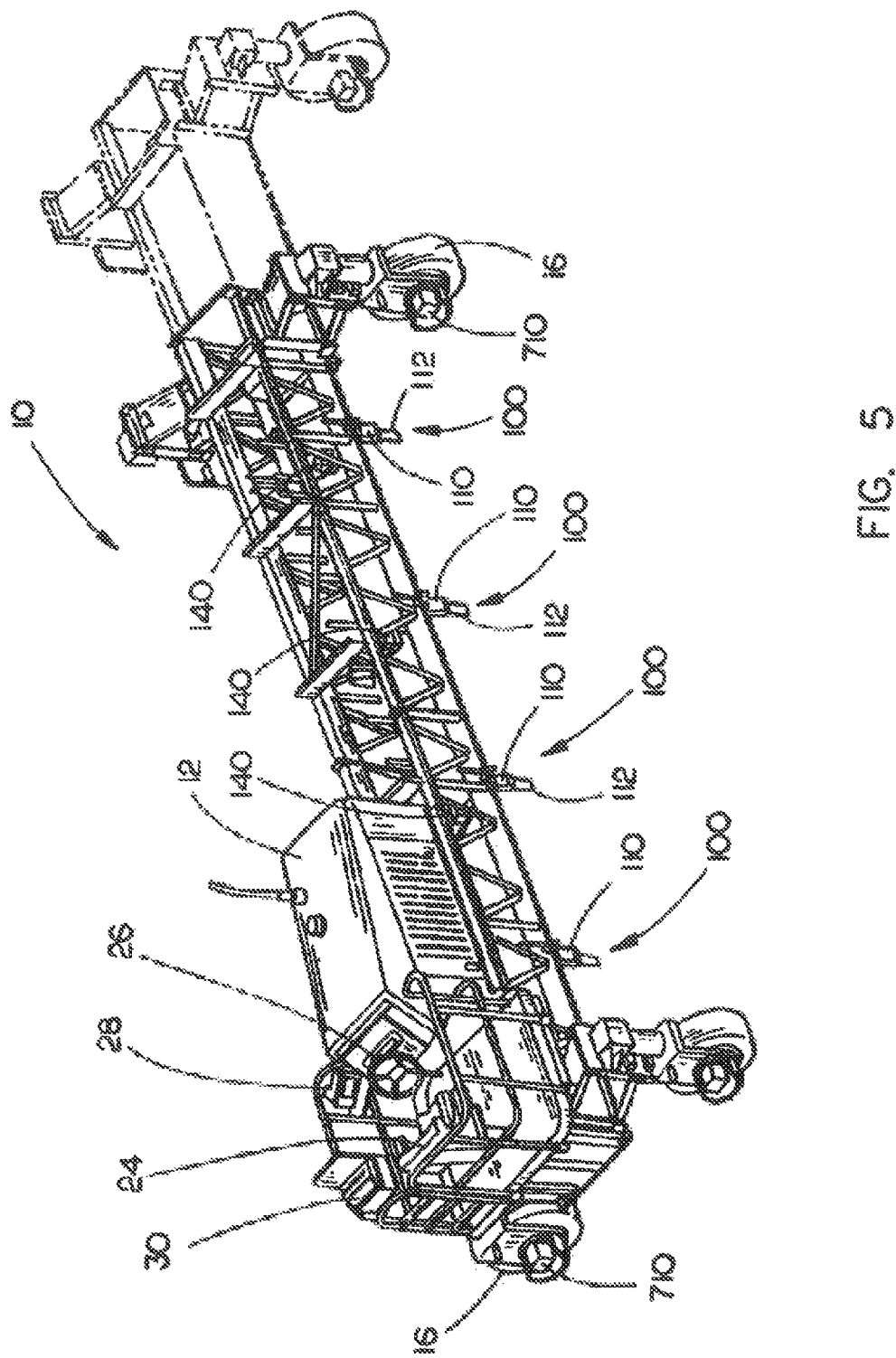
FIG. 5 is an isometric view illustrating a smoothness indicator in accordance with another exemplary embodiment of the present invention, wherein the smoothness indicator is capable of extension and retraction.
Figure 6:
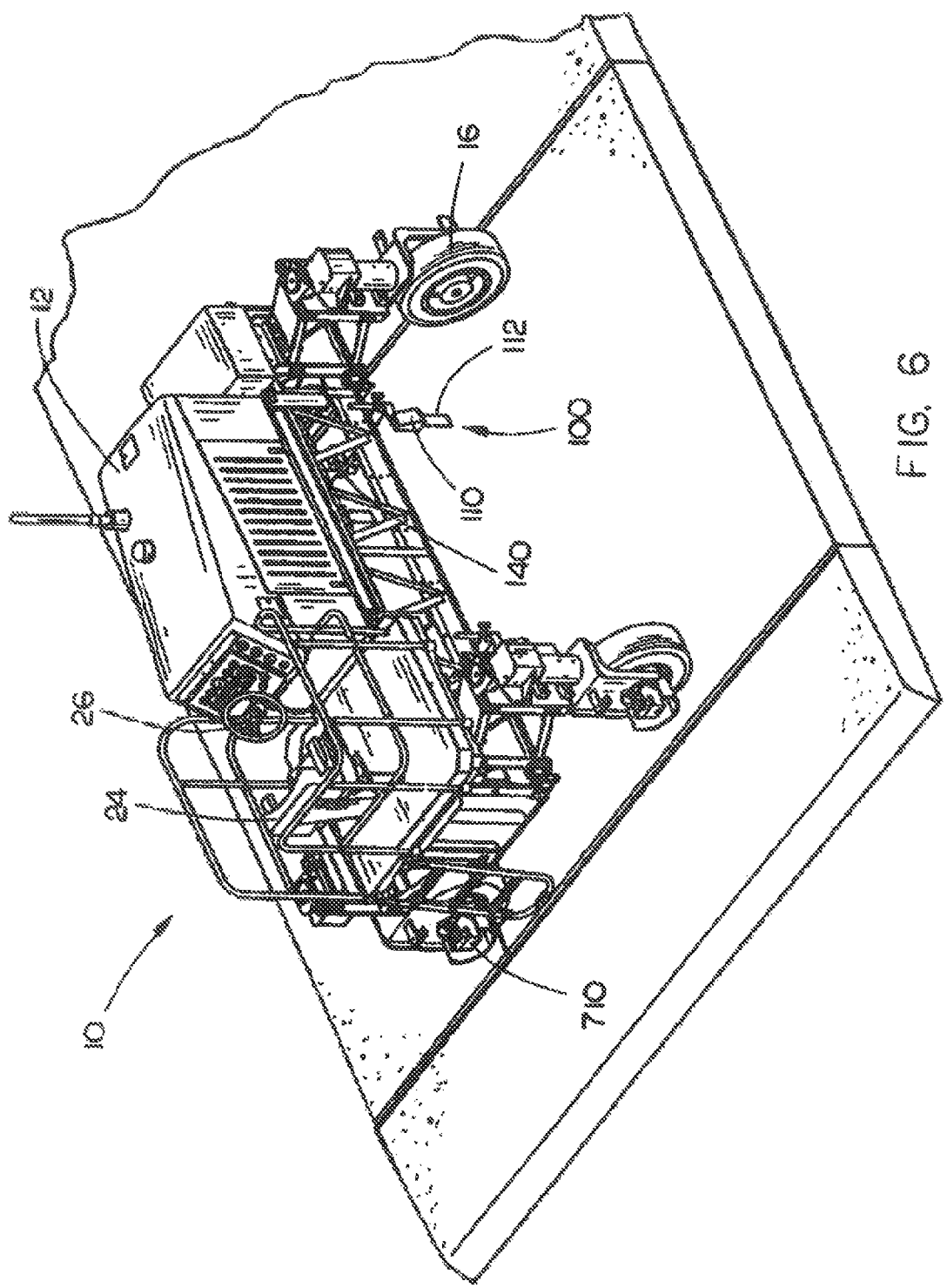
FIG. 6 is an isometric view illustrating a smoothness indicator in accordance with a further exemplary embodiment of the present invention.
Figure 7:
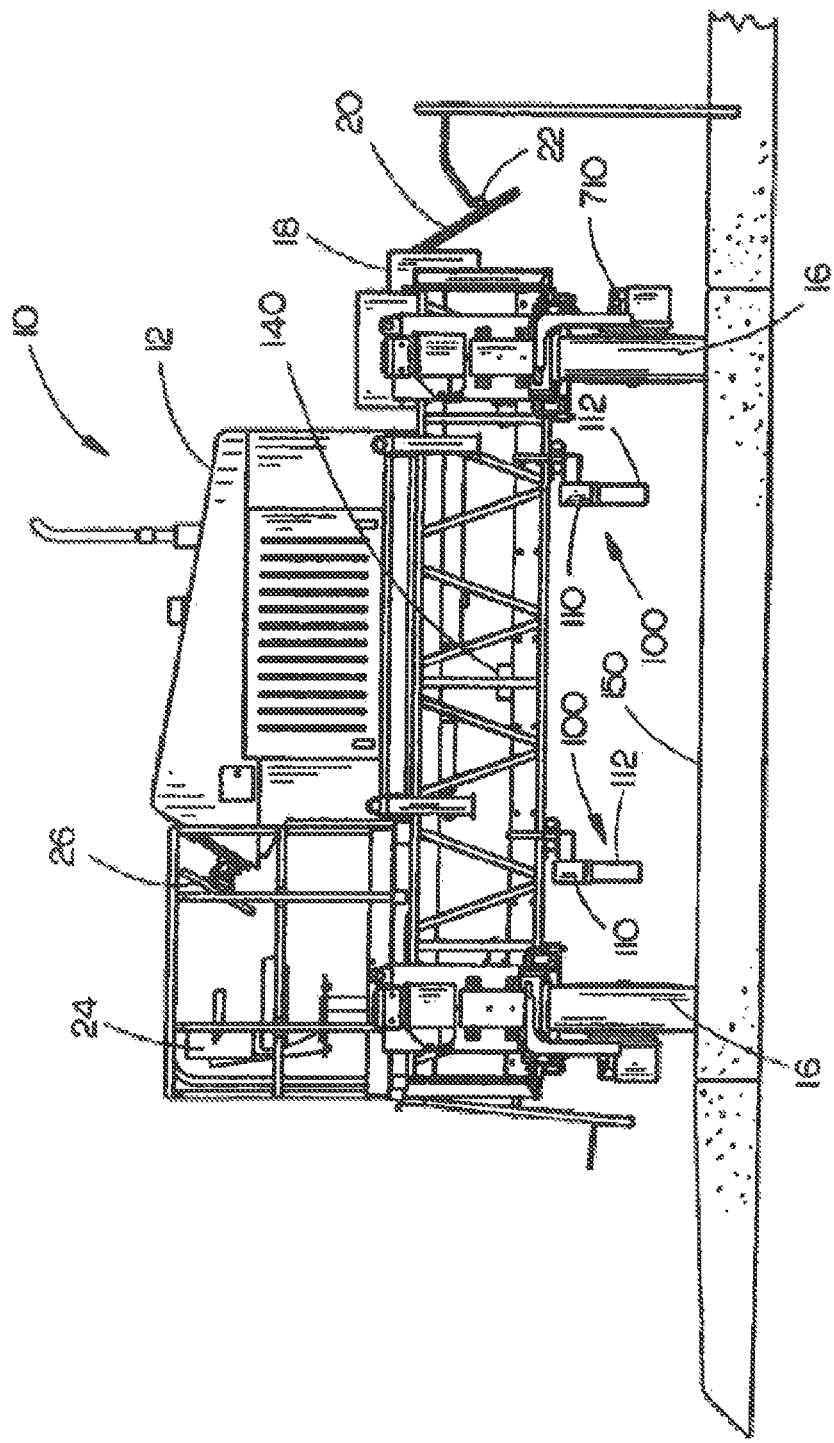
FIG. 7 is an end elevation view of the smoothness indicator illustrated in FIG. 6.
Figure 8:
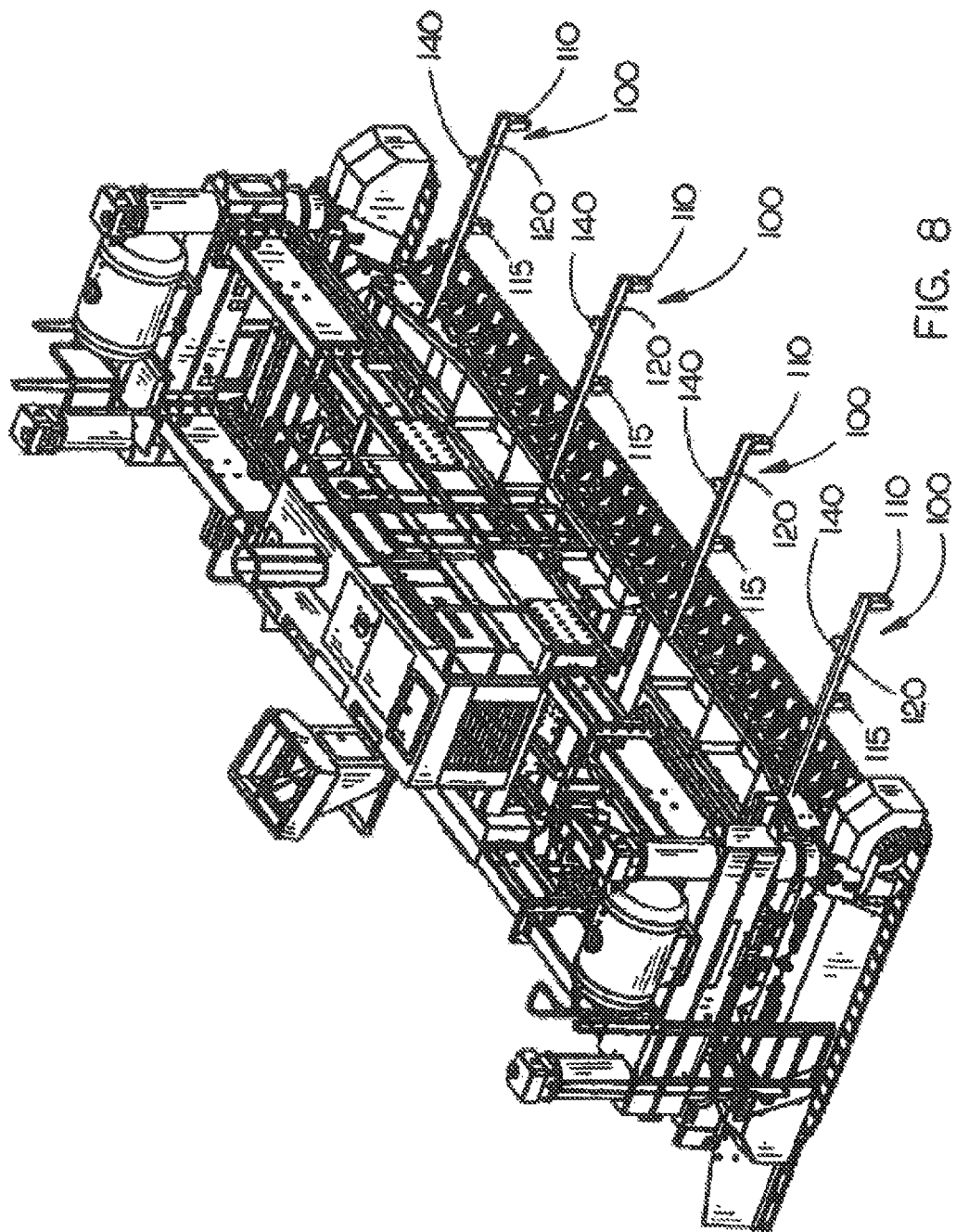
FIG. 8 is an isometric view illustrating a slip form paver including a smoothness indicator in accordance with another exemplary embodiment of the present invention.
Figure 9:
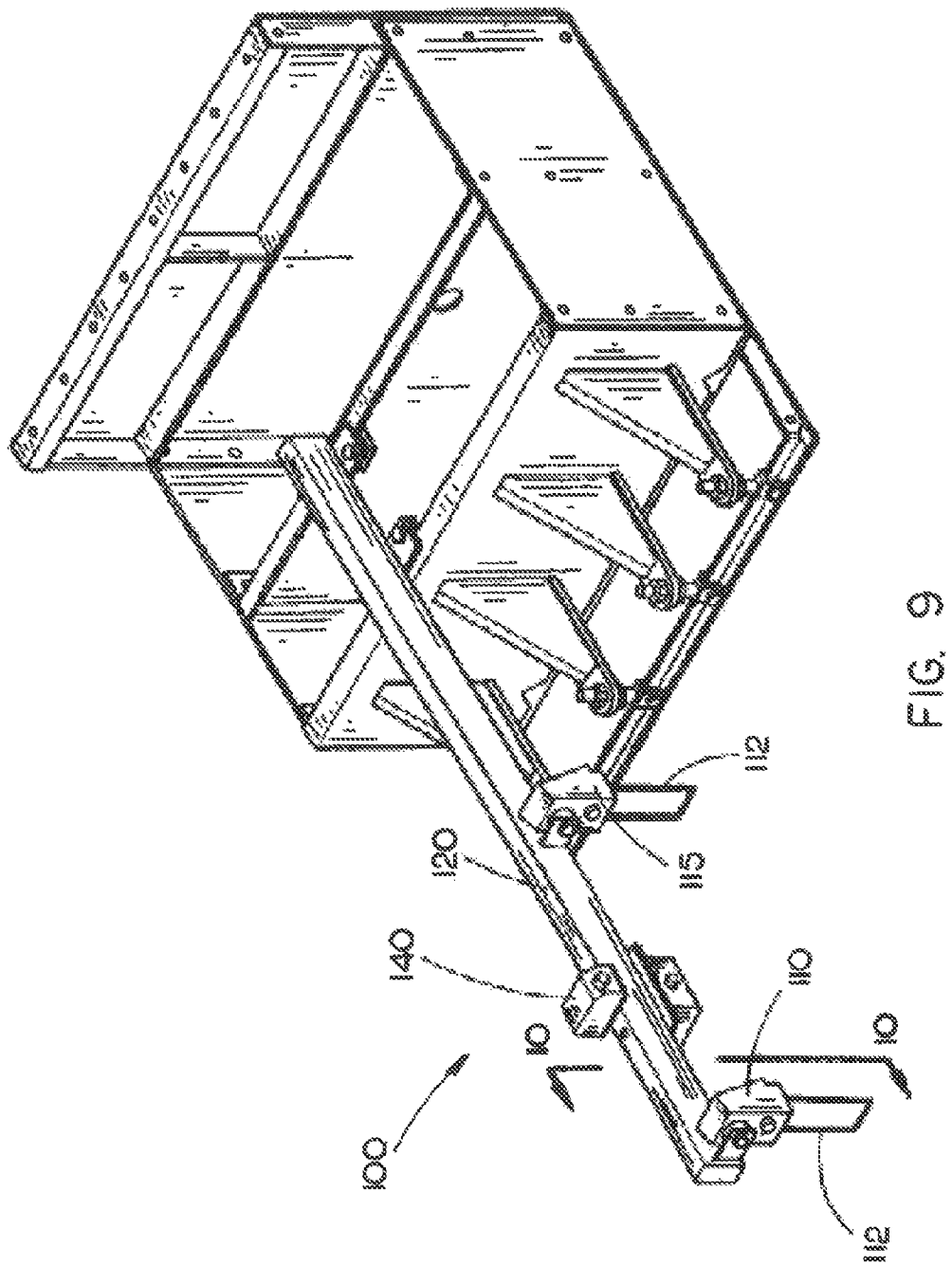
FIG. 9 is a partial isometric view of the slip form paver illustrated in FIG. 8.
Figure 10:
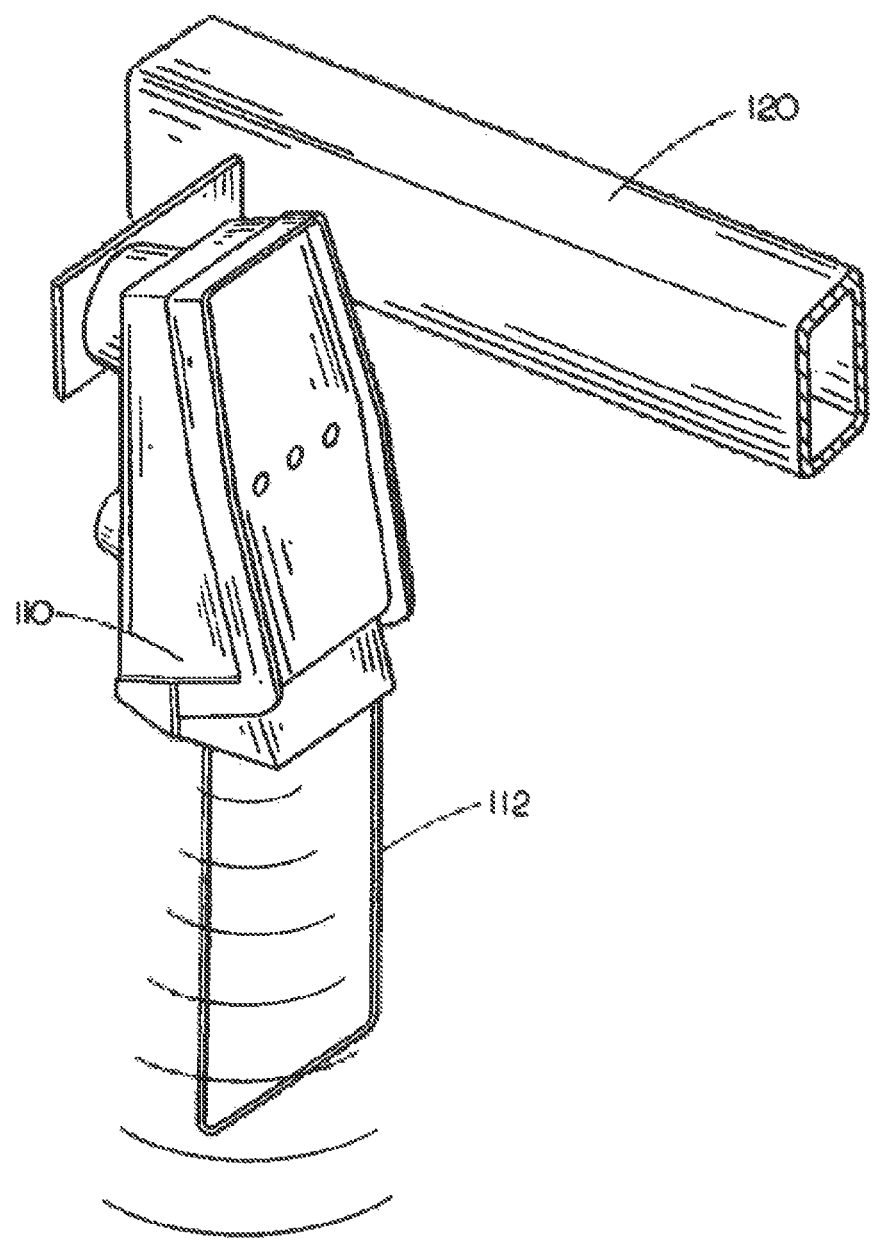
FIG. 10 is a partial cross-sectional isometric view of the smoothness indicator illustrated in FIG. 8, further illustrating an ultrasonic sensor assembly.
Figure 11:
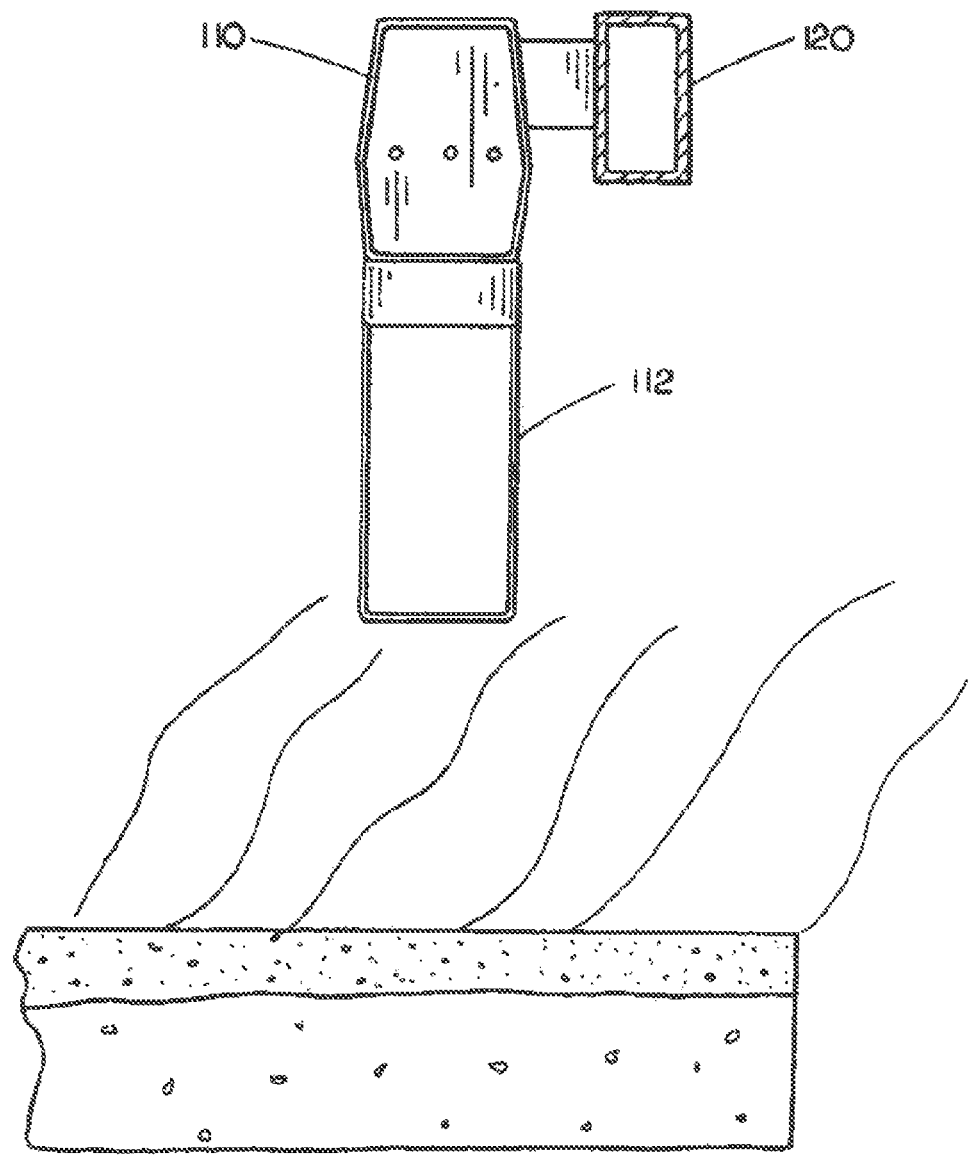
FIG. 11 is a partial cross-sectional end elevation view of the smoothness indicator illustrated in FIG. 8, wherein an ultrasonic sensor assembly includes a temperature gauge assembly.

Reference will now be made in detail to the presently preferred embodiments of the invention, examples of which are illustrated in the accompanying drawings.

Referring generally to FIGS. 1 through 40, a smoothness indicator analysis system in accordance with exemplary embodiments of the present invention is described. A smoothness indicator 10 may be used for measuring a profile of a paved surface such as concrete; a base course including cement treated base (CTB), lean concrete base, crushed stone, asphalt, and crushed slag; a subbase, such as subgrade soil or aggregate; a subgrade upon which a subbase, a base, a base course, or pavement is constructed; and other graded surfaces including sand, rock, and gravel. The smoothness indicator 10 may also be used for measuring a profile of a surface which has not been graded.

The smoothness indicator 10 includes one or more sensor assemblies each having two elevation distance sensors. In exemplary embodiments of the present invention, the elevation distance sensors comprise non-contact sensors, such as ultrasonic sensors, laser sensors, or the like. In this manner, the smoothness indicator 10 may be used to measure profiles for surfaces which have not cured, such as freshly paved concrete in a plastic state. Each non-contact elevation distance sensor has a footprint over which a distance measurement is taken. In this manner, measurements taken by a non-contact elevation distance sensor reflect a portion of the surface included within the bounds of the sensor's footprint. This may have a smoothing/averaging effect for providing a more characteristic representation of the surface. Preferably, the footprint of a non-contact elevation distance sensor is of sufficient diameter for smoothing the effect of measurement of minor imperfections in the paved road surface, such as texture on the surface (e.g. skid surface texture), cracks, seams, pebbles, and the like, which may be disposed upon the road surface. Further, in exemplary embodiments, the footprint of a non-contact elevation distance sensor approximates the footprint of a typical automobile tire (i.e. the surface space occupied by the tire), for providing a surface profile characteristic of travel of the automobile tire upon the surface. In the exemplary embodiment illustrated, for example, each non-contact elevation distance sensor has a circular footprint with approximately a 6-inch diameter. However, it will be appreciated that sensors may provide footprints of greater or smaller diameters without departing from the scope of the present invention. Those of skill in the art will appreciate that various surfaces may be profiled by the smoothness indicator 10 of the present invention. Additionally, while two elevation distance sensors are shown in the accompanying figures, those of skill in the art will appreciate that more than two elevation distance sensors may also be utilized without departing from the scope of the present invention.

Preferably an independent vehicle or rig is utilized for increased versatility. For instance, when a road is paved in concrete using a slip form paving machine or the like, a contractor may be graded on meeting smoothness requirements for the road surface. Utilizing an independent rig including the smoothness indicator of the present invention, the smoothness of the road may be determined as the road is paved. For example, the rig may be driven along behind the paver, while the smoothness indicator generates a surface profile of the freshly paved road. When a surface irregularity, such as a must-grind bump or a low spot, is encountered, personnel are alerted and work to correct the irregularity, such as utilizing a bull float, a troweling machine, a roller, or the like, while the concrete is still in a plastic state. Then, the rig may be driven over the area of the irregularity to verify that the corrected road surface meets smoothness requirements. Additionally, the smoothness indicator may be used to gauge the effectiveness of paving machine settings. In a further example, a paver is connected to the smoothness indicator via a wireless connection for providing smoothness data to the paving machine supervisor/operator or for making automatic updates/changes to the paver.

Referring to FIGS. 1 through 7, a smoothness indicator 10 in accordance with an exemplary embodiment is described. Preferably, the smoothness indicator 10 includes an extensible and retractable bridge rig assembly 12 having one or more sensor assemblies 100. For example, the bridge rig 12 may be extended over a four-lane road and retracted for a two-lane road. The sensor assemblies 100 are positioned for measuring locations upon a road surface 150, such as where automobile tires travel upon the road. In a first embodiment, the sensor assemblies 100 may be manually positioned, and a setscrew may be provided for locking a sensor assembly 100 in place. Alternatively, a drive assembly may be utilized for automatically adjusting the sensor assembly 100 to a preselected position.

In the present example, the bridge rig 12 includes a height adjustment assembly 14, such as an assembly including a hydraulic piston, a mechanical linkage, or the like, for adjusting the height of the bridge rig and positioning a sensor assembly 100 a distance from the road surface 150. This may be desirable for maintaining the sensor assembly in an optimal range while profiling the surface. For example, an operator may wish to maintain a sensor assembly 100 a distance between 18 and 24 inches from the road surface 150. It is contemplated that the operator may position the bridge rig 12 at a median height (the median height being relative to the distance between a sensor assembly and the road surface), such as to account for a banked turn. In further embodiments, the smoothness indicator 10 transmits a command to the height adjustment assembly 14 to position a sensor assembly 100 at a specified distance from the road surface 150. For instance, the operator may specify a distance at which the sensor assembly should be located from the road surface. The smoothness indicator may then transmit a command to the height adjustment assembly. Those of skill in the art will appreciate that the command to the height adjustment assembly 14 may be transmitted electronically, mechanically, or the like without departing from the scope of the present invention.

The bridge rig assembly 12 includes at least one travel distance sensor 710 connected to a wheel 16 of the bridge rig. The travel distance sensor 710 measures distances traveled by the wheel of the rig to determine distances traveled by a sensor assembly 100. In embodiments, two or more travel distance sensors are included for determining distances over non-linear terrain, such as distances around a sweeping highway curve. For instance, in the embodiment illustrated, two encoders and/or two pulse pickups may be utilized to measure longitudinal distances traveled by two wheels of the bridge rig assembly 12 (one encoder and/or one pulse pickup for each wheel). For example, if first and second travel distance sensors 710 are included with wheels 16 on both sides of the bridge rig 12, a weighted average of distance measurements from the travel distance sensors may be utilized to calculate a distance traveled by a sensor assembly between them. For instance, an average distance may be used for a sensor assembly 100 located in the center of the bridge rig 12. Alternatively, a distance traveled by a sensor assembly one-fourth a distance from the first travel distance sensor to the second travel distance sensor may be calculated by taking 25 percent of a distance measured by the first travel distance sensor and adding 75 percent of a distance measured by the second travel distance sensor. In a further example, a distance measuring wheel may be included with the smoothness indicator 10 for determining distances traveled by a sensor assembly 100.

In further embodiments, the smoothness indicator 10 includes one or more contact sensors 18. A contact 20 is included for measuring a distance between the bridge rig 12 and a guide, such as a string line positioned for guiding a paver, or the like. For example, a contact sensor 18 may follow a string line 22 for automatically directing the bridge rig 12 when measuring a surface profile. The contact 20 follows the string line as the bridge rig advances over the road surface 150. By analyzing movement of the contact 20, the smoothness indicator positions the bridge rig 12 for travel in a direction following the direction of the road. In another embodiment, an elevation distance sensor assembly is utilized to guide the bridge rig by tracking a line, which may be rope or another type of line detectable by the elevation distance sensor.

A feedback and actuator assembly may be utilized to control the wheel 16 of the bridge rig 12. The feedback and actuator assembly may include a feedback sensor (such as a rotary potentiometer, or the like, for sensing an angle of the wheel 16), an actuator, and/or a control assembly, for guiding the angle of the wheel 16, controlling its rotational velocity, and/or directing another characteristic of the wheel's movement. For example, a computer assembly or an integrated circuit utilizing control logic senses a characteristic of the wheel's movement via the feedback sensor and guides the wheel 16 via the actuator. The feedback and actuator assembly may be coupled with the contact sensor 18 (or the elevation distance sensor) for controlling the direction of travel of the bridge rig 12. Alternatively, the bridge rig and/or the wheel are controlled by a Global Positioning System (GPS) directing the rig. In this manner, the bridge rig 12 may travel a predetermined course.

The smoothness indicator 10 is capable of profiling a surface in either a forward or a reverse direction. For example, the bridge rig 12 may travel in a forward direction behind a paver. Upon detection of a surface irregularity, such as a must-grind bump or a low spot, the smoothness indicator 10 may emit an audible alarm, a visual alarm, or the like, to notify personnel to correct the irregularity. An operator may then drive the bridge rig assembly 12 backward and forward over the area of the surface irregularity, repeatedly (if necessary) measuring the surface until proper correction and/or minimization of the irregularity has been achieved. Various options may be provided for identifying surface irregularities, such as parameters for must-grind bump size, and other surface criteria.

In one embodiment, previous elevation measurements for locations measured along the road surface 150 are replaced with more recent elevation measurements for the same locations. For example, elevations measured for locations along the road surface before the bridge rig 12 is driven backwards over an area are replaced by elevations measured when the bridge rig assembly is driven forward over the area. This has the advantage of reflecting the corrected profile of the road surface 150 when measuring is resumed.

The smoothness indicator 10 may be utilized for profiling a variety of surfaces. Different intervals may be used for averaging measured elevations when profiling the surfaces, minimizing the elevations associated with a profile. For instance, a two-inch interval may be utilized when measuring a concrete surface, while a one-fourth inch interval may be utilized for a subgrade. The smaller interval may allow for the detection of rocks, glass, and the like. In still a further embodiment, an averaging ski may be used with the sensor assembly 100 for measuring a subgrade. In this instance, two averaging skis may be used with the sensor assembly 100: a leading averaging ski, and a trailing averaging ski. It should be noted that various contacting and non-contacting sensors may be used with the smoothness indicator 10 of the present invention to optimize detection for a particular surface without departing from the scope thereof. An example of the various contacting sensors may include a wand sensor, or the like. It is to be noted that there are various vendors who produce wand sensors suitable for the smoothness indicator 10. For example, wand sensors (e.g., sensors with part number 1035073) produced by TSD Integrated Controls (a joint venture of Topcon Positioning Systems, Inc. of Livermore, Calif. and Sauer-Danfoss Inc. of Ames, Iowa) may be suitable as the contacting sensors utilized by the smoothness indicator 10.

In embodiments, the bridge rig assembly 12 includes a seat 24 for supporting an operator. The seat may be adjustable for allowing the operator a less obstructed view of the road surface 150 or for purposes of comfort. Additionally, the bridge rig 12 includes a steering wheel 26 for manually controlling the position of the bridge rig, such as when driving the rig to a job-site. (Preferably, the bridge rig is oriented longitudinally with a road when driving to a job-site, occupying one lane of the road.) The steering wheel 26 may be used to override directional commands, while a lockout feature may be provided for preventing inadvertent direction changes. Preferably, a graphical user interface assembly 28 is included for setting parameters, entering information, viewing data, and controlling the smoothness indicator 10. A printer 30 may be provided for generating a hard copy, such as a surface profile measured by the smoothness indicator 10, or related data.

In order to generate a surface profile, the smoothness indicator 10 utilizes a trailing (first) non-contact elevation distance sensor 110 and a leading (second) non-contact elevation distance sensor 115 to measure a distance $D_1$ and a distance $D_2$ from a road surface 150. By measuring angles of incidence of the sensors 110 and 115, and utilizing a known/pre-selected distance $D_3$ between the sensors, an elevation for a first location $L_1$ may be calculated using an elevation assigned to a second location $L_2$. It will be appreciated that the terms trailing/first and leading/second are used to describe non-contacts sensors 110 and 115 in relation to the direction of travel of the smoothness indicator 10. In exemplary embodiments, the bridge rig 12 may travel in two directions. Thus, a trailing/first non-contact elevation distance sensor may become a leading/second non-contact elevation distance sensor if the direction of travel is reversed. Alternatively, a leading/second non-contact elevation distance sensor may become a trailing/first non-contact elevation distance sensor in the same manner. For the following description, let the x axis be oriented in a direction parallel to motor vehicle travel on the road surface.

For the present invention, an elevation profile of the road surface is constructed using a method called the "Incremental Slope Method" (ISM). ISM constructs a road-surface elevation profile by measuring the slope between successive pairs of points, such as locations $(x_0, y_0)$ and $(x_1, y_1)$, (oriented such that a line drawn between these points and the x axis define a plane) on the road surface, which are separated by a known distance. Using an elevation/benchmark assigned to one point, it is possible to calculate an elevation for the other point as $$y_1 = y_0 + m d_x$$

where $y_0$ and $y_1$ are the elevations of the points at $x_0$ and $x_1$, respectively; m is the slope between points 0 and 1; and $d_x$ is the known horizontal distance between the two points.

By moving the sensors in the x-direction a known distance less than $d_x$, the process can be repeated and a surface elevation profile constructed in desired increments. Thus, a priori knowledge or an estimate of the profile for the road surface in the region, $x_0 \leq x \leq x_0 + d_x$ is needed. Then, for $x_0 + d_x < x$, elevations may be calculated, and the road-surface profile constructed as desired (within tolerances of the sensors and other equipment).

For the following analysis, the following definitions are used (see FIG. 13):

x is the coordinate on the abscissa, lying in a horizontal orientation longitudinally along a road. This coordinate will curve with the road, but always lies in a horizontal plane.

y is the coordinate used on the ordinate, oriented in the vertical direction.

Referring now to FIGS. 8 through 18, in a further embodiment, the smoothness indicator 10 includes a first ultrasonic sensor 110 and a second ultrasonic sensor 115, separated by a pre-selected distance d 130. The first and second ultrasonic sensors 110 and 115 use active ultrasonic ranging for measuring the distance to the surface, e.g. from a sensor to the road surface 150. By comparing distance measurements obtained by the first and second ultrasonic sensors 110 and 115, an elevation difference between locations on the road surface 150 is computed. For instance, by measuring a first distance $h_1$ from the first ultrasonic sensor 110 to a first location $(x_1, y_1)$ on the road surface 150 and a second distance $h_2$ from the second ultrasonic sensor 115 to a second location $(x_2, y_2)$ on the road surface 150, an elevation difference $h_3$ between the first and second locations is computed.

Those of skill in the art will appreciate that the smoothness indicator 10 may not travel a level course, due to uneven terrain, thus causing the first and second ultrasonic sensors 110 and 115 to assume various angles of incidence relative to a horizontal plane. Electronic circuitry, mathematical formulae, or other techniques may be used to calculate the elevation difference $h_3$ between the first location $(x_1, y_1)$ and the second location $(x_2, y_2)$, such as by noting the various angles of the first and second ultrasonic sensors relative to the horizontal.

The first and second ultrasonic sensors 110 and 115 are oriented along a line having a slope $\theta$ from the horizontal. In embodiments, the ultrasonic sensors are positioned such that the sensors face the road surface substantially perpendicular to the line having slope $\theta$ from the horizontal. This places the first and second ultrasonic sensors 110 and 115 at the same angle of incidence relative to the horizontal, namely slope $\theta$. The elevation difference $h_3$ between the first location $(x_1, y_1)$ measured by the first ultrasonic sensor 110 and the second location $(x_2, y_2)$ measured by the second ultrasonic sensor 115 relative to the road surface 150 is computed using the pre-selected distance d 130, the first and second distances ($h_1$ and $h_2$), and the slope $\theta$. The following formula may be used to compute the elevation difference $h_3$ between the first and second locations $(x_1, y_1)$ and $(x_2, y_2)$ on the road surface 150 measured by the ultrasonic sensors:

$$h_3 = (h_1 - h_2) \cos \theta + d \sin \theta.$$

In exemplary embodiments of the present invention, the first ultrasonic sensor 110 and the second ultrasonic sensor 115 are connected to a paver such as a concrete paver; a slip form machine; a form-riding machine; a bridge deck machine; a tow paver, such as a tow-type paver, a tow-behind paver, or a box paver; one or more machines in a paving train, including a spreader or belt placer, a slip form paver, and a curing and texturing machine; a canal lining paver; a cold planar; a road reclaimer; a road trimmer; as well as other vehicles and machines. The first and second ultrasonic sensors 110 and 115 may be adjustably mounted on a paver for identifying surface irregularities without disrupting paving operations. Preferably, the ultrasonic sensors are mounted on a separate vehicle, such as a bridge rig assembly, thus allowing for repeated surface profiles and rapid profiling of a subgrade. Those of skill in the art will appreciate that the sensors may be connected to a variety of vehicles/machines such as an all terrain vehicle (ATV) (see FIG. 31).

In exemplary embodiments of the present invention, the first ultrasonic sensor 110 and the second ultrasonic sensor 115 are connected to a mounting assembly, such as a beam 120. A slope sensor 140 may be connected to the beam, for measuring the slope $\theta$ from the horizontal of the line along which the ultrasonic sensors are oriented. The ultrasonic sensors are placed facing the road surface 150, such that they are oriented perpendicular to the beam 120 and have the same angle of incidence relative to the horizontal, slope $\theta$. In this manner, the elevation difference $h_3$ between the first and second locations $(x_1, y_1)$ and $(x_2, y_2)$ on the road surface 150 measured by the ultrasonic sensors is computed as described above. Those of skill in the art will appreciate that the first and second ultrasonic sensors 110 and 115 may each have a separate slope sensor and/or utilize various sensors for determining an angle of incidence relative to the horizontal, to account for uneven terrain or the like. Electronic circuitry, mathematical formulae, and techniques may be used to calculate an elevation difference between the first and second locations measured by the ultrasonic sensors using the various angles of incidence.

In a present embodiment, the slope sensor 140 includes a fluid chamber having a gas bubble. By determining a position of the gas bubble with respect to the chamber at a given instant, the slope $\theta$ may be determined. However, when a jarring bump is encountered by the smoothness indicator 10, the gas bubble's position may fluctuate and thus not accurately reflect the slope of the beam 120. In embodiments, the rate of change in the position of the gas bubble is measured (for a time period) to ascertain whether the slope determined is accurate.

For example, measurements obtained during a bump may instead utilize a slope determined before or after the bump. In another example, intermediate slope measurements are calculated over the time interval of the bump from slope measurements obtained before and after the bump. These measurements are utilized to calculate intermediate slope measurements, such as by interpolating the various slope measurements. In this manner, slope measurements may more accurately reflect the slope of the beam 120 at a given instant. Other techniques may be used to account for jarring, such as the use of an accelerometer coupled with the beam 120, or the like, for rapidly measuring beam movement.

In one embodiment, the beam 120 connecting the ultrasonic sensors is affixed/secured to a vehicle, which travels over a surface from a first position $P_1$ to a second position $P_2$. In another embodiment, the beam 120 is longitudinally positioned by the vehicle between the first and second positions. For instance, the beam 120 is mounted to a vehicle such that it is translatable from the first position to the second position relative to the vehicle. By using a first elevation difference between a first pair of locations $(x_1^{n-1}, y_1^{n-1})$ and $(x_2^{n-1}, y_2^{n-1})$, measured by the first and second ultrasonic sensors 110 and 115 at the first position $P_1$, and a second elevation difference between a second pair of locations $(x_1^n, y_1^n)$ and $(x_2^n, y_2^n)$, measured by the first and second ultrasonic sensors 110 and 115 at the second position $P_2$, a profile of the surface is generated through successive measurements n−1 and n. In this manner, the beam 120 may be moved from the first position to the second position for measuring the profile of the surface.

Figure 12:
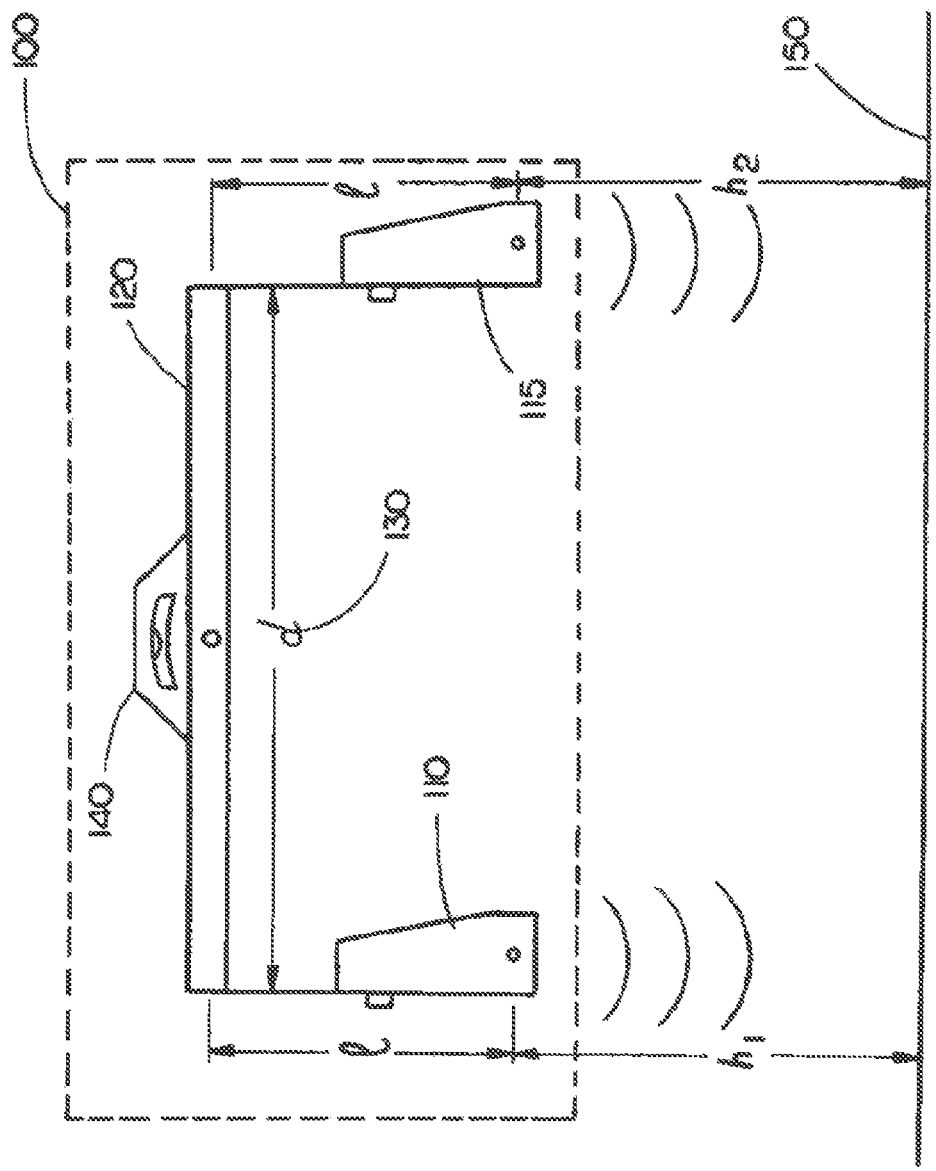
FIG. 12 is a side elevation view illustrating a sensor assembly for use with a smoothness indicator in accordance with an exemplary embodiment of the present invention.

The incremental slope method is used to construct a surface profile by measuring the slope between successive pairs of points on the surface (e.g. road surface 150) which are separated by a calculable increment. FIG. 12 provides a schematic of the sensor assembly 100, which comprises two sets of non-contacting elevation distance sensors 110 and 115 (for example, Topcon Positioning Systems, Inc. sells a model called "Sonic Tracker II" 9142-0000) mounted on a beam 120 a fixed distance, d 130 apart, along with a slope sensor 140 which measures the slope of the beam in the direction of travel. (For example, the slope sensor might be a "System Four Plus Slope Sensor" 9150P/9152P from Topcon Positioning Systems, Inc.) The elevation distance sensors may be any non-contacting detector such as ultrasonic or laser sensors. Elevation distance sensor 115 is ahead of elevation distance sensor 110 in a direction of travel the assembly will travel. The elevation profile of road surface 150 to the left (as oriented in FIG. 12) of elevation distance sensor 115 would be known (or estimated).

In the present example, the first and second ultrasonic sensors 110 and 115 use active ultrasonic ranging for measuring distances to a surface, such as distances from the ultrasonic sensors to the road surface 150. Preferably, the ultrasonic sensors have an operating range of 14 to 55 inches, such as to account for a banked curve. However, the first and second ultrasonic sensors 110 and 115 are preferably disposed in a range of 18 to 24 inches to minimize atmospheric impact and the like. Those of skill in the art will appreciate that the sensors should be disposed to minimize atmospheric effects while accommodating lateral height differences.

Preferably, the first and second ultrasonic sensors 110 and 115 are positioned to remain within the desired operating range. An auditory signal such as an audible alarm, a visual indicator such as a flashing light, and/or a mechanical flag may be utilized to alert an operator if a sensor is out of range or nearing a range limit. For instance, various combinations of alerts may be utilized to provide differing levels of warnings. Additionally, a mechanical actuator or the like may be provided for maintaining the beam 120 and/or the first and second ultrasonic sensors 110 and 115 in a desired range. In a further example, a mechanical actuator includes a measuring device for determining translational movement of the beam relative to the vertical direction, and adjusts measurements taken by the first and second ultrasonic sensors 110 and 115 accordingly. In another embodiment, vertical translation of the beam may be controlled by an elevation distance sensor coupled with the smoothness indicator 10 for measuring the height of a string line (which typically correlates to a road surface). Those of ordinary skill in the art will appreciate that various other techniques may be used for maintaining the ultrasonic sensors in a desired range.

Preferably, environmental conditions (such as temperature, etc.) are taken into account during operation. When taking ultrasonic measurements over hot asphalt, for instance, correction and/or adjustment of the data gathered by the first and second ultrasonic sensors 110 and 115 is required to account for temperature variations in hot, localized air through which the distance measurements are taken. For example, a temperature gauge assembly 112, a hydrometer, or the like, may be used to correct measurements to account for the speed of sound through the localized air.

Various methods of determining or estimating the speed of sound through the air between the first and second ultrasonic sensors 110 and 115, and a surface to be profiled, may be utilized as well. For example, measurements of a known distance may be taken periodically and used to calibrate the ultrasonic sensor. Alternatively, the smoothness indicator 10 may include optional/required settings for inputting conditions, such as the type of surface being profiled, the ambient air temperature, and the like. These settings may then be utilized to adjust and/or correct measurements taken by the sensors.

After the elevation difference $h_3$ between a pair of locations $(x_1, y_1)$ and $(x_2, y_2)$ measured by the first and second ultrasonic sensors 110 and 115 has been calculated, the elevation difference $h_3$ may be added to or subtracted from a known elevation assigned to one or the other of the pair of locations. For example, if a first elevation $y_1$ has been assigned to the first location $(x_1, y_1)$ measured by the first ultrasonic sensor 110, the elevation difference $h_3$ is added to the first elevation $y_1$ for calculating a second elevation $y_2$ for the second location $(x_2, y_2)$ measured by the second ultrasonic sensor 115. If a third elevation $y_2'$ has been assigned to the second location $(x_2, y_2)$ measured by the second ultrasonic sensor 115, the elevation difference $h_3$ is subtracted from the third elevation $y_2'$ for calculating a fourth elevation $y_1'$ for the first location $(x_1, y_1)$ measured by the first ultrasonic sensor 110. Thus, by utilizing a known elevation assigned to a location measured by one of the first and second ultrasonic sensors 110 and 115, an elevation for another location measured by the other sensor is calculated. Those of skill in the art will appreciate that the elevations measured and/or calculated for the pair of locations $(x_1, y_1)$ and $(x_2, y_2)$ measured by the first and second sensors may be relative to a pre-selected elevation (e.g. a benchmark), related to an absolute elevation, or the like. For example, a GPS measurement may be used as a benchmark, or an elevation input by a user may be assigned to one of the locations $(x_1, y_1)$ and $(x_2, y_2)$.

Figure 13:
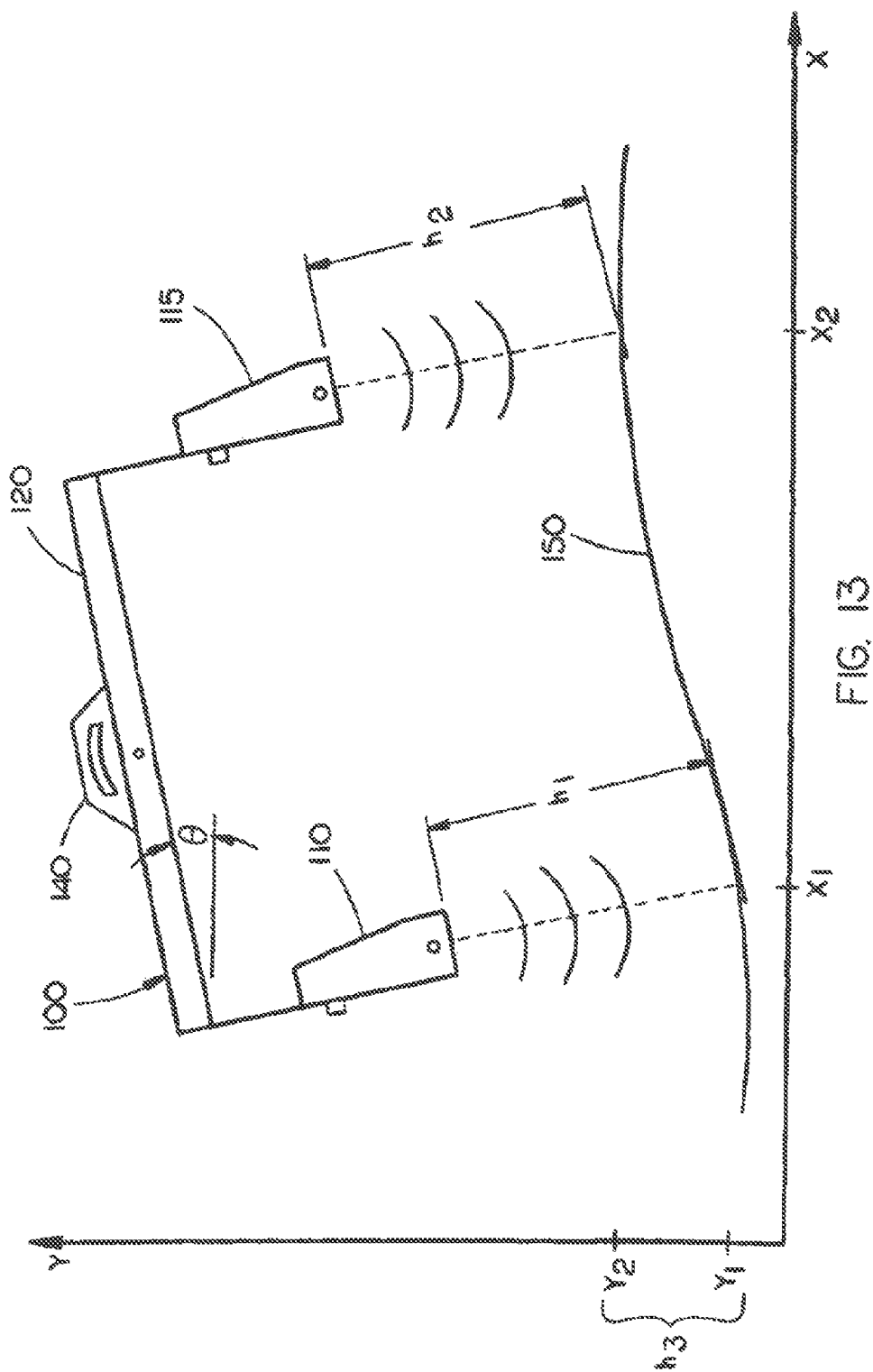
FIG. 13 is a side elevation view of the sensor assembly illustrated in FIG. 12, wherein the sensor assembly is shown in operation at an angle θ.

The elevation of the road surface 150 as determined by the forward elevation distance sensor 115 is calculated utilizing the known elevation at the point sensed by rear elevation distance sensor 110. The method is carried out by calculating the vertical distance from the road surface to the rear end of beam 120, then the distance from the rear end of beam 120 to the forward end, then the vertical distance from the forward end of beam 120 to the road surface sensed by the forward sensor 115. The orientation of the sensing apparatus is shown in FIG. 13. In practice, the calculation is as follows:

$$y_2 = y_1 + (h_1 - h_2)\cos\theta + d\sin\theta$$

where the subscript 1 is for the rear sensor, and the subscript 2 is for the forward sensor. The x (horizontal) coordinate for the forward sensor is also required for later reference. This is found by:

$$x_2 = x_1 + (h_2 - h_1)\sin\theta + d\cos\theta$$

The coordinates $(x_1, y_1)$ and $(x_2, y_2)$ are depicted in FIG. 13. However, the instantaneous x coordinate of the rear sensor is not immediately known. This may be calculated according to the equation below:

$$x_1^n = x_1^{n-1} + \Delta s^n \cos\left[\frac{1}{2}(\theta^{n-1} + \theta^n)\right] - (h_1^{n-1} + l)\sin\theta^{n-1} + (h_1^n + l)\sin\theta^n + \frac{1}{2}d(\cos\theta^{n-1} - \cos\theta^{n-1})$$

where the superscript n−1 refers to the previous location of beam 120, while superscript n is for the present location of beam 120.

The coordinates $(x_2, y_2)$ are recorded, the beam 120 translated another increment, Δs 170, and the process repeated until the end of the surface of interest is reached. Interpolation, such as a polynomial spline fit of the data, may be performed to estimate the coordinates of the road surface 150 between the measured points. From the data, roughness indices may be calculated/output. The data may be displayed as a trace or profile.

Figure 15:
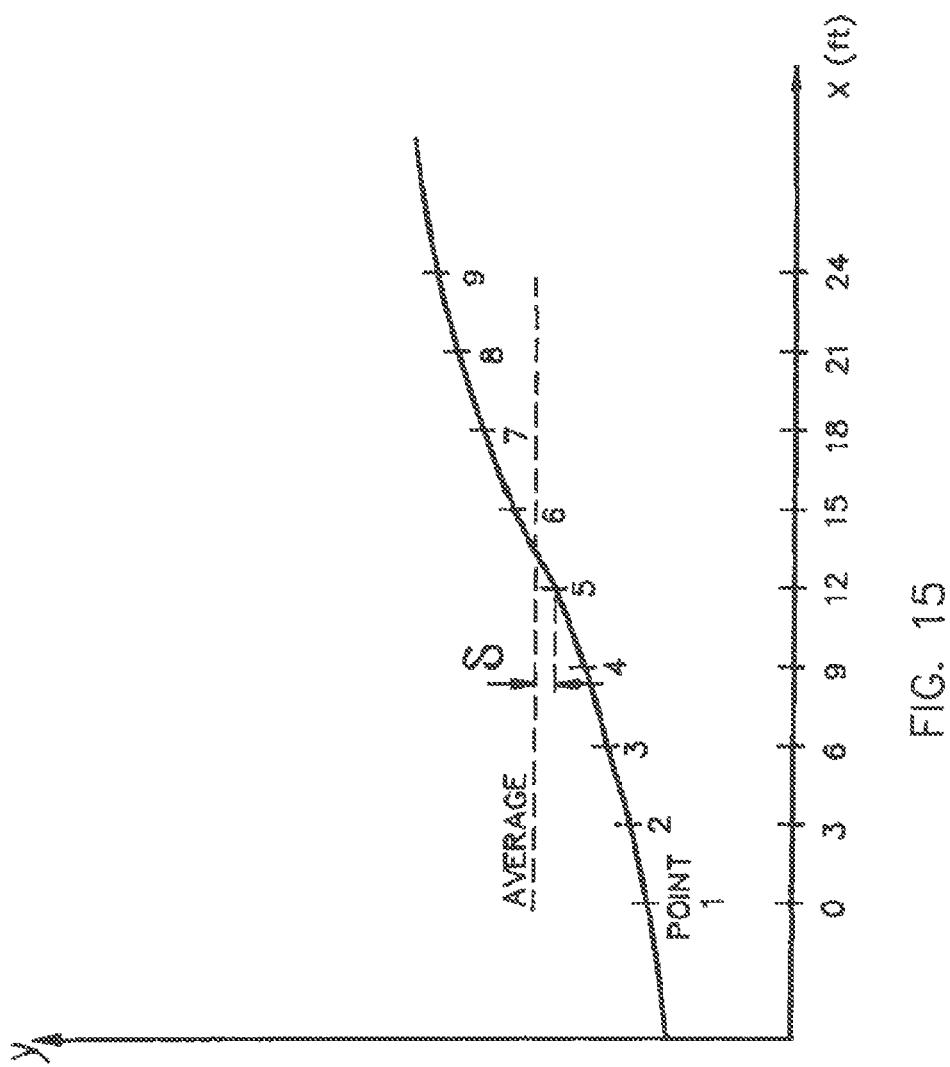
FIG. 15 is a side elevation view illustrating a profile of a road surface in accordance with an exemplary embodiment of the present invention, wherein the road surface is marked off in a series of horizontal increments, and an average elevation between the increments, δ, is shown.

A result may be calculated, in a fashion analogous to the measurement made by a twenty five foot, eight wheeled profilograph (see FIG. 15). Using the recorded (x, y) data, nine points three feet apart (for instance) are selected or calculated by interpolation. An arithmetic average is taken of eight of the elevations (y values)—all except the elevation for point 5 ($y_5$). Then the vertical distance between point 5 and the average is taken as the profilograph output for point 5 (at $x_5$). A continuous profilograph output may be interpolated between discrete measurement points.

To determine the road surface elevation profile, we begin with a known or estimated road surface elevation profile throughout an initial increment, $x_0 \leq x < x_0 + d\cos\theta^0$ where $x_0$ is an arbitrary starting coordinate, and d 130 is the beam length, and $\theta^0$ is the initial angle of the beam 120 measured from the horizontal as shown in FIG. 13. Initial angle $\theta^0$ is as measured by slope sensor 140.

In the present example, the smoothness indicator 10 measures a surface profile by interleaving a series of discrete profiles measured by the sensor assembly 100. For example, at the start of an elevation profile, the first and second ultrasonic sensors 110 and 115 measure an elevation difference at a first position $P_1$ relative to the road surface 150. A first elevation measurement $y_1^{n-1}$ is assigned to the first location $(x_1^{n-1}, y_1^{n-1})$ on the road surface 150, measured by the first ultrasonic sensor 110 (in this case, the trailing sensor relative to the direction of travel); and an elevation difference between the first location $(x_1^{n-1}, y_1^{n-1})$ and the second location $(x_2^{n-1}, y_2^{n-1})$ on the road surface, measured by the second ultrasonic sensor 115 (in this case, the leading sensor), is added to the first elevation $y_1^{n-1}$ to calculate a second elevation measurement $y_2^{n-1}$ for the second location $(x_2^{n-1}, y_2^{n-1})$ on the road surface 150. In embodiments, the first elevation measurement $y_1^{n-1}$ assigned to the first location $(x_1^{n-1}, y_1^{n-1})$ measured by the trailing sensor is zero, and it is assumed that the sensor assembly 100 is starting on a level surface. In other embodiments, the smoothness indicator 10 allows the user to enter initial elevation data for the location measured by the trailing sensor. Additionally, GPS data or the like may be utilized to assign an elevation to an initial location measured by the trailing sensor.

Figure 14:
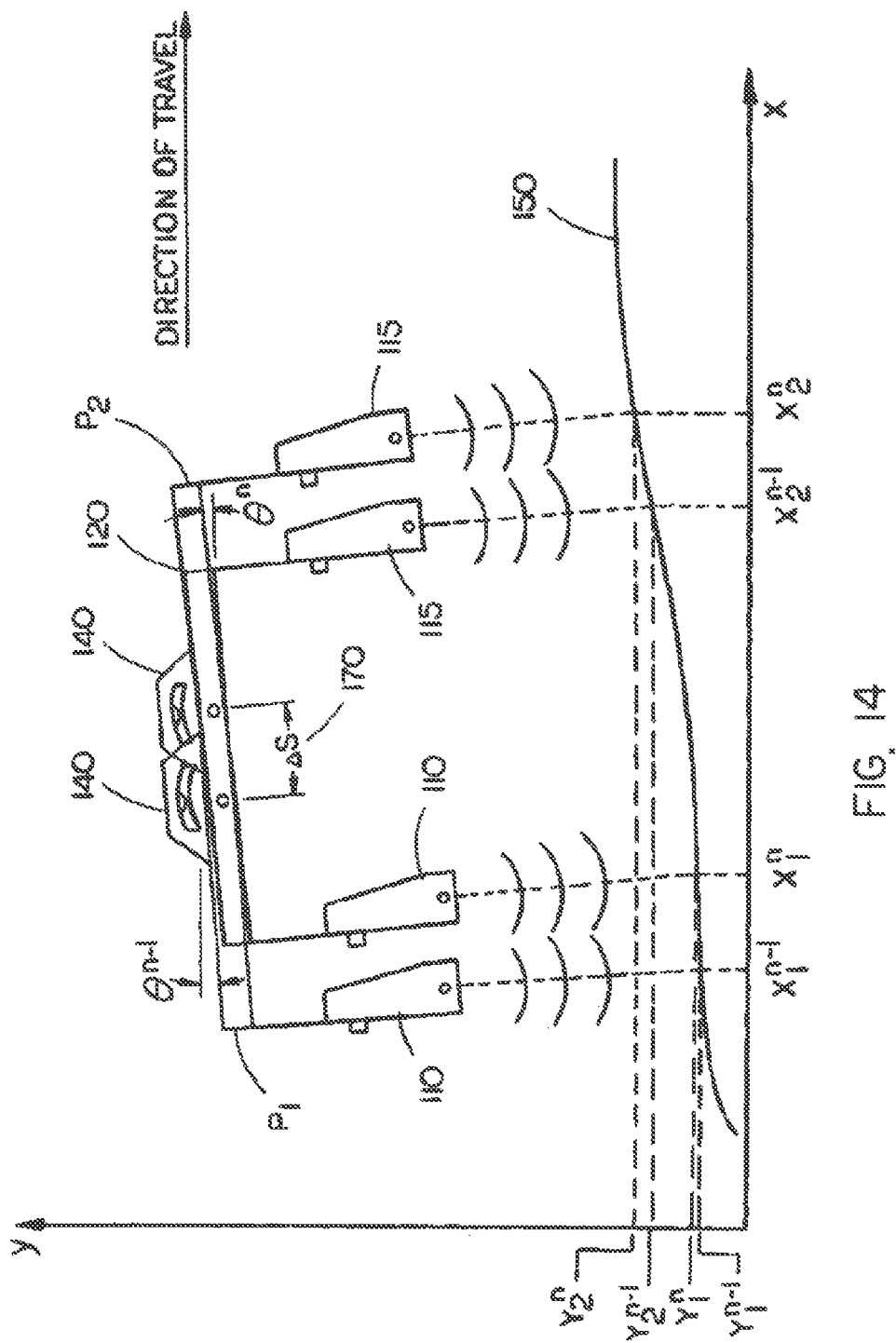
FIG. 14 is a side elevation view of the sensor assembly illustrated in FIG. 12, wherein the sensor assembly is shown in operation at a first position $P_1$ and a second position $P_2$.

The sensor assembly 100 is moved in the direction of travel (e.g. from left to right with respect to FIGS. 12 and 13) an incremental horizontal distance less than or equal to $d\cos\theta^0$. This increment is denoted Δs 170 as shown in FIG. 14. A travel distance sensor (such as 710, FIG. 1) is utilized to measure the distance traveled by the sensor assembly 100. At this point, rear elevation distance sensor 110 senses the road surface 150 at a location for which the elevation is known (or assumed). Forward elevation distance sensor 115 senses the surface 150 at a new location—one for which the elevation has not yet been calculated.

In order to generate a profile for a surface, the elevation differences are correlated to distances between measurement positions. For example, elevation differences are measured by the first and second ultrasonic sensors 110 and 115 between pairs of locations at first and second positions $P_1$ and $P_2$, along the direction traveled by the sensor assembly 100. In order to determine distances between these positions, an elevation distance sensor is used. For instance, a pulse pickup (PPU) embedded in a drive motor is utilized to measure longitudinal distances between the first and second positions $P_1$ and $P_2$. Alternatively, a separate distance wheel may be included for determining distances between the positions. Those of skill in the art will appreciate that various techniques may be used for determining distances between the first and second positions $P_1$ and $P_2$ as desired.

The first and second ultrasonic sensors 110 and 115 travel longitudinally along a path (e.g. the road) to the second position $P_2$, for generating the surface profile. Upon reaching the second position $P_2$, another set of measurements are obtained. An initial elevation measurement $y_1^n$ is again assigned to a third location $(x_1^n, y_1^n)$ on the road surface 150, measured by the first ultrasonic sensor 110 at the second position $P_2$; and an elevation difference between the third location $(x_1^n, y_1^n)$ and a fourth location $(x_2^n, y_2^n)$ on the road surface, measured by the second ultrasonic sensor 115 at the second position $P_2$, is added to the initial elevation measurement $y_1^n$, as described above, for determining an elevation measurement $y_2^n$ for the fourth location $(x_2^n, y_2^n)$ on the road surface 150. This process is repeated until the sensor assembly 100 has traveled the pre-selected distance d 130, at which point elevation measurements assigned to locations measured by the trailing sensor comprise elevation measurements made by the leading sensor. In further embodiments, the elevation measurements are averaged over distance intervals, and an average elevation measurement for each interval is stored. For example, the elevation measurements are averaged over 2-inch intervals and stored. In this manner, data storage may be minimized. Additionally, the use of elevation measurements averaged over distance intervals may provide a smoothing and filtering effect.

Figure 16:
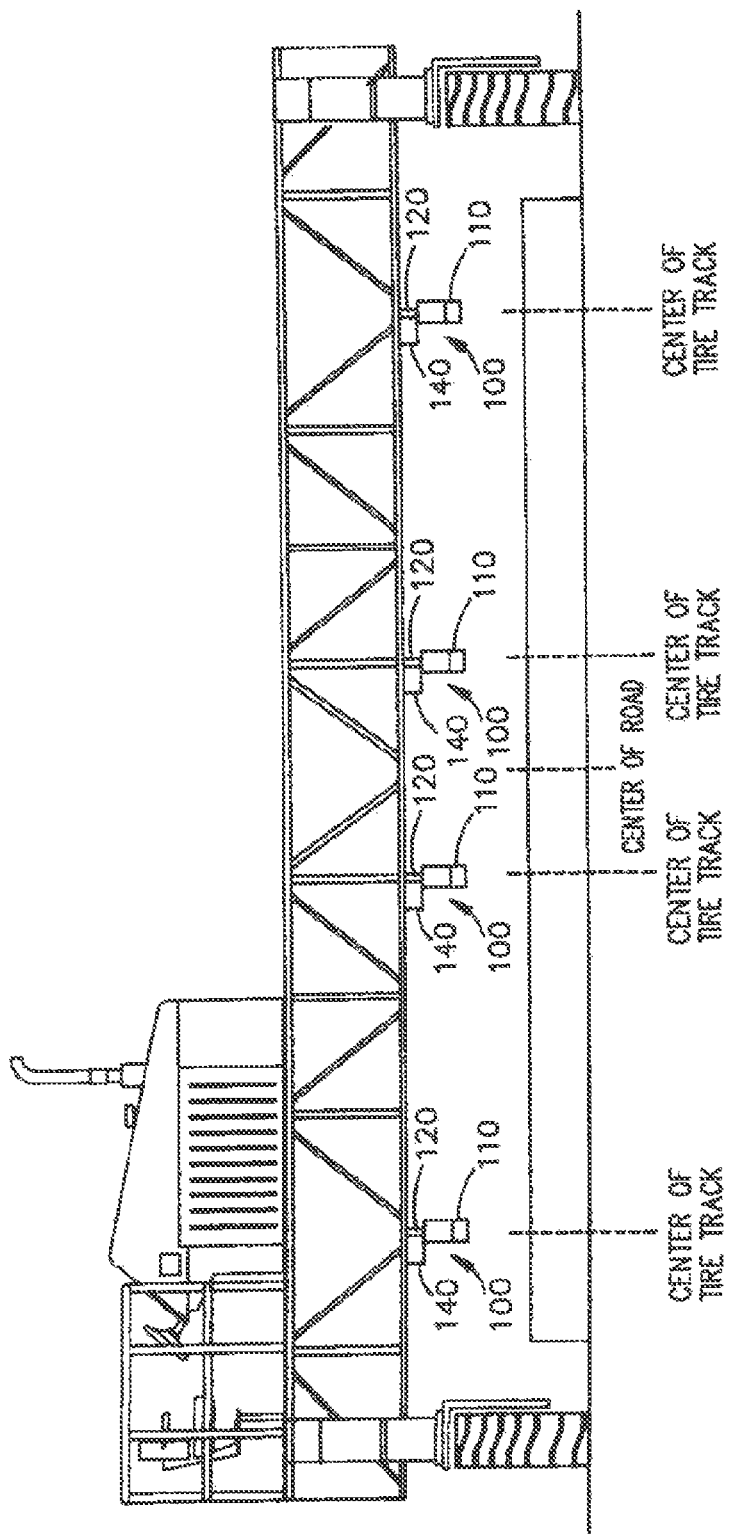
FIG. 16 is an end elevation view illustrating a smoothness indicator in accordance with a further exemplary embodiment of the present invention, wherein the smoothness indicator includes a series of sensor assemblies positioned over tire track locations on a road surface.

The translating of the sensor assembly 100 may be carried out in several ways, and the present invention is not to be limited to a particular mode of translation. For example, a plurality of sensor assemblies 100 are mounted on the rear of a road paving machine. This permits adjustment of the paving machine as surface variations are detected. Also, variations may be corrected while the concrete is in a plastic state. Referring to FIG. 16, a dedicated rig is employed. Again, a plurality of sensor assemblies 100 are utilized to provide a profile of the road surface, such as the expected lanes traveled by a vehicle's tires.

As discussed, the elevation profile for an initial portion of the surface may be known, estimated, or assumed, such as by utilizing a generally flat section, on the interval $x_0 \leq x < x_0 + d \cos \theta^0$.

One of the ways the surface can be obtained in this region is to assume the surface is flat for a distance equal to the distance between the first and second sensors. The difference between the actual elevation at each point and the assumed surface will reappear as errors in the elevation (y values) on each interval following the initial one. There are two options for improving the resulting surface estimate:

1. Remove the resulting errors with a low-pass filter by passing the entire elevation profile through a low-pass filter algorithm with a cutoff wavelength longer than d—thus diminishing the error.
2. Attempt to remove the error by determining a Taylor Series or Fourier Series most highly correlated to the y(x) values in every interval of the surface profile.

In additional examples, the initial surface is obtained by laying a known flat plate having a length greater than d 130 such that it lies under both elevation distance sensors at the initial location. Deviations from this flat plate are measured.

Figure 17:
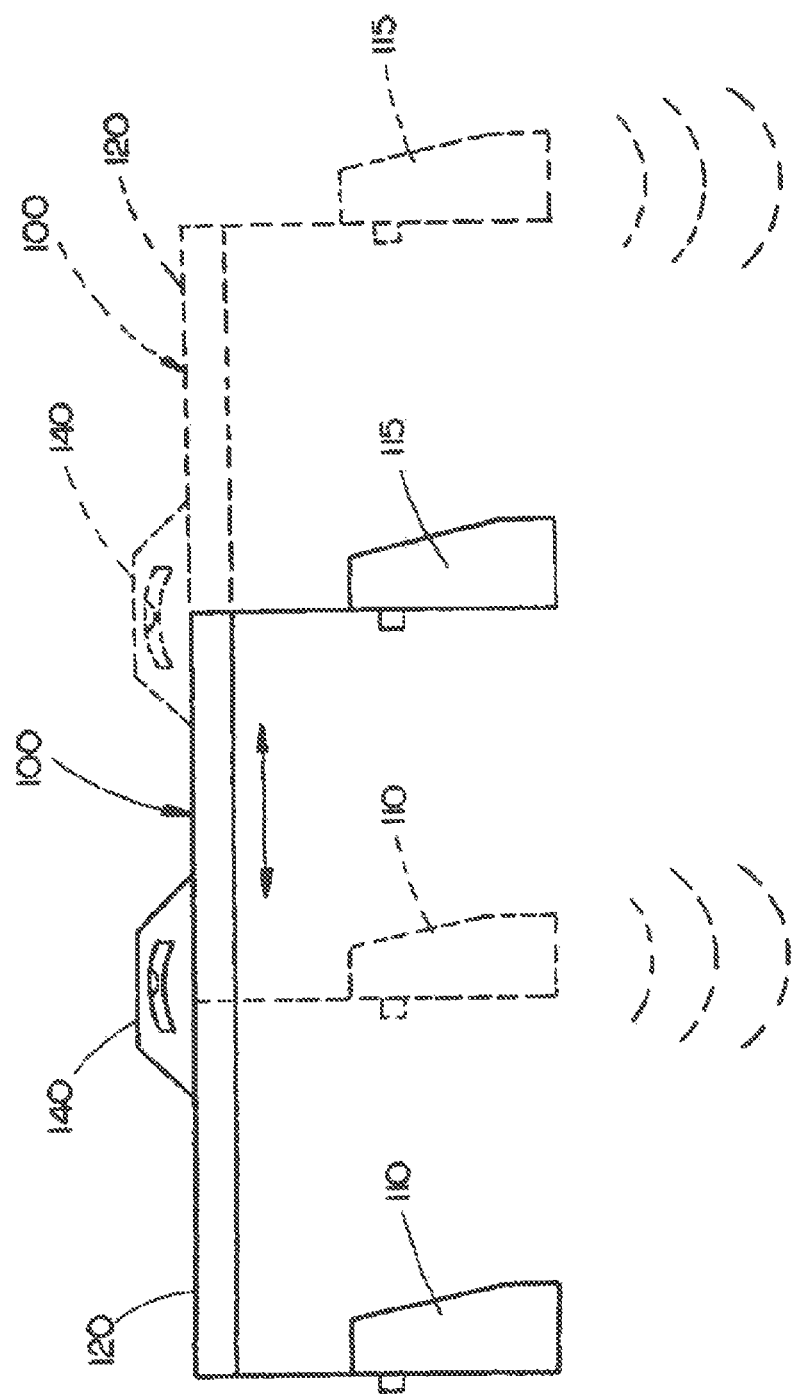
FIG. 17 is a side elevation view illustrating translation of a sensor assembly for use with a smoothness indicator in accordance with an exemplary embodiment of the present invention.

Obtaining an initial surface elevation profile is depicted in FIG. 17. In this alternative, translation of the sensor assembly occurs over a distance of at least d cos $\theta^0$ without movement of the vehicle on which the assembly is mounted, such as by a mechanical actuator/carriage assembly. In this manner, the angle, $\theta$, is unchanging throughout the process. An additional translation sensor (710 of FIG. 1, for instance) to measure the distance traversed must be included in the apparatus. For this approach, the required distance of translation would only be ½ d cos $\theta^0$ because both sensors may be utilized. The coordinates of the rear sensor are calculated as follows $$x_1^n = x_1^{n-1} + \Delta s^n \cos \theta$$

$$y_1^n = y_1^{n-1} + \Delta s^n \sin \theta + (h_1^n - h_2^n) \cos \theta$$

where $\Delta s$ is measured by the additional translation sensor. The superscripts are defined as above. The coordinates for the front sensor are given as $$x_2^n = x_1^n + d \cos \theta$$

$$y_2^n = y_1^n + (h_1^n - h_2^n) \cos \theta + d \sin \theta$$

Figure 18:
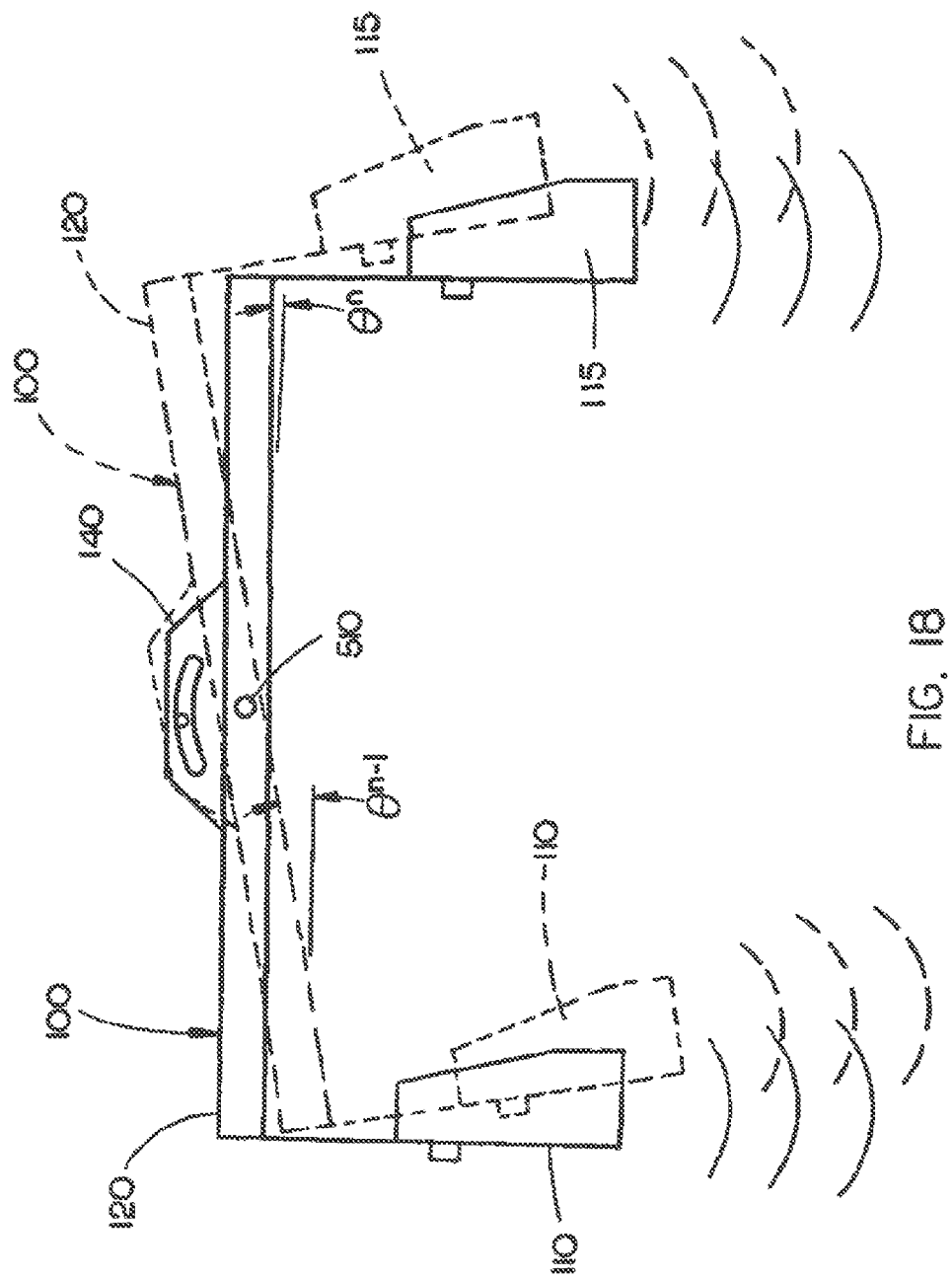
FIG. 18 is a side elevation view illustrating rotation of a sensor assembly for use with a smoothness indicator in accordance with a further exemplary embodiment of the present invention.

Finally, the beam 120 can be rotated parallel to a (roughly) vertical plane about its center (the actual point of rotation is arbitrary, but for the following analysis, the center is the assumed point of rotation). No translation is to take place during this process. FIG. 18 is a depiction of this method. Let 0 be the initial orientation of the beam, and 1, 2, . . . , n−1, n, . . . , N be successive angles at which discrete measurements are taken.

To determine the rear elevation distance sensor's final location, $$x_1^1,$$

relative to its initial location $$x_1^0,$$

the horizontal distance from the initial location to the beam's center, then back to the final location, is calculated. Referring to FIG. 18 for nomenclature, the location of $$x_1^1$$

is calculated as:

$$x_1^1 + x_1^0 - (h_1^0 + l) \sin \theta^0 + (h_1^1 + l) \sin \theta^1 + \frac{1}{2} d (\cos \theta^0 - \cos \theta^1)$$

The corresponding y location, $$y_1^1,$$

relative to the initial y location, $$y_1^0,$$

is determined calculating the vertical distance from the initial location to the beam's center, then back to the final location, thus:

$$y_1^1 = y_1^0 - (h_1^0 + l) \sin \theta^0 + (h_1^1 + l) \sin \theta^1 + \frac{1}{2} d (\cos \theta^0 - \cos \theta^1)$$

At the same time, the rear sensor 110 can be measuring the road surface as the beam is rotated. The coordinates when $\theta = \theta^0$ are calculated thus:

$$x_2^0 = x_1^0 + (h_2^0 - h_1^0) \sin \theta^0 + d \cos \theta^0$$

$$y_2^0 = y_1^0 + (h_1^0 - h_2^0) \cos \theta^0 + d \sin \theta^0$$

Then, as the beam is rotated, the coordinates from both sensors are calculated as:

$$x_1^n = x_1^{n-1} + (h_1^{n-1} + l) \sin \theta^{n-1} + (h_1^n + l) \sin \theta^n + \frac{1}{2} d (\cos \theta^{n-1} - \cos \theta^n)$$

$$x_2^n = x_1^n + (h_2^n - h_1^n) \sin \theta^n + d \cos \theta^n$$

$$y_1^n = y_1^{n-1} + (h_1^{n-1} + l) \cos \theta^{n-1} + (h_1^n + l) \cos \theta^n + \frac{1}{2} d (\sin \theta^{n-1} - \sin \theta^n)$$

$$y_2^n = y_1^n + (h_1^n - h_2^n) \cos \theta^n + d \sin \theta^n$$

In the foregoing manner, an elevation profile is an interleaved series of discrete profiles. For instance, if elevation measurements are determined for pairs of locations at two-inch intervals, and the ultrasonic sensors are spaced three feet apart, 18 discrete profiles will be generated and interleaved together. Thus, elevation measurements for any two locations spaced two inches apart will be independent of each other. Those of skill in the art will appreciate that the spacing of the first and second ultrasonic sensors 110 and 115, the distance between measurements taken by the sensors, and the number of discrete profiles generated may vary as desired.

Because the surface profile generated by the smoothness indicator 10 is an interleaved series of discrete profiles, it will be appreciated that random errors introduced in the course of measuring elevation differences between series of locations will propagate, accumulating to form errors for the interleaved series of discrete profiles which may exceed errors for the elevation measurements of a single profile. Those of ordinary skill in the art will appreciate that this may generate an error band for the interleaved series of measurements larger than that for a single profile.

In exemplary embodiments, an incremental spatial filter is applied when generating a surface profile. For example, a single-pole low-pass spatial filter is utilized to generate a filtered profile of the surface (such as a spatial filter utilizing a nine-inch length constant). For example, a series of elevation differences are measured by the first ultrasonic sensor 110 and the second ultrasonic sensor 115, and the elevation differences are used to calculate an average elevation measurement over an initial two-inch interval. The average elevation measurement for the initial two-inch interval is then filtered, such as by comparing it to an elevation measurement for a second two-inch interval adjacent to the initial interval. In the current example, a surface profile is post-filtered, or filtered upon completion of the profile's elevation measurements; while in another embodiment, the surface profile is incrementally filtered, wherein each new elevation measurement for the profile is filtered before being stored. Those of skill in the art will appreciate that other filters may be used to alter, correct, and/or modify elevation measurements, for increasing the relative accuracy of the measurements, without departing from the scope and intent of the present invention.

Surface profile data measured by the smoothness indicator 10 may be used for deriving information about a surface. In exemplary embodiments, the surface profile data is used to identify a must-grind bump, a bump which must be reduced and/or eliminated from the surface (e.g. to meet construction specifications). For example, the smoothness indicator 10 may use hardware and/or software installed in an information handling system device, such as a portable computer assembly, to identify a must-grind bump. In embodiments, the smoothness indicator 10 includes a mechanical assembly for marking or identifying the must-grind bump, such as by painting a mark at the location of the bump. Other techniques may be used to identify a must-grind bump as desired. Additionally, other surface irregularities may be noted, such as low spots.

An advantage of the present system is that a surface irregularity may be indicated and corrected while the road surface 150 is still in a plastic state. It will be appreciated that a dedicated smoothness indicator 10 may be used to identify a surface irregularity, such as a must grind bump; and the bridge rig assembly 12 may be reversed to allow for smoothing of the road surface 150. Upon smoothing and/or elimination of the irregularity, the smoothness indicator 10 may be moved over the feature to verify that it has been reduced and/or eliminated and to provide a profile of the corrected segment. This process may be repeated as required. In exemplary embodiments of the present invention, surface profile data acquired for the surface irregularity before it has been reduced and/or eliminated is replaced by data from a second pass, a third pass, or another pass over the irregularity. In this manner, data stored by the smoothness indicator reflects the actual surface profile of the road surface 150, such as for a 1/10 mile road segment. However, it is contemplated that initial measurement data for the feature may be retained by the smoothness indicator 10 for measuring the effectiveness of the corrective operation, for personnel training or the like.

In another embodiment, a surface profile is taken of the road surface 150, and elevation measurements determined for the surface are stored by the smoothness indicator, such as by a Random Access Memory (RAM), a Read-Only Memory (ROM), a magnetic diskette, and/or removable media, such as a floppy disk. These elevation measurements may be utilized to determine must-grind bumps or other surface irregularities upon completion of the elevation profile. In combination with station marker data, which may be stored along with elevation measurements, the stored data may be retrieved and examined, such as by hardware or software, to identify must-grind bumps. An operator may identify the bumps via station marker data, location data, or other data stored as part of the surface profile, for identifying the location of the surface irregularity. Those of skill in the art will appreciate that other information may be determined upon completion of the profile, such as low spots, Profile Index data, International Roughness Index data, Gomaco Smoothness Indicator Index data, or the like.

The surface profile data is analyzed to provide data in various formats. In embodiments, surface profile measurements are utilized to produce a simulated profilograph output (FIG. 15). For example, a California Profilograph output may be generated. Additionally, Profile Index values may be calculated. Measurements may also be utilized to calculate International Roughness Index values, which simulate travel of a theoretical "golden car" over the road surface 150. Typically, index values such as Profile Index values and International Roughness Index values are computed for set intervals, such as between station markers. Another advantage of the smoothness indicator 10 of the present invention is that it allows for the calculation of index values, such as Gomaco Smoothness Indicator Index values, over a user-defined interval, such as an interval of one-tenth of a mile, for instance. Additionally, the user-defined interval may be centered on any point within the profile. Those of skill in the art will appreciate that surface profile measurements may be formatted in a wide variety of ways.

Figure 19:
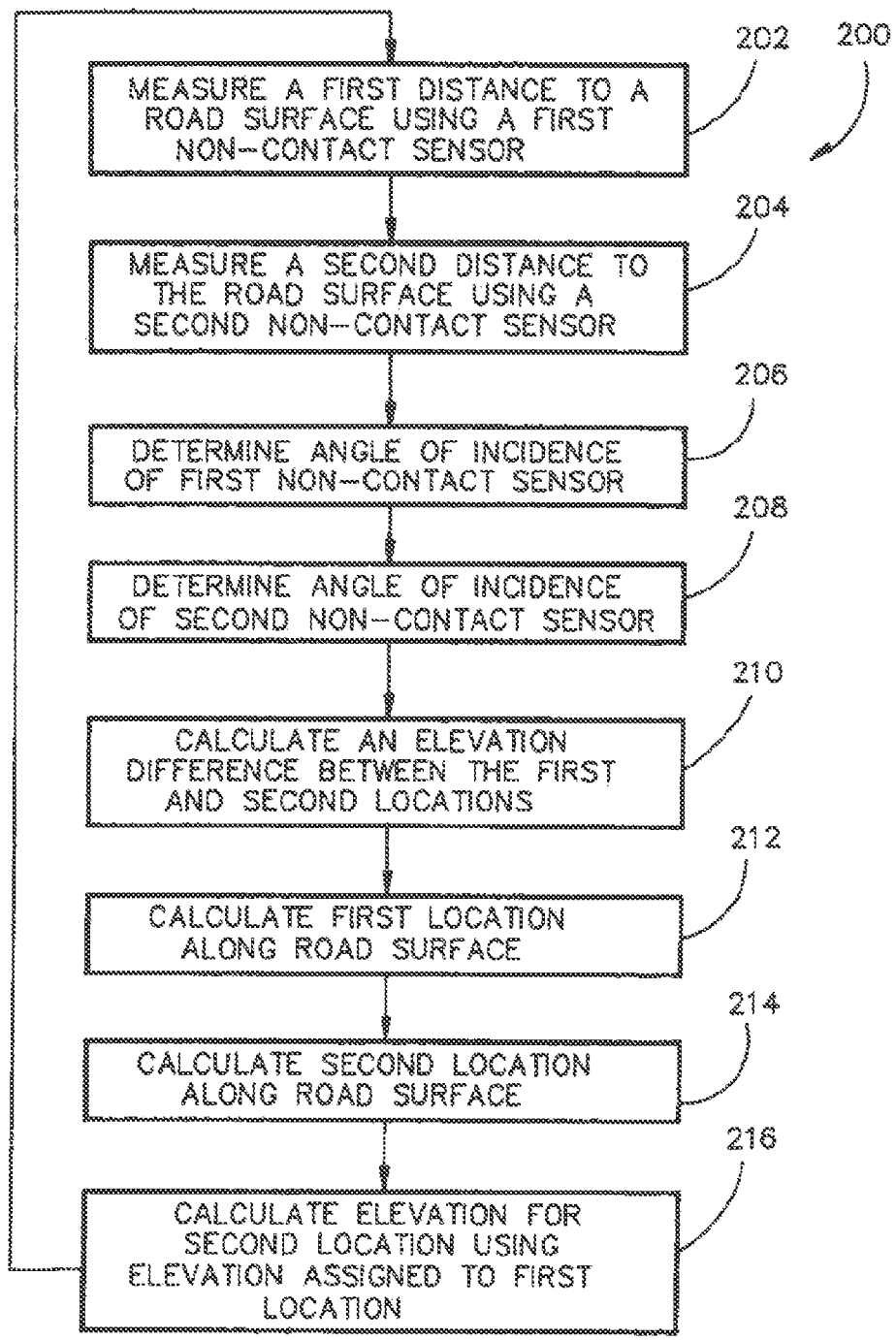
FIG. 19 is a flow diagram illustrating a method for profiling a surface in accordance with an exemplary embodiment of the present invention.

Referring now to FIG. 19, a method 200 for determining an elevation profile in accordance with an embodiment is described. In step 202, a first non-contact elevation distance sensor, such as the first ultrasonic sensor 110, measures a first distance to a surface, such as the distance $h_1$ to the road surface 150, at a first location, such as the location $(x_1, y_1)$. In step 204, a second non-contact elevation distance sensor, such as the second ultrasonic sensor 115, measures a second distance to the surface, such as the distance $h_2$ to the road surface 150, at a second location, such as the location $(x_2, y_2)$. In step 206, a first angle of incidence for the first ultrasonic sensor 110 relative to a horizontal plane is determined, such as by measuring angle θ using slope sensor 140. Then, in step 208, a second angle of incidence for the second ultrasonic sensor 115 relative to the horizontal is determined (such as by measuring angle θ using slope sensor 140). In step 210, an elevation difference, such as elevation difference $h_3$, is calculated between the first and second locations, using the first and second distances and the first and second angles of incidence. Next, in step 212, the first location $(x_1, y_1)$ along the road surface 150 is calculated using the first distance and the first angle of incidence. Likewise, in step 214, the second location $(x_2, y_2)$ along the road surface 150 is calculated using the second distance and the second angle of incidence. Finally, in step 216, the elevation of the second location $(x_2, y_2)$ is calculated using an elevation assigned to the first location $(x_1, y_1)$, for generating an elevation profile of the road surface.

Figure 20:
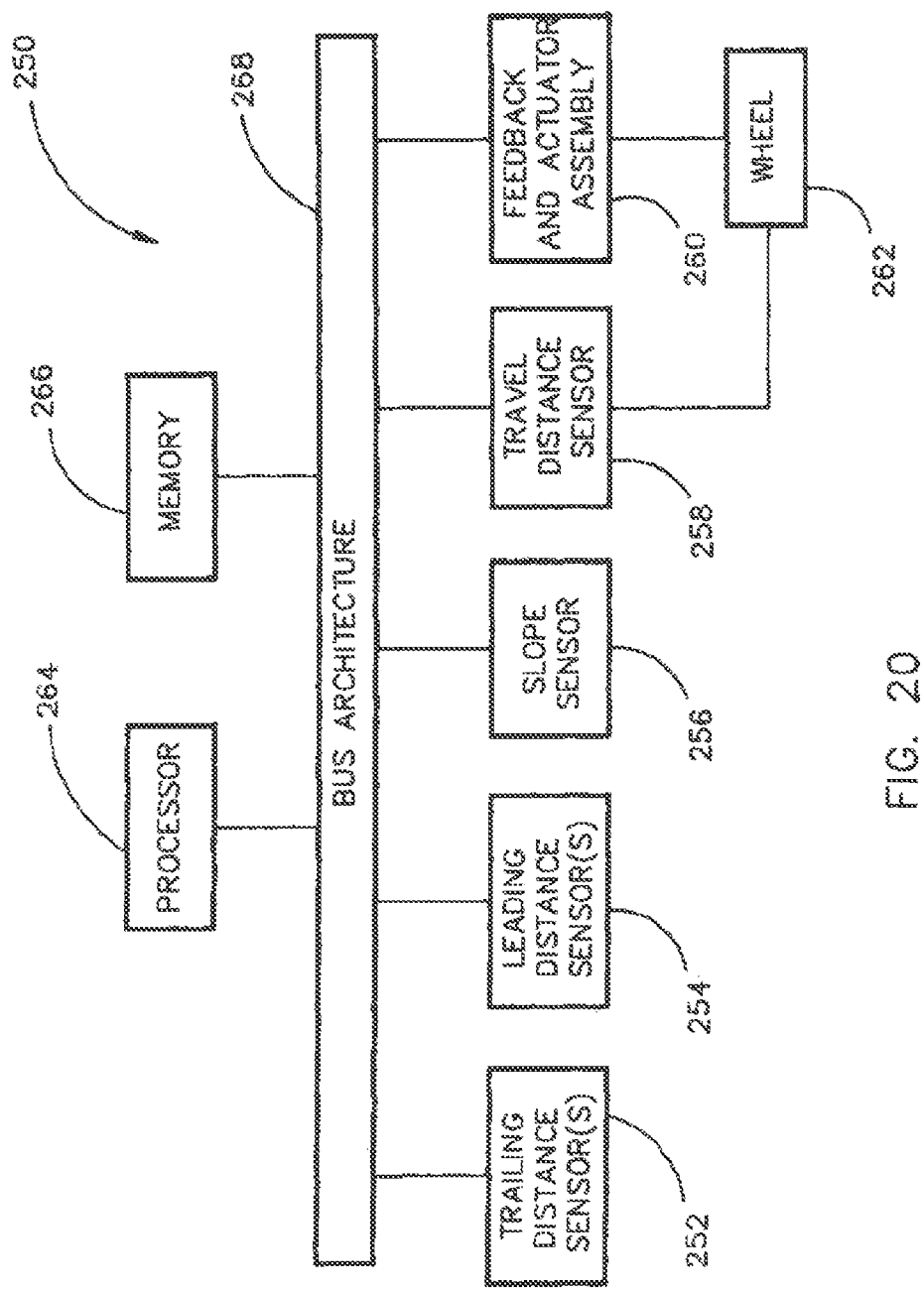
FIG. 20 is a system diagram illustrating a smoothness indicator in accordance with another exemplary embodiment of the present invention.

Referring to FIG. 20, a smoothness indicator 250 in accordance with an exemplary embodiment of the present invention is described. The smoothness indicator 250 includes a first elevation distance sensor 252, a second elevation distance sensor 254, a slope sensor 256, a travel distance sensor 258, a feedback and actuator assembly 260 coupled with a wheel 262, and a processor 264 coupled with a memory 266, interconnected in a bus architecture 268. The first and second elevation distance sensors 252 and 254 are non-contact sensors, such as ultrasonic sensors, laser sensors, or the like. In one embodiment, the first and second elevation distance sensors are ultrasonic sensors, and they communicate measurements to the processor forty times per second. The slope sensor 256 is for measuring a slope from a horizontal plane of a line along which the ultrasonic sensors 252 and 254 are oriented. The travel distance sensor 258 is for measuring distances traveled, such as distances traveled by the wheel 262. The feedback and actuator assembly 260 uses control logic for controlling the wheel 262 via an actuator assembly. The processor 264 uses distance measurements taken by the first and second elevation distance sensors 252 and 254, in combination with slope measurements taken by the slope sensor 256, to calculate elevation differences between locations on a surface, such as the road surface 150 (FIG. 1). Additionally, the processor 264 communicates with the memory 266, storing and retrieving elevation measurements for calculating smoothness index values, Profile Index (PI) values, International Roughness Index (IRI) values, and other elevation measurements and indices. The processor 264 may also provide input to the feedback and actuator assembly 260. For example, the processor may be coupled with a contact sensor or an elevation distance sensor for tracking the location of a string line and moving the smoothness indicator 250 accordingly. Those of ordinary skill in the art will appreciate that a smoothness indicator may use various components without departing from the scope and intent of the present invention.

Referring generally to FIGS. 21 through 29, a graphical user interface 300 for the smoothness indicator 10 is described. The graphical user interface 300 may be displayed on a portable information handling system device, such as a personal computer, a dedicated processing assembly, or another similar machine.

Figure 21:
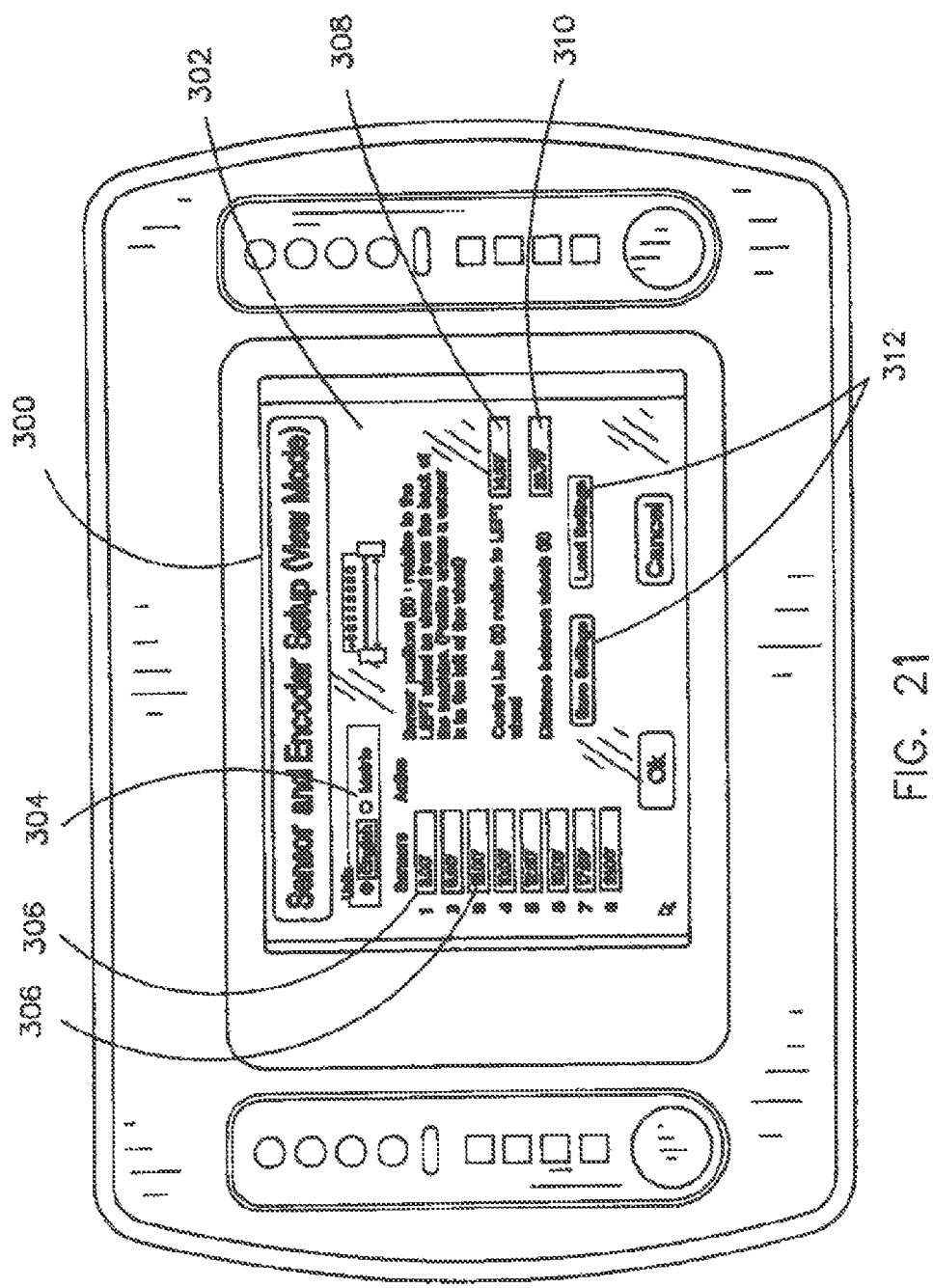
FIG. 21 illustrates a setup screen for a smoothness indicator graphical user interface in accordance with an exemplary embodiment of the present invention.

Referring to FIG. 21, a sensor and encoder setup screen 302 is described. The sensor and encoder setup screen 302 includes radio/selection buttons 304 for selecting English and/or metric units. A number of text entry boxes 306 may be included for allowing an operator to input the distances of sensor assemblies 100 relative to a wheel of the bridge rig assembly 12, such as a wheel 16 (FIG. 1), or the like. A second text entry box 308 is provided for entering the position of a control line relative to the wheel. A third text entry box 310 is provided for inputting the distance between wheels of the bridge rig assembly 12. Load and save buttons 312 are also included for recording and/or recalling information entered in the text boxes 306, 308, and 310. Other text entry boxes may be included for recording parameters for the smoothness indicator 10 and the like.

Figure 22:
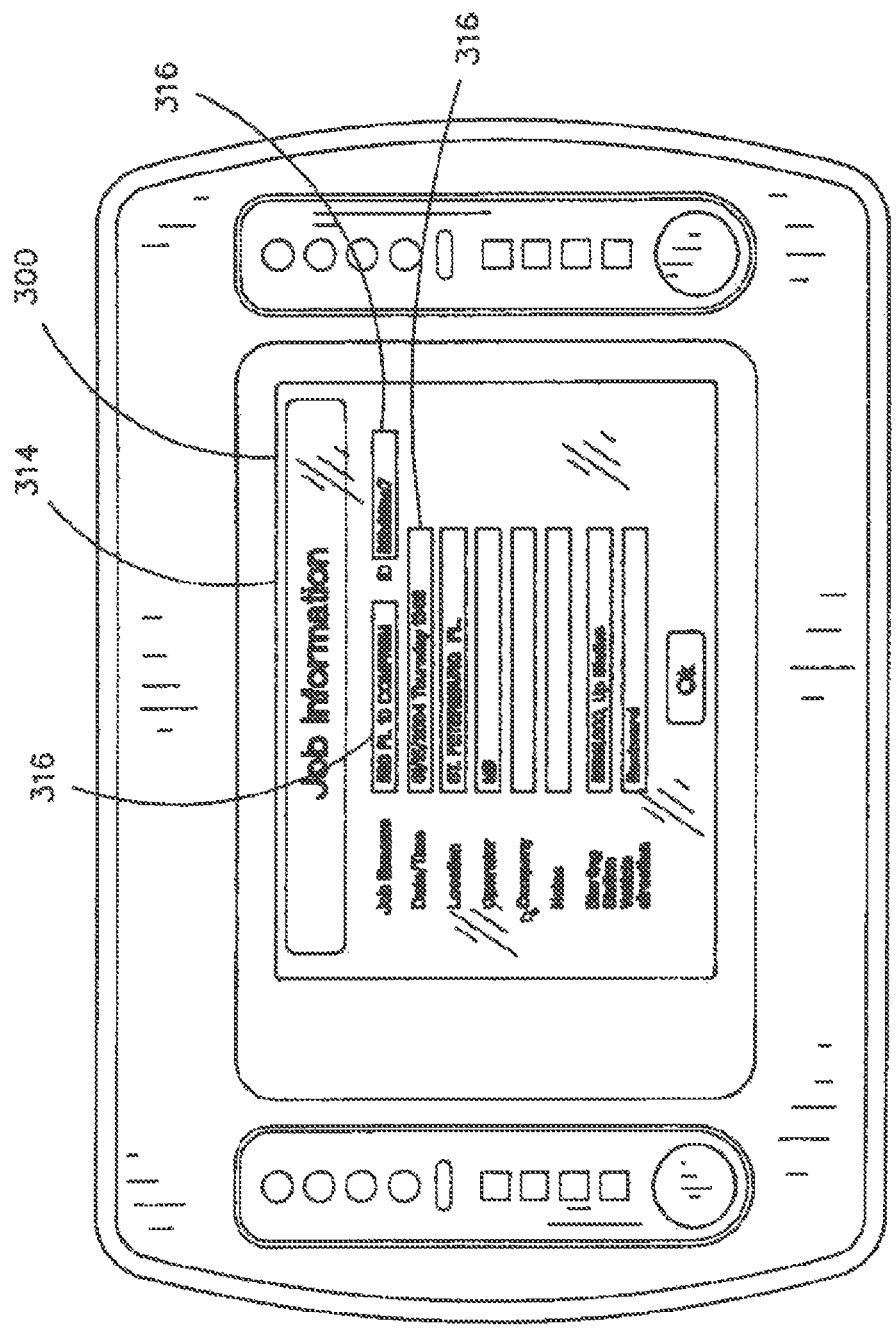
FIG. 22 illustrates a job information screen for the smoothness indicator graphical user interface shown in FIG. 21.

Referring now to FIG. 22, a job information screen 314 is described in accordance with an exemplary embodiment of the present invention. The job information screen 314 may include text entry boxes 316 for entering information about a particular profile, a particular job for which a profile is to be generated, and other information as desired. Information entered in the job information screen 314, may be stored and/or recorded with a surface profile to aid identification.

Figure 23:
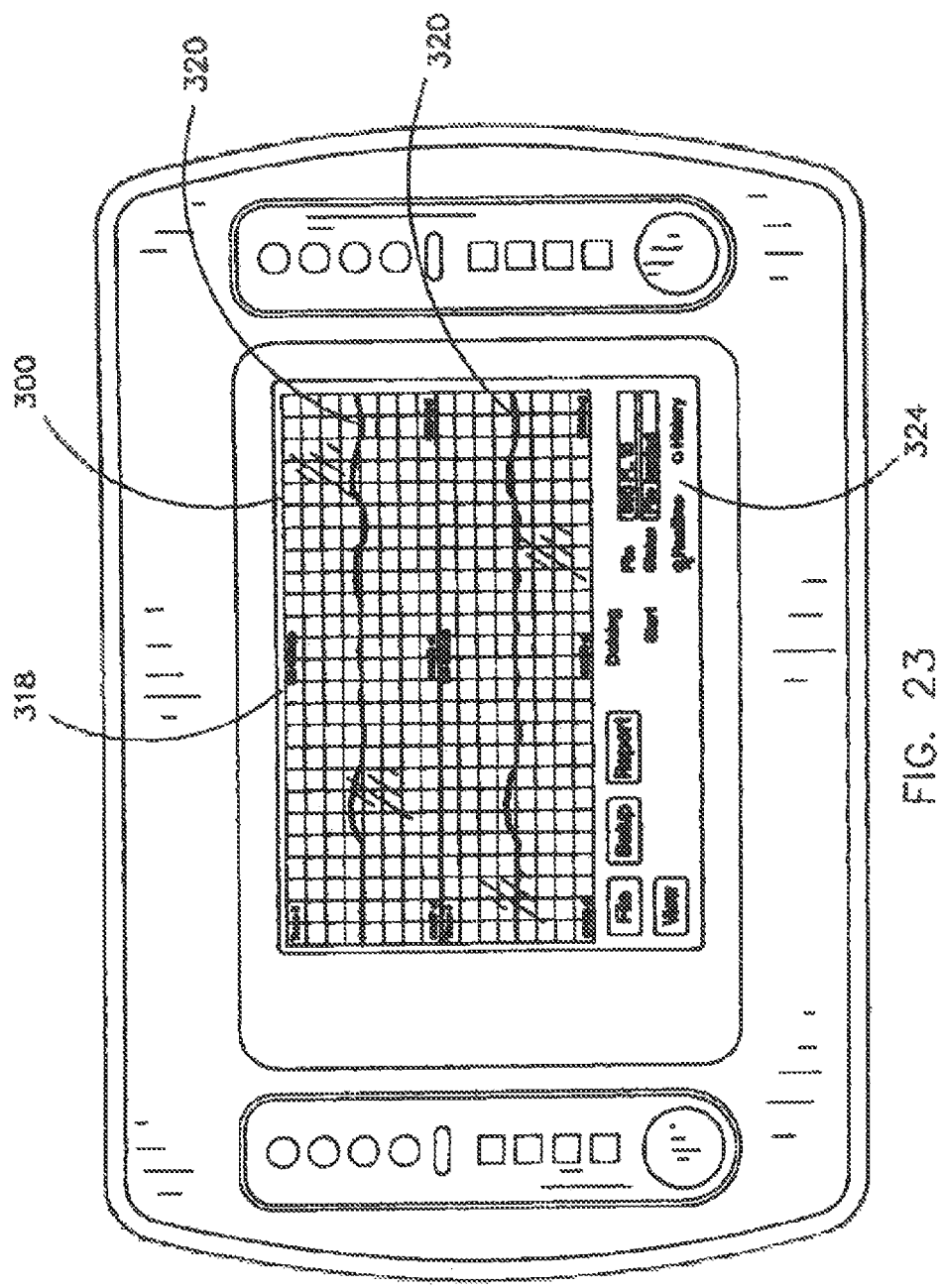
FIG. 23 illustrates two real time traces of a measured surface profile for the smoothness indicator graphical user interface shown in FIG. 21.
Figure 24:
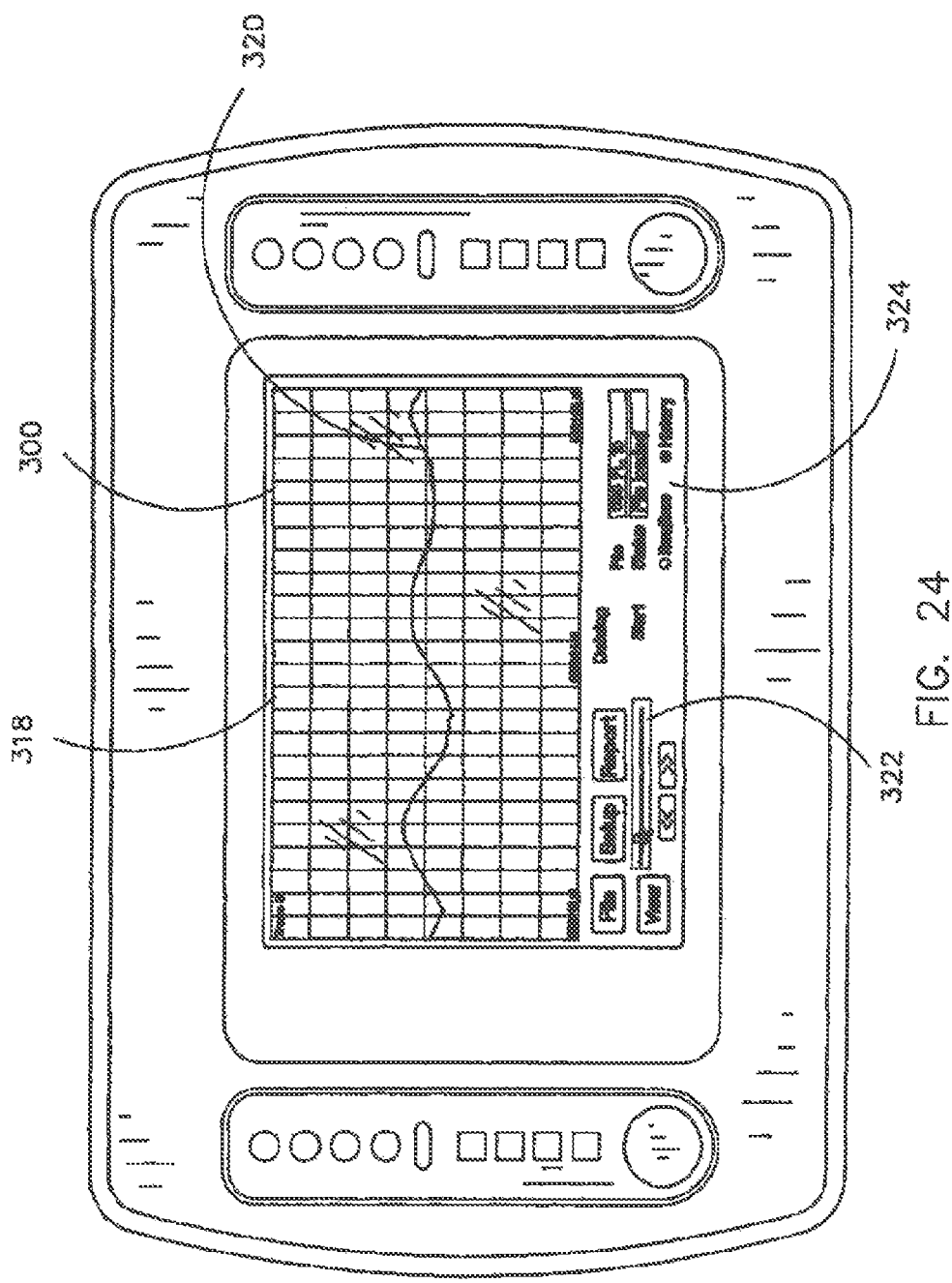
FIG. 24 illustrates a single trace of the measured surface profile for the smoothness indicator graphical user interface shown in FIG. 21, wherein a user of the smoothness indicator may view the single trace at a specified location.
Figure 25:
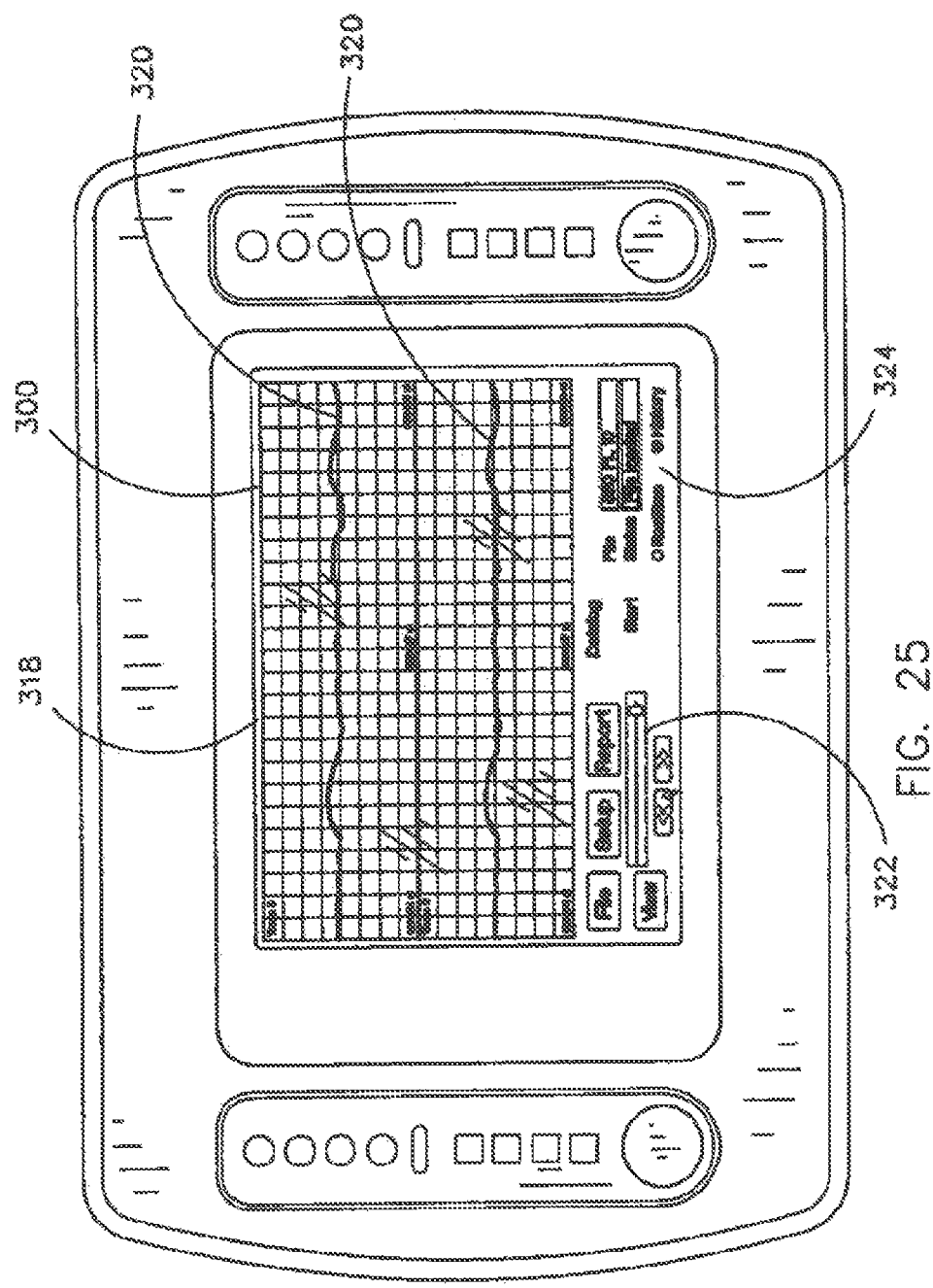
FIG. 25 illustrates two traces of the measured surface profile for the smoothness indicator graphical user interface shown in FIG. 21, wherein the user may view the traces at a specified location.

Referring to FIGS. 23 through 25, exemplary trace displays 318 are described. In embodiments, the trace displays 318 allow a user to dynamically view surface profile information from one or more elevation profiles. The trace displays 318 display surface profile data in graphical form such as by placing the data on a scale or the like. Indicators such as dashed lines may be superimposed on a trace 320, for indicating station markers relative to points on the trace 320. The trace displays 318 may include a slider bar 322, forward and reverse buttons, or similar functionality, for allowing an operator of the smoothness indicator 10 to observe surface profile data as desired. In this case, radio/selection buttons 324 are provided for selecting a real time display of a surface profile or allowing the operator to view the history of the surface profile. Other information such as a file name, a job description, or other identifying information may be included for identifying a surface profile. Two or more traces 320 may be displayed on the trace displays 318 at one time. For example, a first trace 320 may be located above a second trace 320 for comparison purposes. Alternatively, the first trace 320 may be superimposed in front of, or behind, the second trace 320. The traces 320 may be displayed in various formats without departing from the scope of the present invention.

Figure 26:
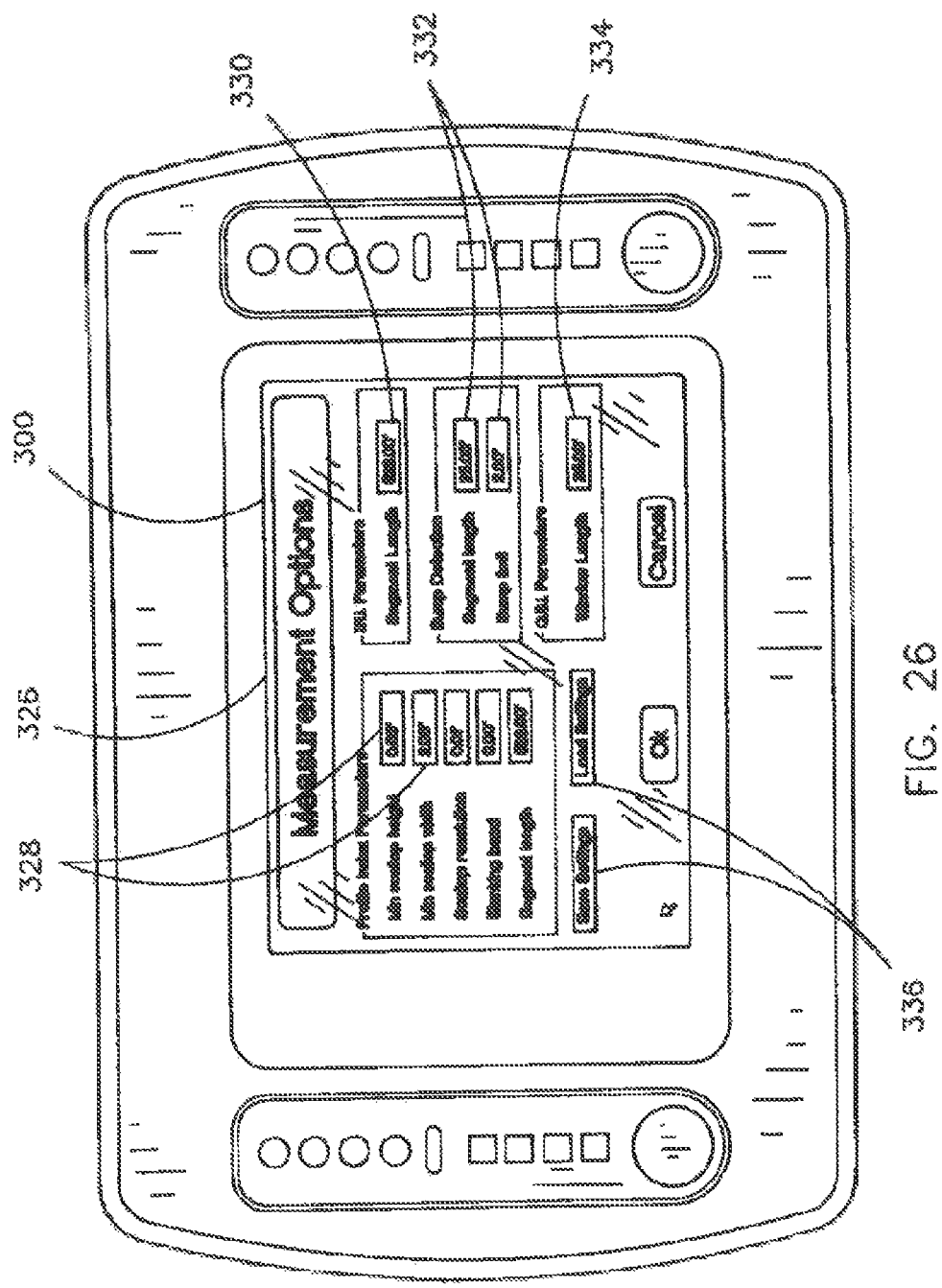
FIG. 26 illustrates a measurement options screen for the smoothness indicator graphical user interface shown in FIG. 21.

Referring now to FIG. 26, a measurement options screen 326 in accordance with an exemplary embodiment is described. The measurement options screen 326 includes text entry boxes 328 for entering Profile Index parameters, text entry boxes 330 for entering International Roughness Index parameters, text entry boxes 332 for entering bump detection parameters, and text entry box 334 for entering smoothness index parameters. The text boxes 328, 330, 332, and 334, may be used to enter relevant measurement information for calculating Profile Index data, International Roughness Index data, and smoothness index data. Additionally, these text boxes may be used for defining parameters for activating a bump alarm or another similar indication of a bump. Those of skill in the art will appreciate that various other parameters may be included on the measurement options screen 326 without departing from the scope and intent of the present invention. Load and save buttons 336 are also included for recording and/or recalling information entered in the text boxes 328, 330, 332, and 334.

Figure 27:
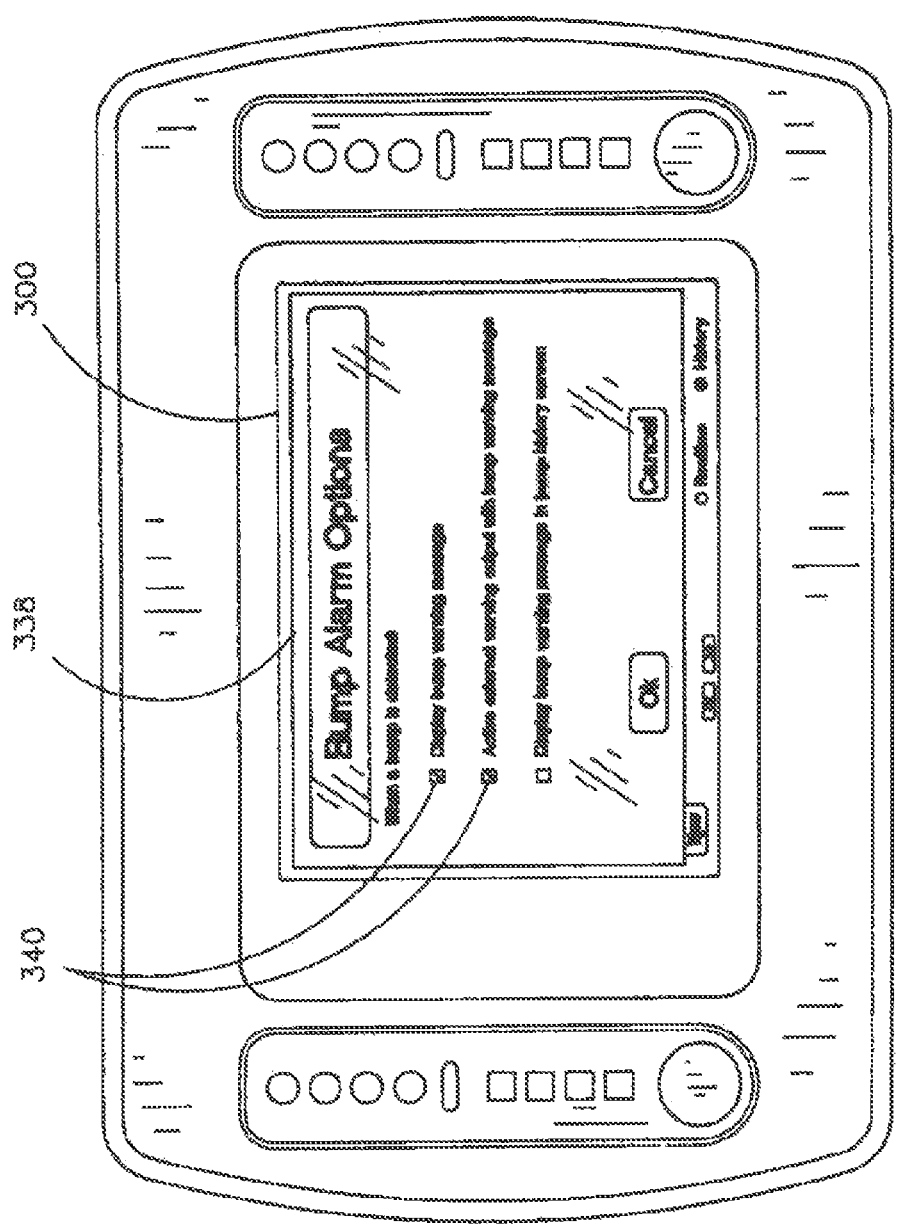
FIG. 27 illustrates a bump alarm options screen for the smoothness indicator graphical user interface shown in FIG. 21.

Referring to FIG. 27, a bump alarms options screen 338 is described in accordance with exemplary embodiments of the present invention. Check boxes 340 are provided for allowing an operator of the smoothness indicator 10 to selectively determine the functionality of an alarm/series of alarms. Various options may be provided for different types of alarms. Additionally, options for controlling a marking (e.g. a visual cue such as a paint sprayer) may be included on the bump alarm options screen 338.

Figure 28:
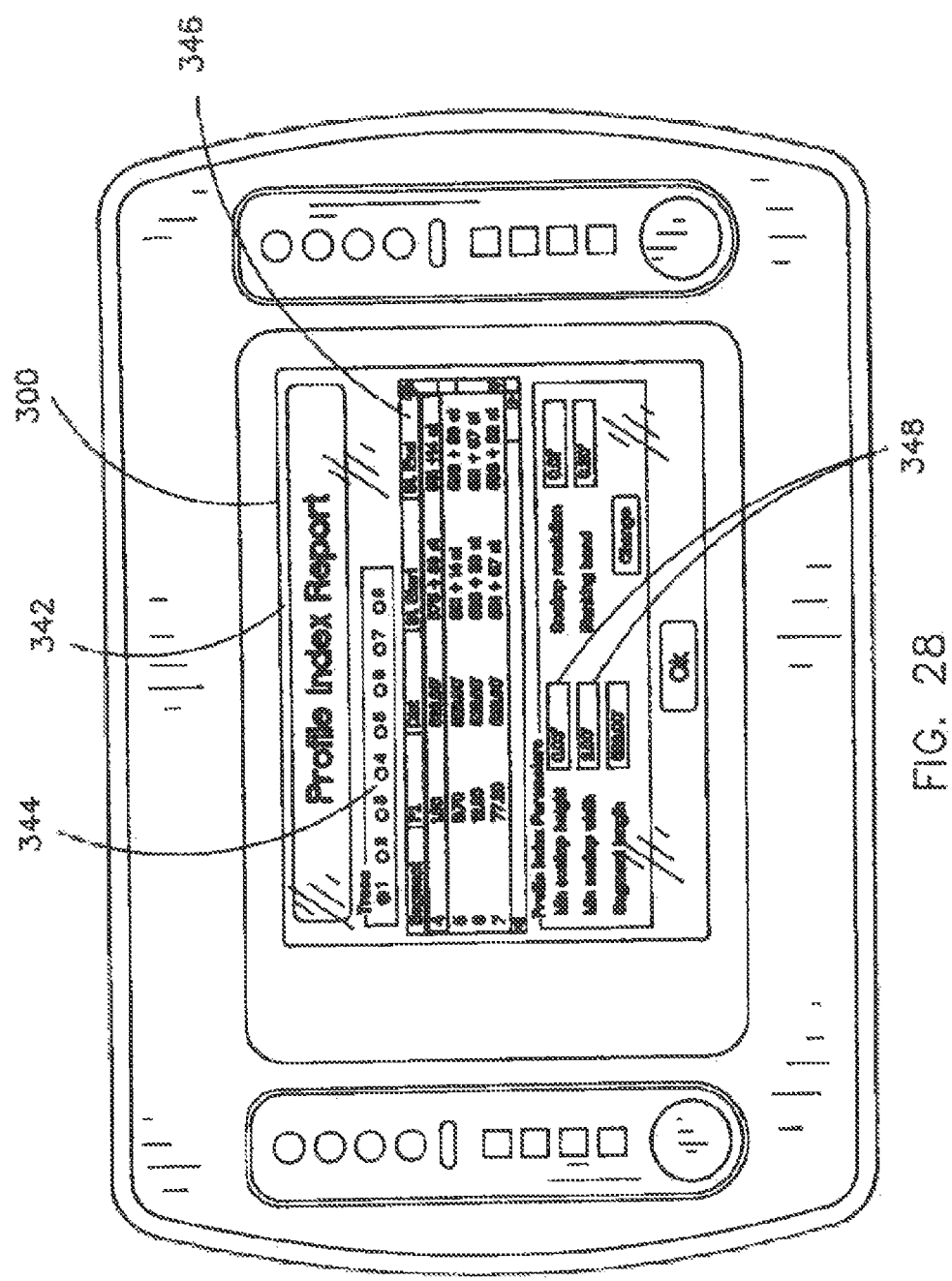
FIG. 28 illustrates a Profile Index report screen for the smoothness indicator graphical user interface shown in FIG. 21.

Referring now to FIG. 28, a Profile Index report screen 342 is described. The Profile Index report screen 342 includes radio/selection buttons 344 for allowing an operator of the smoothness indicator 10 to view Profile Index report information 346. The Profile Index report information 346 is calculated by the smoothness indicator 10, and displayed according to a radio/selection button 344 selected by the user. Additionally, text boxes 348 are included for entering parameters for calculating the Profile Index report information 346. These text boxes 348 may allow entry for information such as minimum scallop height, minimum scallop width, segment length, scallop resolution, blanking band, and the like. Those of ordinary skill in the art will appreciate that other various parameters for calculating the Profile Index report information 346 may be included without departing from the scope and intent of the present invention.

Figure 29:
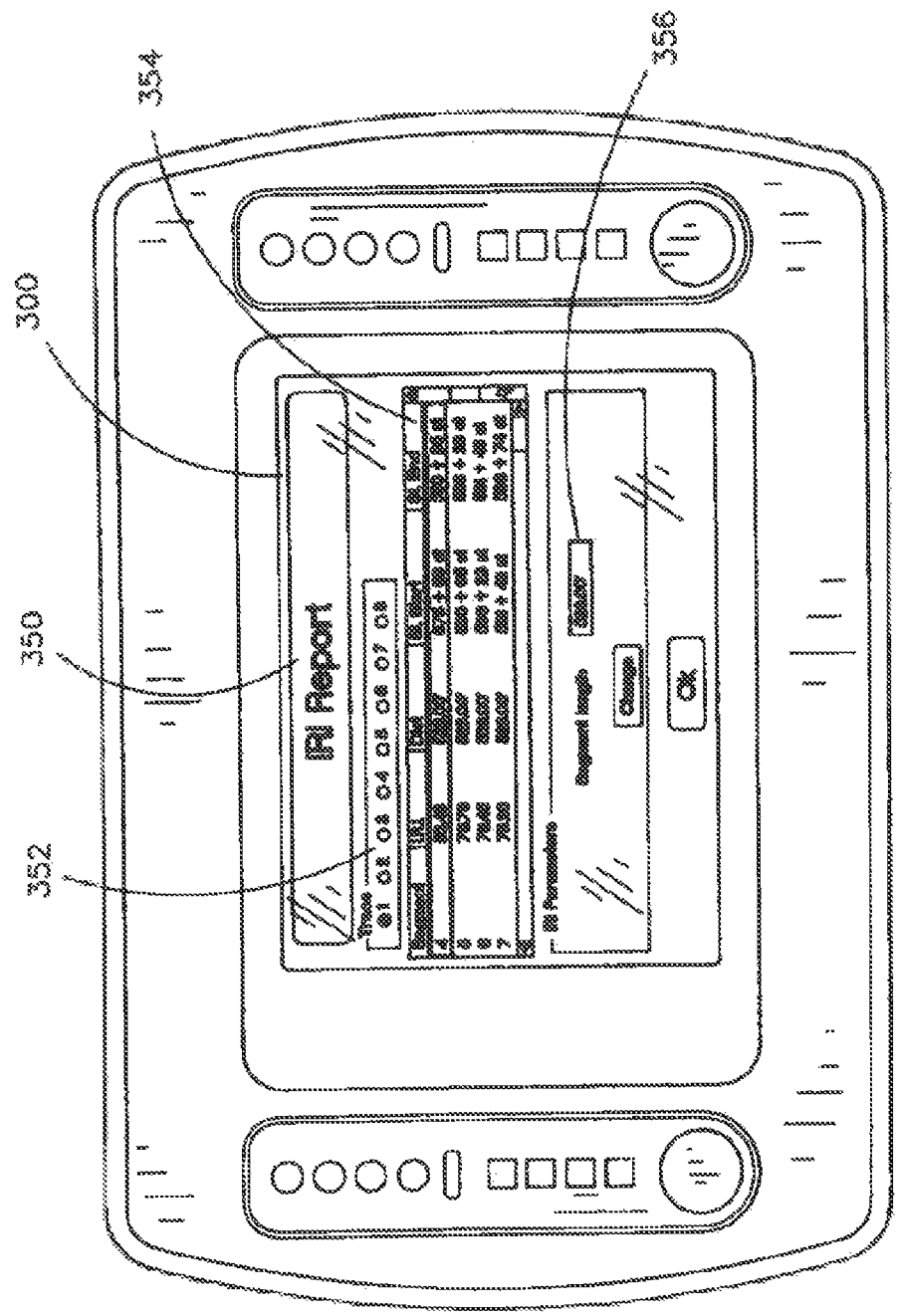
FIG. 29 illustrates an International Roughness Index report screen for the smoothness indicator graphical user interface shown in FIG. 21.

Referring now to FIG. 29, an International Roughness Index report screen 350 is described in accordance with exemplary embodiments of the present invention. The International Roughness Index report screen 350 includes radio/selection buttons 352 for allowing an operator of the smoothness indicator 10 to view International Roughness Index report information 354. The International Roughness Index report information 354 is calculated by the smoothness indicator 10, and displayed according to a radio/selection button 352 selected by the user. Additionally, a text box 356 is included for entering parameters for calculating the International Roughness Index report information 354. The text box 356 may be provided along with other text boxes for entry of information such as segment length, and the like. Various parameters for calculating the International Roughness Index report information 354 may be included without departing from the scope and spirit of the present invention.

Figure 30:
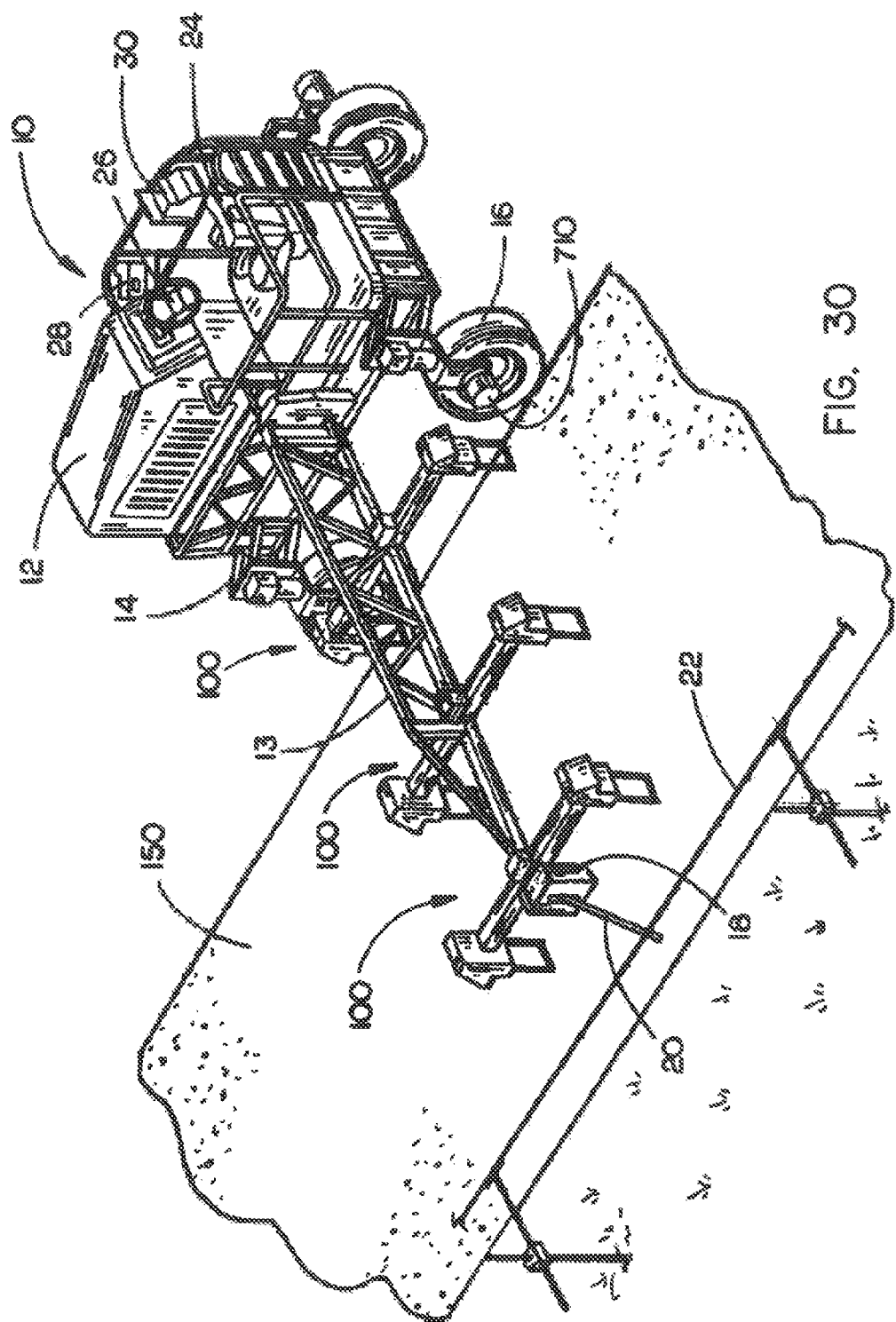
FIG. 30 is an isometric view illustrating a smoothness indicator including a bridge rig having a cantilevered arm in accordance with an exemplary embodiment of the present invention.
Figure 31:
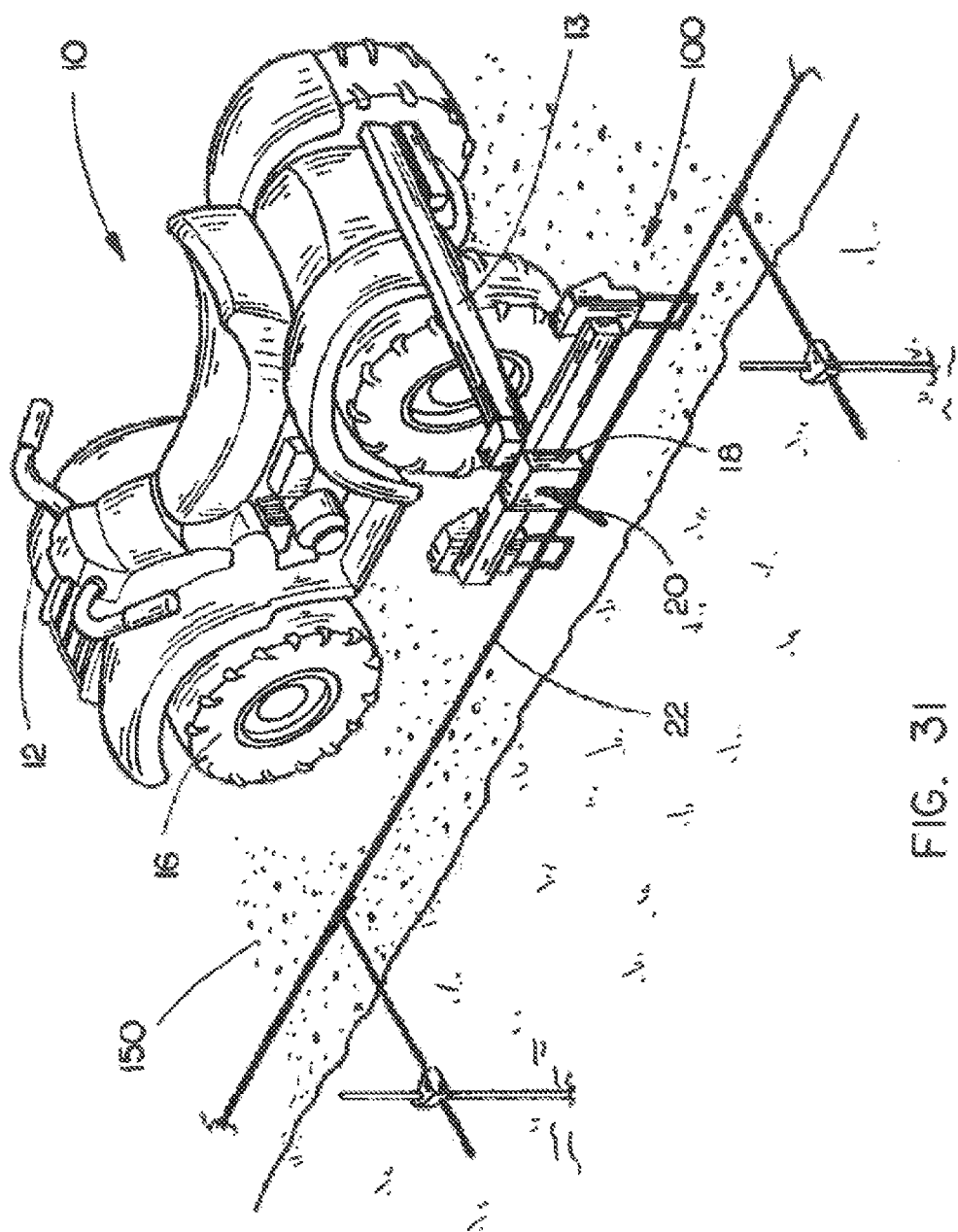
FIG. 31 is an isometric view illustrating a smoothness indicator including an all terrain vehicle (ATV) having a cantilevered arm in accordance with an exemplary embodiment of the present invention.

Referring to FIGS. 30 and 31, a smoothness indicator 10 including one or more sensor assemblies 100, like the embodiments illustrated in FIGS. 1 through 7, is described in accordance with further exemplary embodiments. The smoothness indicator 10 includes a bridge rig 12 having a cantilevered arm 13. The cantilevered arm 13 may be extended over a surface 150 for profiling the surface. For instance, the cantilevered arm may be folded and/or stowed alongside the rig 12 for transport, and extended for profiling a surface. The sensor assemblies 100 are positioned for measuring locations upon the surface 150, such as where automobile tires may travel upon the surface. In a first embodiment, the sensor assemblies 100 may be manually positioned. Alternatively, a drive assembly may be utilized for automatically adjusting a sensor assembly 100 to a pre-selected position.

The smoothness indicator 10 may include a height adjustment assembly 14, such as an assembly including a hydraulic piston, a mechanical linkage, or the like, for adjusting the height of the smoothness indicator 10 and positioning a sensor assembly 100 a distance from the surface 150. This may be desirable for maintaining the sensor assembly in an optimal range while profiling the surface. In further embodiments, the smoothness indicator 10 transmits a command to the height adjustment assembly 14 to position a sensor assembly 100 at a specified distance from the surface 150.

The smoothness indicator 10 may include a travel distance sensor 710 connected to a wheel 16 of the smoothness indicator. The travel distance sensor 710 measures distances traveled by the wheel of the smoothness indicator to determine distances traveled by a sensor assembly 100. In embodiments, two or more travel distance sensors are included for determining distances over non-linear terrain, such as distances around a sweeping highway curve. In a further example, a distance measuring wheel may be included with the smoothness indicator 10 for determining distances traveled by a sensor assembly 100.

In further embodiments, the smoothness indicator 10 includes one or more contact sensors 18. A contact 20 is included for measuring a distance between the smoothness indicator 10 and a guide, such as a string line positioned for guiding a paver, or the like. For example, a contact sensor 18 may follow a string line 22 for automatically directing the smoothness indicator 10 when measuring a surface profile. The contact 20 follows the string line as the smoothness indicator advances over the surface 150. By analyzing movement of the contact 20, the smoothness indicator positions the smoothness indicator 10 for travel in a direction following the direction of the surface. In another embodiment, an elevation distance sensor assembly is utilized to guide the smoothness indicator by tracking a line, which may be rope or another type of line detectable by the elevation distance sensor.

A feedback and actuator assembly may be utilized to control the wheel 16 of the smoothness indicator 10. The feedback and actuator assembly may include a feedback sensor (such as a rotary potentiometer, or the like, for sensing an angle of the wheel 16), an actuator, and/or a control assembly, for guiding the angle of the wheel 16, controlling its rotational velocity, and/or directing another characteristic of the wheel's movement. The feedback and actuator assembly may be coupled with the contact sensor 18 (or the elevation distance sensor) for controlling the direction of travel of the smoothness indicator 10. Alternatively, the smoothness indicator and/or the wheel are controlled by a Local Positioning System (LPS) (e.g. a robotic total station), a Global Positioning System (GPS), or the like, for directing the smoothness indicator. In this manner, the smoothness indicator 10 may travel a predetermined course.

Referring now to FIG. 31, the surface 150 over which the cantilevered arm 13 is extended may comprise a subgrade. A sensor assembly 100 is positioned for measuring locations upon the subgrade, such as for determining the thickness of pavement to be constructed upon the subgrade. Thus, the smoothness indicator 10 may be utilized to check the subgrade. For example, the smoothness indicator may be correlated to a line detected by an elevation distance sensor for determining a percentage yield for a paving material such as concrete or asphalt. Alternatively, the contact sensor 18 may be used to compare the string line 22 to the subgrade. For instance, string line used by a paver for determining the thickness of a paved surface, such as a road surface, may be compared to the subgrade for determining pavement thickness at various locations and minimizing surface inconsistencies which reduce the percentage yield. In such a case, the contact sensor 18 may be replaced by an elevation distance sensor or the like as needed.

Referring generally to FIGS. 32 through 38, the smoothness indicator analysis system 320 for analyzing elevation information 330 collected and measured by a smoothness indicator 10 is described. The smoothness indicator analysis system 320 generates a comprehensive report and a graphic user interface display useful for planning pavement projects and maintaining the paved road.

Figure 32:
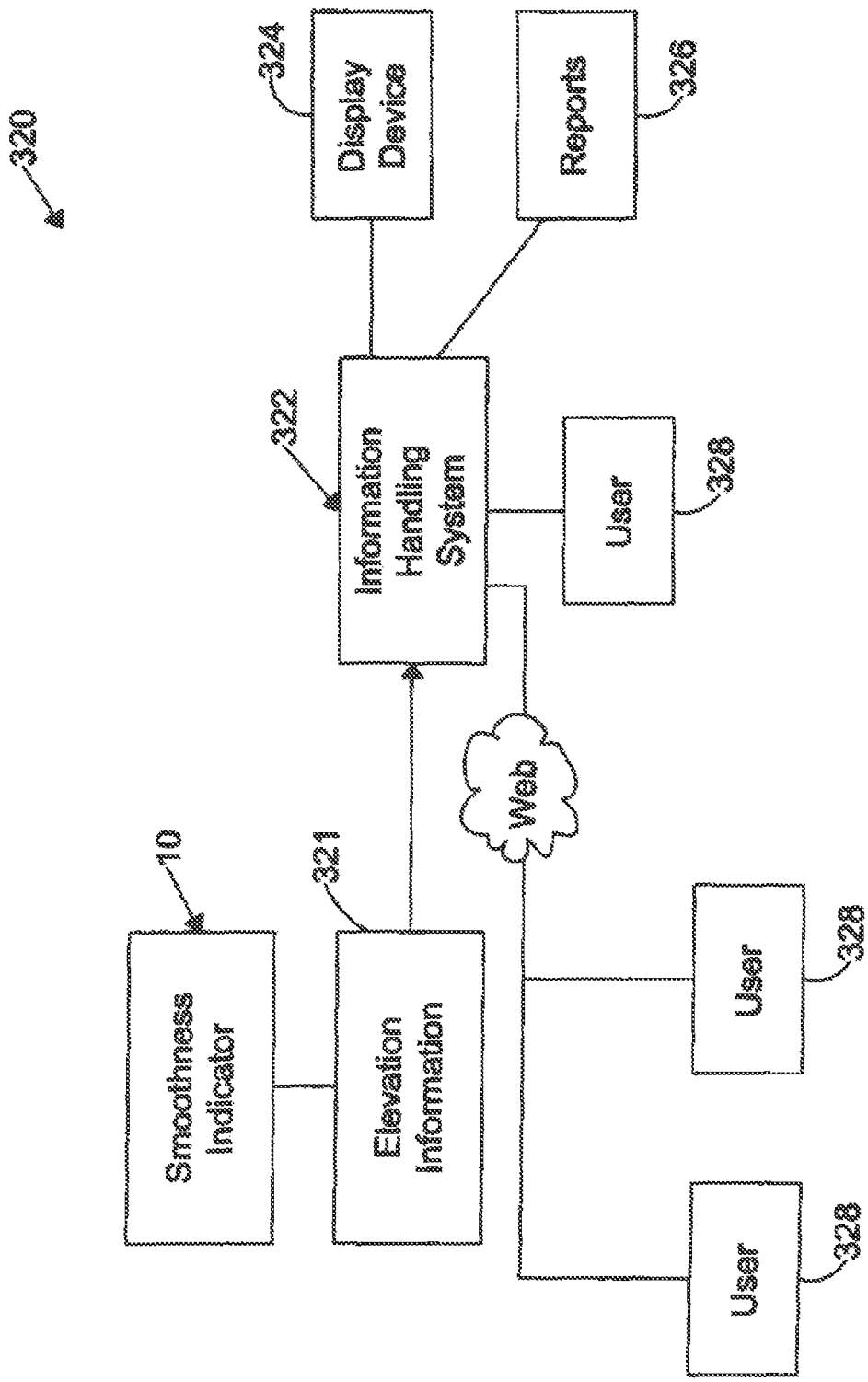
FIG. 32 is a block diagram of a smoothness indicator analysis system including a smoothness indicator and an information handling system in accordance with an exemplary embodiment of the present invention.

Referring now to FIG. 32, the smoothness indicator analysis system includes information handling system 322 comprising display devices 324 and generating various reports 326. As discussed, the smoothness indicator 10 is configured to determine elevation information 321 such as a surface profile taken of the road surface 150, elevation measurements for the surface, string line elevation profile data, subgrade elevation profile data, or the like. The elevation information 321 regarding the road surface may be stored by the smoothness indicator 10, such as by a Random Access Memory (RAM), a Read-Only Memory (ROM), a magnetic diskette, and/or removable media, such as a floppy disk.

The information handling system 322 may be accessed through a network by various users 328. In an embodiment of the present invention, the information handling system 322 may provide a web based graphic user interface for allowing users 328 to select user options and view analyzed results.

The elevation information 321 such as elevation measurement data may be utilized to determine a cut or fill surface area or other surface irregularities upon completion of the elevation profile. In one embodiment, the information handling system 322 may be communicatively connected to the smoothness indicator 10 through a network. As such, the information handling system 322 may receive the elevation information 321 from the smoothness indicator 10 via a wireless network connection (e.g. wireless fidelity (Wi-Fi) network connection or the like). Alternatively, the information handling system 322 may upload the elevation information directly from the memory of the smoothness indicator, such as RAM, ROM, or the like. In an alternative embodiment, the information handling system 322 may be a stand alone system which may not be communicatively coupled to the smoothness indictor 10. The information handling system 322 may upload the elevation information 321 from a magnetic diskette, removable media, or the like, which has been previously stored by the smoothness indicator.

Figure 33:
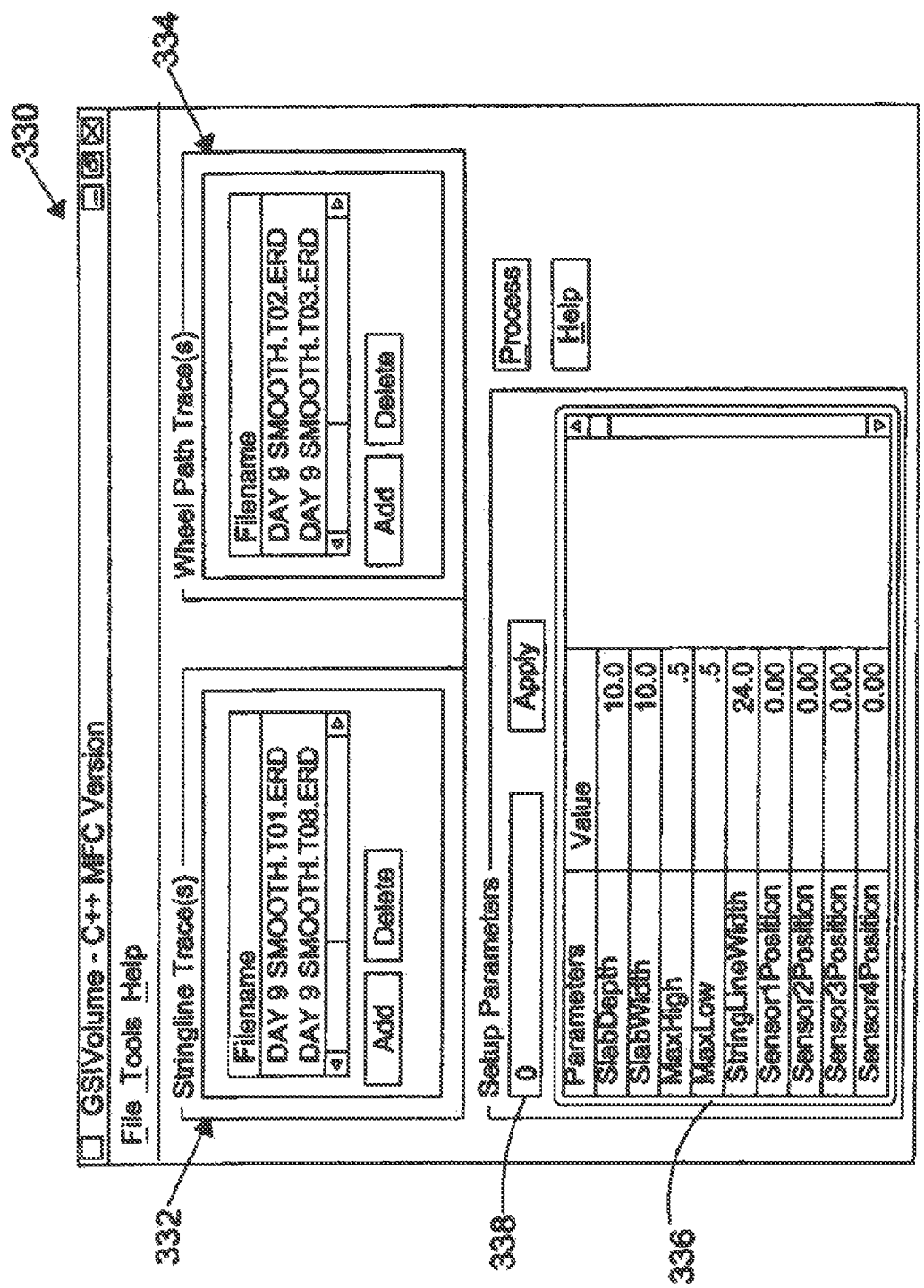
FIG. 33 is an illustration of a main graphic user interface of the information handling system shown in FIG. 32.

Referring now to FIG. 33, a main Graphic User Interface (GUI) 330 for the information handling system of the present invention is described. In an embodiment of the present invention, the main GUI 330 may display a list 332 of string line elevation profile data and a list 334 of subgrade elevation profile data. The user may be allowed to add or delete elevation profile data from the lists 332, 334 to execute a desired analysis. It is to be noted that elevation profile data for string lines and elevation profile data for each subgrade trace may be categorized by various factors such as a date/time, a geographic location, an individual smoothness indicator, or the like. For example, the user may add elevation profile data collected by a certain smoothness indicator during day 1 and day 2. Later, the user may delete the elevation profile data collected during day 1. The selected elevation profile data may be uploaded to the information handling system 322.

The main GUI 330 may allow a user to enter various input parameters 336, 338 to the information handing system. For example, dimensions such as length, width, and depth of a concrete slab may be entered. The concrete slab may be constructed upon a subgrade. These dimensions may be used to calculate a design volume (i.e., the theoretical volume of paving material needed to construct the slab) of an intended surface (i.e., an ideal pavement surface) which may be compared to an expected volume calculated from the elevation measurements for the subgrade and/or the string line to determine a predicted volume difference. In an alternative embodiment, overall average volume change may be estimated if elevation profiles from multiple sensor assemblies 100 are used. If the predicted volume differences or overall average volume change are to be excessive, the subgrade may be modified accordingly in order to reduce or eliminate the actual volume difference after paving, saving paving material and reducing the cost of the slab. Those of skill in the art will appreciate that other data may be calculated by comparing subgrade and/or string line elevation measurements without departing from the scope and intent of the present invention.

The information handling system may compare elevation measurements for a subgrade against various reference elevation points. In one embodiment, three dimensional theoretical elevation data, such as GPS collected elevation data, may be utilized to determine an intended surface and thus, no string line is used as a reference elevation point. It is to be noted that it is well known to the art that the three dimensional theoretical elevation data is collected without any string lines. In an alternative embodiment, various reference elevation points such as string lines, road lines, and the like may be utilized to collect information to determine an intended surface of pavement. For example, when the smoothness indicator scans and generates elevation information, a user may choose the number of string lines for elevation profile measurements. Thus, two string lines, a single string line, no string lines, or the like may be used by the smoothness indicator to compare elevation measurements. Such comparison may be, for example, comparing elevation data points of an existing surface (e.g., a subgrade or a pavement surface, such as in a plastic state) to elevation data points of the intended surface to determine whether a relative elevation difference exists between the elevation data points of an existing surface and the elevation data points of the intended surface.

Generally, a string line may be utilized by a paver for determining the thickness of a paved surface to be constructed upon a subgrade. Thus, the information handling system may determine a percentage yield for a paving material such as concrete by comparing elevation measurements for the subgrade against elevation measurements for the string line. As such, the information handling system may analyze the elevation profile data to determine an amount of paving material required for a given portion of the road surface based on the user selections and the elevation data. It is further contemplated that the information handling system also estimates the pavement thickness of a given portion of the road surface. In this manner, the information handling system may provide various analyzed results useful for planning the pavement of the road surface. Preferably, surface inconsistencies, which can reduce the percentage yield of a paving material, may be identified.

Figure 34:
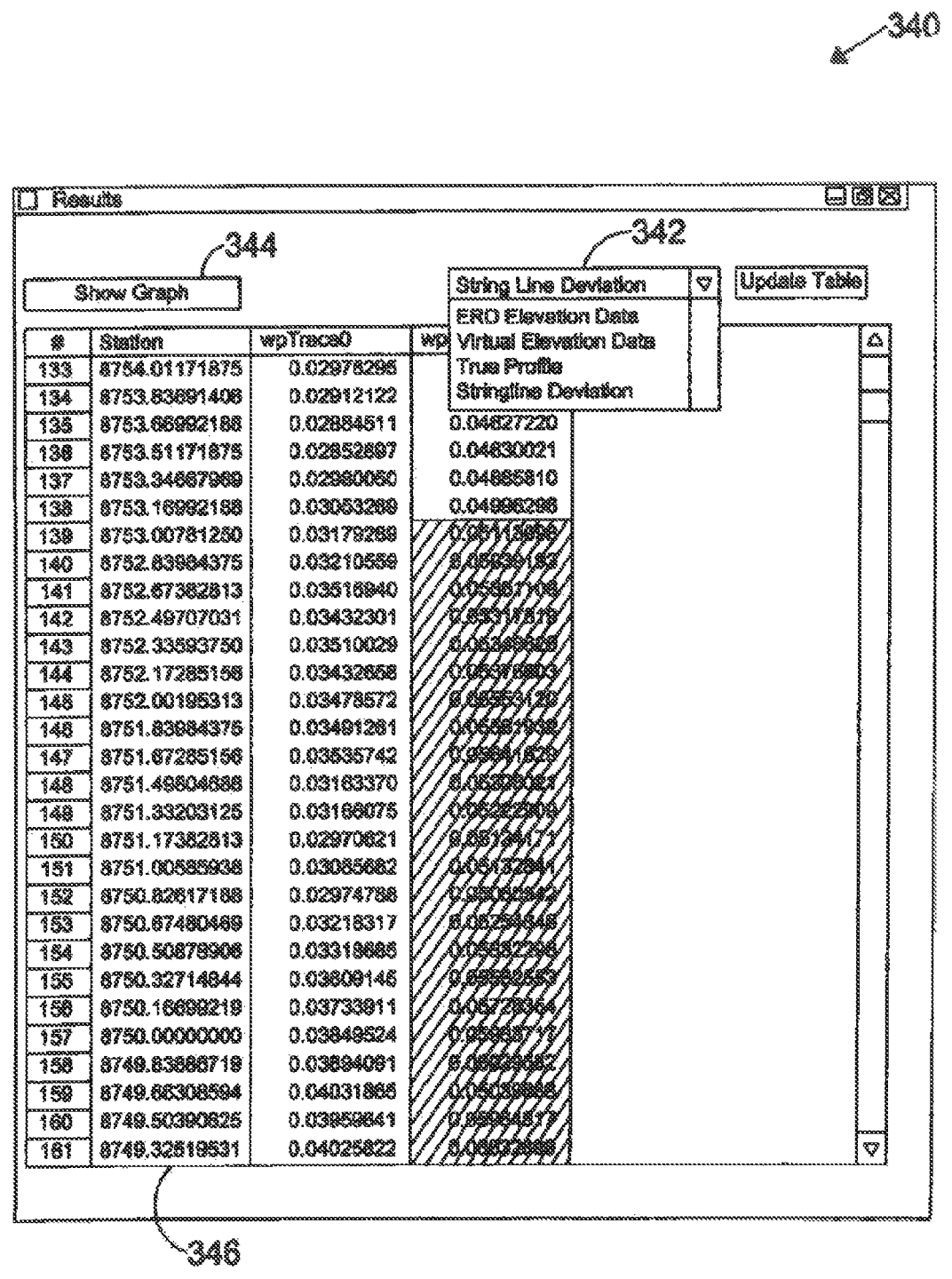

Referring now to FIG. 34, an exemplary report screen 340 for the main GUI 330 is shown. An elevation profile measured for the subgrade may be compared against an elevation profile measured for a string line. Alternatively, a profile of elevation difference measurements (elevation derivation) may be generated, such as by measuring elevation differences between a subgrade and a string line at various locations. In a still further embodiment, elevation measurements for either of the subgrade and the string line are compared against theoretical elevation measurements for the other of the subgrade and the string line. A user may have a choice to have various reports via a selection menu 342. The reports may include an Engineering Research Division (ERD) Elevation Data report, a Virtual elevation data report, a True profile report, a grade Cut/Fill report, or the like. It is to be noted that the ERD file format and ERD software are well known to the art. The ERD file format has been utilized to facilitate automated plotting of simulation data, experimentally measured data, and data from various analysis programs. Those of ordinary skill in the art will appreciate that the information handling system may generate various forms of reports based on its analysis. For each report, a corresponding graph image may be displayed when the user selects Show Graph menu 344 from the report screen 340.

Figure 35:
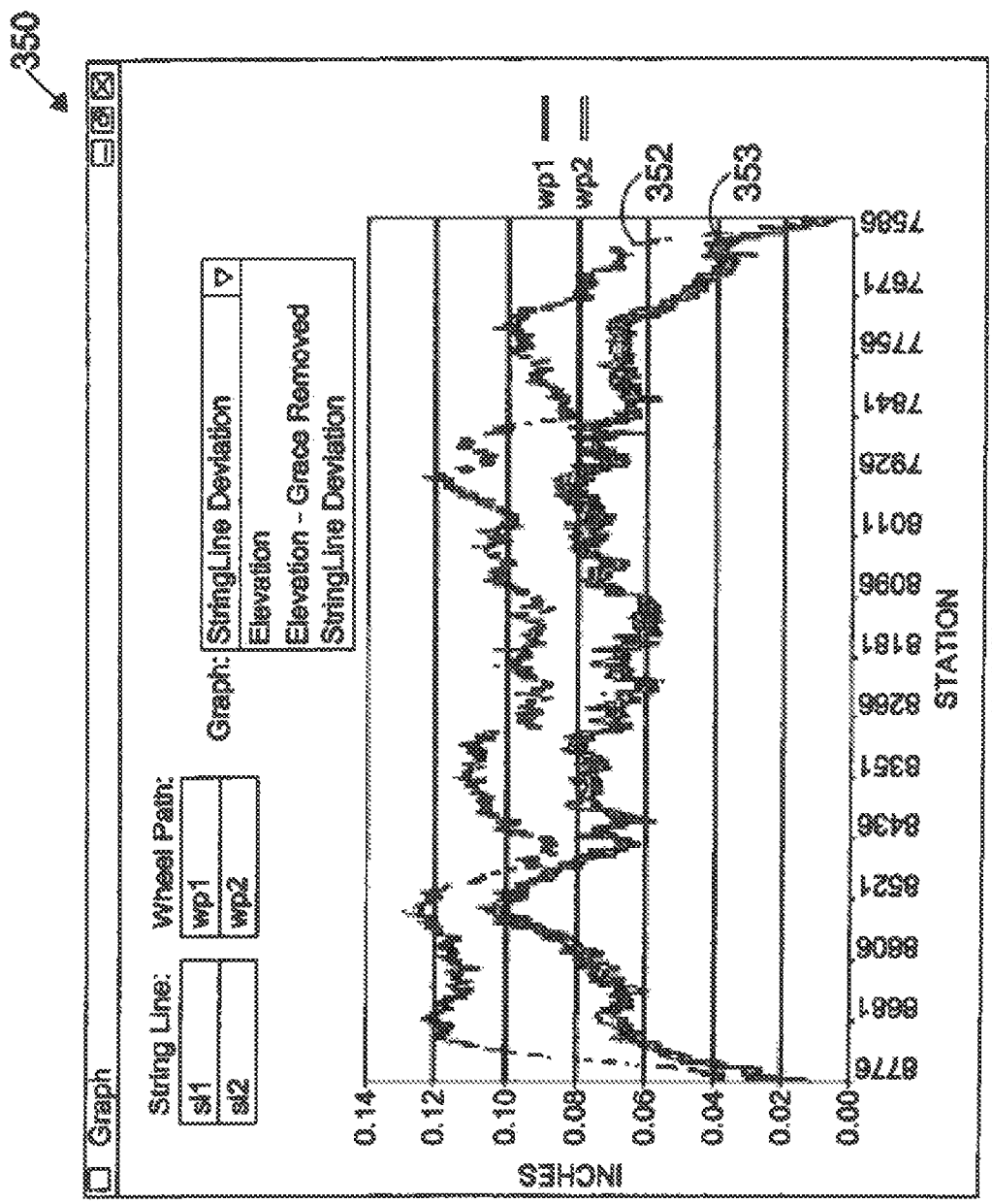
FIG. 35 illustrates an exemplary graph screen displaying two subgrade traces for the exemplary report screen shown in FIG. 34.

Referring now to FIG. 35, a graph screen 350 displaying two subgrade traces is shown. In an embodiment of the present invention, the graph screen 350 may display the analyzed elevation information in graphical form such as by placing the data on a scale or the like. Preferably, elevation information of two or more subgrade traces may be displayed on the graph screen 350 at one time. For example, first trace elevation profile 352 may be located above second trace elevation profile 353 for comparison purposes. Additionally, the user may choose to view a graph of each trace's true profile (grade removed) data, or a graph of each trace's string line deviation, or the like.

In one embodiment, surface profile data measured by the smoothness indicator may be used for deriving information about a surface. The information handling system may analyze the surface profile data to aid users in finding subgrade to be cut or filled. For example, high areas may be a must-grind bump, a bump which must be reduced and/or eliminated from the surface (e.g. to meet construction specifications). Low area may be an area which must be filled. The information handling system may display a table showing such information to identify irregularity of the subgrade.

Figure 36:
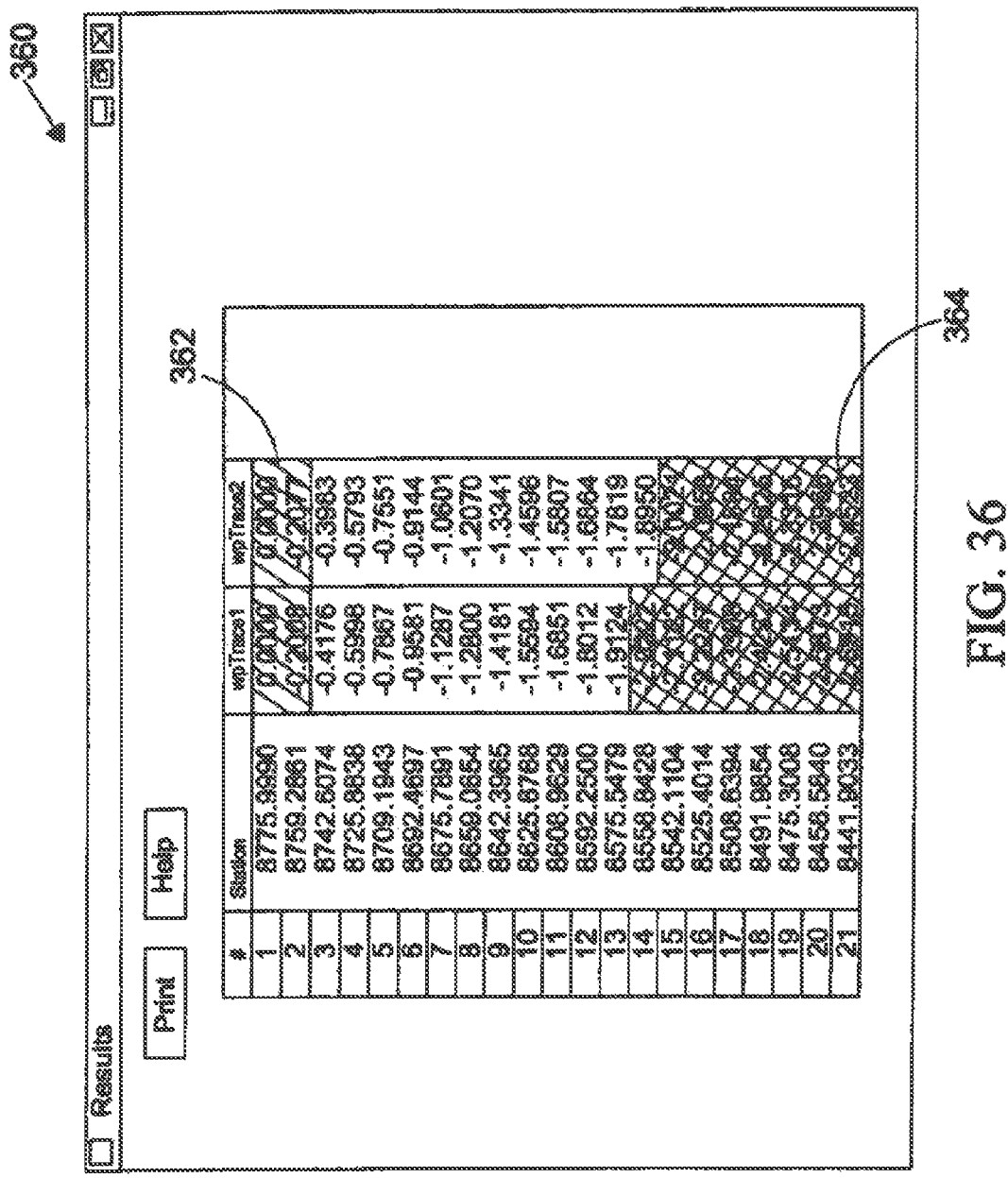
FIG. 36 illustrates another exemplary report screen having maximum high and maximum low values of required specifications for the main graphic user interface shown in FIG. 33.
Figure 38:
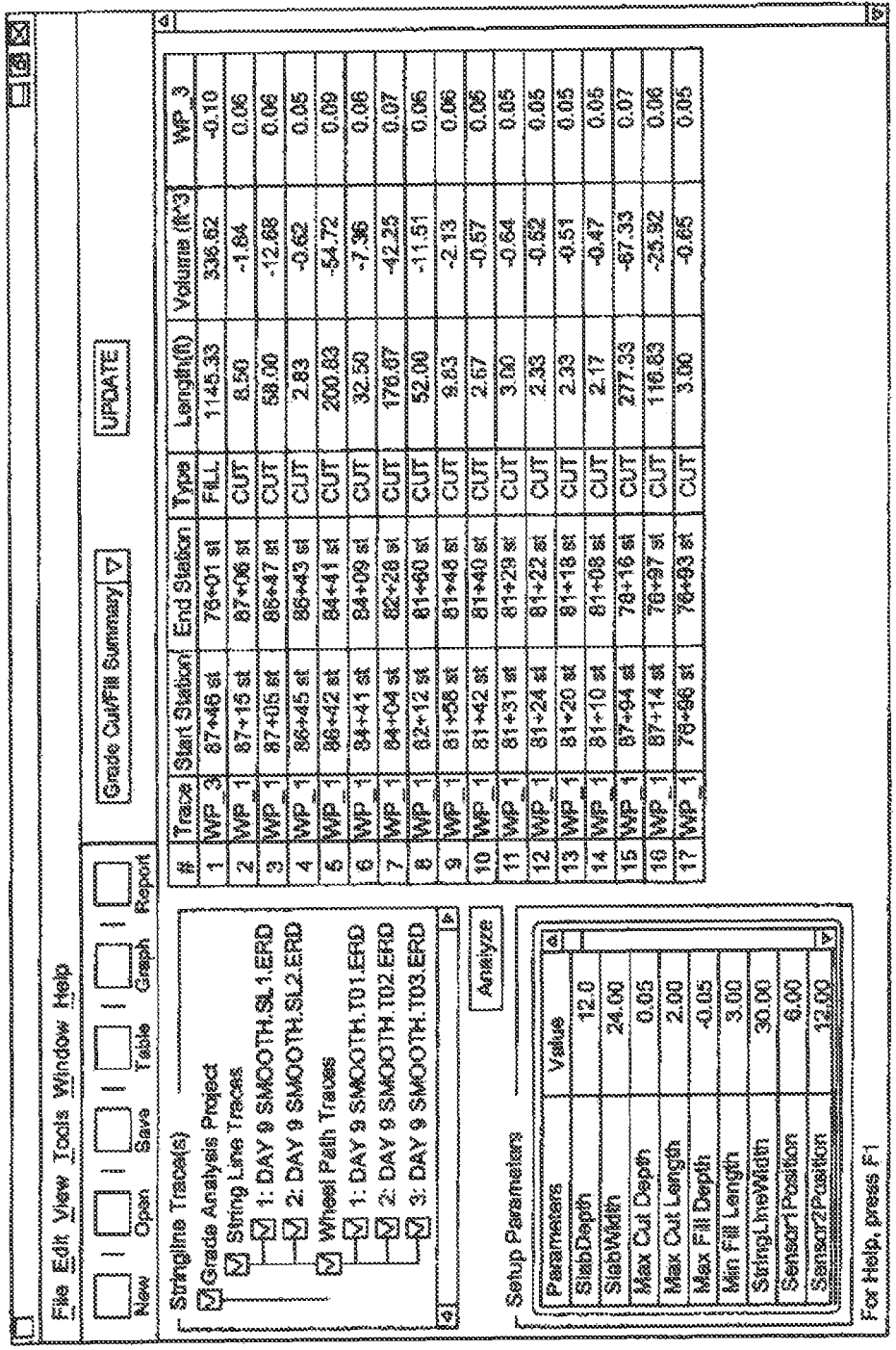
FIG. 38 illustrates an exemplary report screen for the main graphic user interface shown in FIG. 37.

Referring now to FIG. 36, a table screen 360 having maximum high and maximum low values for required specifications is shown. In a further embodiment, the main GUI 330 allows the user to set the maximum high and maximum low values and corresponding colors for the required specifications. In an embodiment, the maximum high and maximum low values are measured with respect to expected values, calculated utilizing information related to the expected grade of the surface to be paved. In other embodiments, the maximum high and maximum low values may be identified utilizing other information, including information about an actual subgrade and a theoretical subgrade or the like. For example, the user may select the upper limit to show in green for any specification which is −0.25 or higher. A user may select the lower limit to show in red for any specification which is −2.0 or below. In such a case, the table 360 may display the required specifications in different colors 362, 364 in order to help the user to recognize potential problems of the road surface. Alternatively, other graphical methods such as highlighting, flashing, shading, or the like may be utilized to display the required specifications.

It is noted that the surface profile data may be analyzed to provide various reports and displays in various formats. In one embodiment, surface profile measurements are utilized to produce index values such as Profile Index values and International Roughness Index values which are computed for set intervals, such as between station markers. Additionally, the user-defined interval may be centered on any point within the profile. The main GUI 330 may also allow the user to input a width of string lines, a maximum high and a maximum low of an irregularity of the subgrade, the number of subgrade traces used, or the like.

Figure 37:
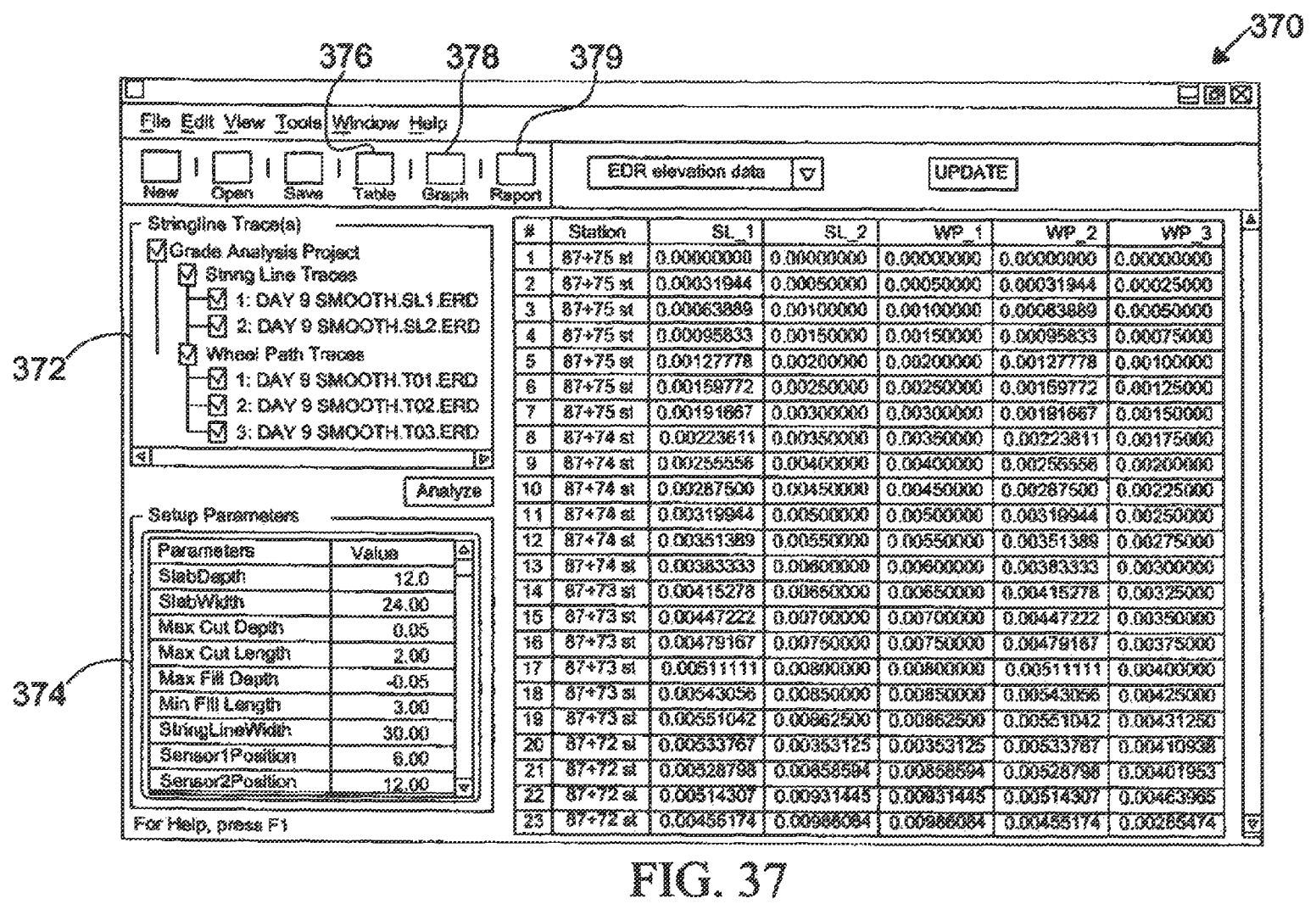

Referring now to FIG. 37, another exemplary main Graphic User Interface (GUI) 370 for the information handling system of the present invention is described. In an embodiment of the present invention, the main GUI 370 may display a list of string line elevation profile data and a list of wheel path trace elevation profile data. The user may be allowed to add or delete elevation profile data from the lists to execute a desired analysis. The main GUI 370 may allow a user to enter various input parameters such as a slab definition, Grade Cut/Fill parameters, Sensor positions, Grade offsets, and the like. The user may select various views of the analyzed information. For example, the user may select a table view 376 to have an elevation data table view, a true profile data table view, a Grade cut/fill details table view, a Grade Cut/fill summary table view, and the like. Additionally, the user may choose to have a graph view 378 of elevation data, true profile, Grade cut/fill details or the like. When the user selects an analysis report 379 from the main graphic user interface, a comprehensive grade analysis report may be provided so that the user can print the comprehensive grade analysis report, transfer the comprehensive grade analysis report electronically (e.g. via an e-mail or the like), or view the comprehensive grade analysis report through the main GUI 370.

In a further embodiment, the information handling system may provide a simulated paver mold pan line. When the user chooses to use two string line traces for the smoothness indicator, the information handling system may create a line (a simulated paver mold pan line) to replicate what the paver mold will be located on a paved road. Advantageously, the simulated paver mold pan line may be utilized as a base line for pavement of a road.

Typically, two string lines are not exactly parallel with each other while the elevation information is collected by the smoothness indicator. Thus, in order to get accurate elevation information, it is important to have trace information regarding locations of the traces in reference to each string line. After finding the true elevation (grade removed) by the smoothness indicator, the information handling system may determine trace information regarding the locations of traces in reference to each string line or the simulated paver mold pan line.

$Y_p$, which is a slope between the first string line and the second string line at incremental point (j), is calculated as follows:

$$Y_p = \frac{(SL1(j) - SL0(j))}{Ws}$$

where SL0(j) is a height of the first string line at incremental point (j), SL1(j) is a height of the second string line at incremental point (j), and Ws is a width between the first string line and the second string line.

$Y_t$, which is the height of a sensor in reference to the first string line at incremental point (j), is calculated as follows:

$$Y_t = Y_p * \text{SensorPosition} + SL0(j)$$

Tr1(j), the actual deviation of a second trace at incremental point (j), is calculated for the deviation of a wheel path as follows:

$$Tr1(j) = -1 * (Y_t - WP(j))$$

where WP(j) is a wheel path at incremental point (j).

If the start point and/or the end point has an inaccurate grade cut, the profile value is calculated as follows:

$$\text{ProfileValue} = WP(j) - ((j * WP.\text{avgSlope}) + (\text{OffsetSlopeDiff} * (n\text{data}-1)-j) + (\text{EndOffsetSlopeDiff} * j))$$

where WP.avgSlope is an average slope of the Wheel Path, OffsetSlopeDiff is an offset of the start point, and EndOffsetSlopeDiff is an offset of the end point. Ndata is a total number of data points taken by the smoothness indicator. After the value of ProfileValue is calculated, the information handling system may compare the actual deviation of the first trace to the first string line to determine the deviation from the simulated paver mold pan line. In this manner, trace information regarding locations of the traces in reference to each string line or a simulated paver mold pan line may be determined.

Tr0(j), the actual deviation of a first trace at incremental point (j), is calculated as follows:

$$Tr0(j) = (Y_p) * (Wtr0(j)) + S0(j)$$

where Wtr0(j) is a width of the first trace to the first string line at incremental point (j) and S0(j) is a raw value for the first string line at incremental point (j).

If an offset for the first trace is needed to correct for an inaccurate grade cut at the beginning of a job, Tr0(j) is calculated as follows:

$$Tr0(j) = j * (\text{Echg}/\text{Range}) + (\text{Offset}/\text{Range}) * (\text{Range}-j)$$

where (j) is an incremental point at which elevation data was taken, Offset is the offset value for the first trace, Range is a range of incremental points, and Echg is an elevation change increment value. After the value of Tr0(j) is calculated, the information handling system may compare the actual deviation of the first trace at incremental point (j) to S0(j) to determine the deviation from the simulated paver mold pan line. In this manner, trace information regarding locations of the traces in reference to each string line or a simulated paver mold pan line may be determined.

It is contemplated that the information handling system, communicatively coupled to a smoothness indicator, may simulate the paver mold pan line to the theoretic pave pan movement while the surface of the road is being paved.

It is further contemplated that the information handling system, communicatively coupled to a smoothness indicator, may provide a real time pavement thickness which will aid users to calculate elevation changes of the sub-grade, sub-base, or the like as it may be before paving (either seconds, hours, or days before paving) or at anytime during the pavement process. Additionally, the information handling system may aid users in calculating the elevation changes for the final surface of the pavement. Further, the information handling system may place a distance stamp on each elevation value.

In an embodiment of the present invention, first profile information may be gathered by a first smoothness indicator in front of the paver and second profile information may be gathered by a second smoothness indicator right behind the paver. The first profile information and the second profile information may be uploaded by the information handling system in a real time manner. Preferably, the information handling system may be communicatively coupled to the smoothness indicators via conventional wireless network connections such as a WI-FI connection, or the like. It should be noted that the wireless network communication can be implemented in various ways. Further, it is also to be noted that additional information may be needed by the information handling system to determine the real-time thickness. The information system may mesh the first and the second profile information together to see the real-time thickness. The first and the second profile information may be overlaid in graphical form such as by placing the data on a scale, or the like, to show the elevation difference at a given portion of the surface. In this manner, the user may be able to have real-time assessment and analysis of the pavement thickness.

In a further embodiment of the present invention, the information handling system may be useful for a user for inspecting pavement of the road. Typically, a DOT inspector may have to lay on the back of the paver and use a dip stick in random places to check thickness to determine whether the thickness is within specification or not. The present invention may aid the user, such as a DOT inspector, by allowing for time thinness information, releasing the user from tedious and time consuming inspection.

Figure 39:
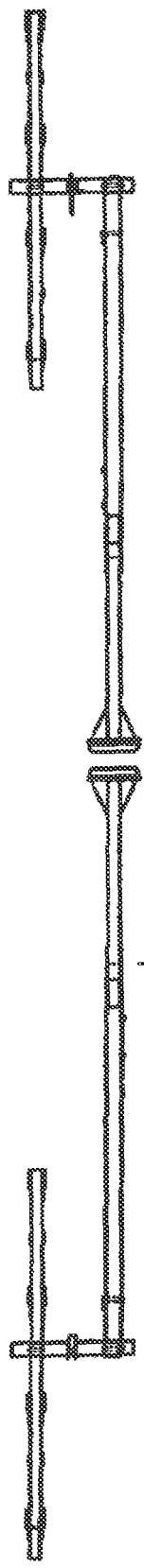
FIG. 39 is a top plan view illustrating a telescoping averaging ski assembly.
Figure 40:
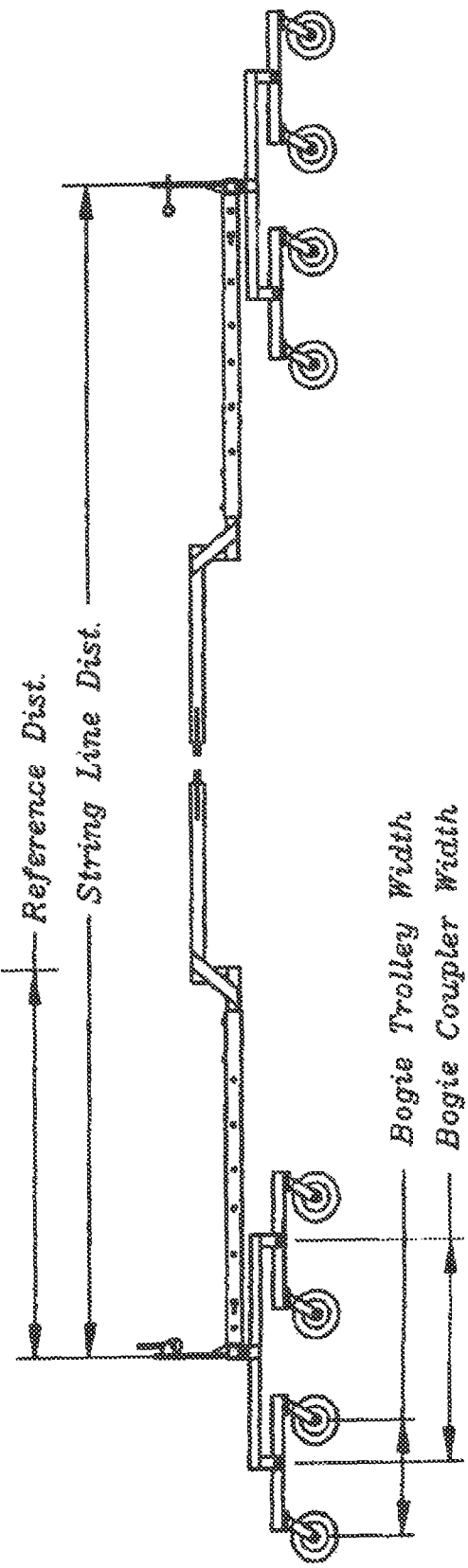
FIG. 40 is a side elevation view of the telescoping averaging ski assembly illustrated in FIG. 39, further illustrating dimensions for simulating a rolling string line reference trace, in accordance with another exemplary embodiment of the present invention.

Referring now to FIGS. 39 and 40, for the following analysis, let S equal an array of values measured by an elevation distance sensor, such as the first non-contact elevation distance sensor 110, the second non-contact elevation distance sensor 115, an ultrasonic sensor, a laser sensor, or the like. If an individual value, $S_i$, of array S is out of error tolerance, then that value may be replaced with another value interpolated as follows:

$$S_i = \left( \frac{|S_x \cdot Station - S_i \cdot Station|}{|S_x \cdot Station - S_y \cdot Station|} * (S_y - S_x) \right) + S_x$$

where S is the array of values measured by the elevation distance sensor, i is the current index of S, x is the index of the previous good value of S, and y is the index of the next good value of S.

The average of a group of values taken before and after an individual value, $S_i$, of array S is calculated as follows:

$$S_i = ((\Sigma_{j=i-1}^{i-AvgLen} S_j) + (\Sigma_{j=i+1}^{i+AvgLen} S_j))_{avg}$$

where S is the array of values measured by the elevation distance sensor, i is the current index of S, and AvgLen is the number of values before and after i to average.

An individual value, $S_i$, of array S may be "zeroed" (i.e., adjusted with reference to an initial point or origin) as follows:

$$S_i = (S_i - S_0)$$

where S is the array of values measured by the elevation distance sensor, i is the current index of S, and $S_0$ is a value representing an initial point or origin.

A value for simulating a rolling string line reference trace (e.g., a value representing a theoretical measurement taken by the telescoping averaging ski assembly illustrated in FIGS. 39 and 40) may be calculated as follows:

$$S_i = \frac{(S_{f1} + S_{f2} + S_{f3} + S_{f4})_{avg} - (S_{b1} + S_{b2} + S_{b3} + S_{b4})_{avg}}{StringLineDist} *$$
$$(StringLineDist - ReferenceDist) + (S_{b1} + S_{b2} + S_{b3} + S_{b4})_{avg}$$

where S is the array of values measured by the elevation distance sensor; i is the current index of S; and b1, b2, b3, b4, f1, f2, f3, and f4 are indices selected from S. Indices b1, b2, b3, b4, f1, f2, f3, and f4 are calculated as follows:

$$b1 = i - \frac{feetBeforeAvg * 12.0}{2.0}$$

$$b2 = b1 + \frac{BogieTrolleyWidth}{2.0}$$

$$b3 = i - \frac{feetToBackWheel3 * 12.0}{2.0}$$

$$b4 = b3 + \frac{BogieTrolleyWidth}{2.0}$$

$$f1 = i + \frac{feetToFrontWheel1 * 12.0}{2.0}$$

$$f2 = f1 + \frac{BogieTrolleyWidth}{2.0}$$

$$f3 = i + \frac{feetToFrontWheel3 * 12.0}{2.0}$$

$$f4 = f3 + \frac{BogieTrolleyWidth}{2.0}$$

where feetBeforeAvg, feetToBackWheel3, feetToFrontWheel1, and feetToFrontWheel3 are calculated as follows:

feetBeforeAvg=StringLineDist−ReferenceDist+(BogieCouplerWidth/2.0/12.0)+(BogieTrolleyWidth/2.0/12.0)

feetToBackWheel3=StringLineDist−ReferenceDist−(BogieCouplerWidth/2.0/12.0)+(BogieTrolleyWidth/2.0/12.0)

feetToFrontWheel1=ReferenceDist−(BogieCouplerWidth/2.0/12.0)−(BogieTrolleyWidth/2.0/12.0)

feetToFrontWheel3=ReferenceDist+(BogieCouplerWidth/2.0/12.0)−(BogieTrolleyWidth/2.0/12.0)

An individual value, $S_i$, of array S may be interpolated for station line up as follows:

$$S_i = \left( \frac{|S_x \cdot Station - R_i \cdot Station|}{|S_x \cdot Station - S_y \cdot Station|} * (S_y - S_x) \right) + S_x$$

where S is the array of values measured by the elevation distance sensor, i is the current index of S, R is an array of reference trace values, x is the starting index where $S_x.Station \leq R_i.Station$, and y is the ending index where $S_y.Station \geq R_i.Station$.

Let D equal an array of values representing individual deviations of elements of array S from a reference line. An individual value, $D_j$, of array D may be calculated as follows:

$$D_j = \left( \left( \frac{R1_j - R0_j}{refineWidth} + SP_i + RO_j \right) - S_j \right) + O_i$$

where S is the array of values measured by the elevation distance sensor, i is the trace index of S, j is the current index of D, R0 is a first reference trace, R1 is a second reference trace, SP is a sensor position, O is an array of sensor elevation offsets, and reflineWidth is the distance between reference traces R0 and R1.

The volume V of a slab may be calculated as follows:

$$V = \left(\left(\sum_{i=0}^{n} len * \left(SP_0 - \frac{reflineWidth - slabWidth}{2}\right) * WP[0]_i + \right.\right.$$
$$WP[0]_{i+1} + WP[0]_i + WP[0]_{i+1})_{avg} * -1\right) +$$
$$\left(\sum_{i=0}^{n}\left(\sum_{j=0}^{t-1} len * (SP_{j+1} - SP_j) *\right.\right.$$
$$(WP[j]_i + WP[j]_{i+1} + WP[j+1]_i + WP[j+1]_{i+1})_{avg} *$$
$$\left.\left.-1\right)\right) + \left(\sum_{i=0}^{n} len * \left(reflineWidth - \right.\right.$$
$$SP_{t-1} - \frac{reflineWidth - slabWidth}{2}\right) *$$
$$\left.\left(WP[t-1]_i + WP[t-1]_{i+1} + WP[t-1]_i + WP[t-1]_{i+1})_{avg} * -1\right)\right)$$

where len is the distance between trace points, reflineWidth is the distance between reference traces, slabWidth is the width of the slab, t is the number of traces, SP is an array of sensor positions, and WP is an array of sensor path traces.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for analyzing roadway information, comprising:
   receiving a first set of elevation data points defining at least a portion of an existing surface;
   receiving a second set of elevation data points defining at least a portion of an intended surface, the intended surface is configured as an exterior concrete surface prior to pavement, the exterior concrete surface is configured for travel upon by a motorized vehicle;
   receiving at least one angle of incidence corresponding to the first set of elevation data points;
   adjusting the first set of elevation data points based on the at least one angle of incidence to ensure that the first set of elevation data points and second set of elevation data points correspond to substantially parallel planes;
   comparing, via a computer processing device, the first set of elevation data points to the second set of elevation data points to determine whether an elevation difference exists between corresponding data points of the first set of elevation data points and the second set of elevation data points, where a data point of the first set of elevation data points is a corresponding data point to a data point of the second set of elevation data points when the data point of the first set of elevation data points and the data point of the second set of elevation data points has a same x and y coordinate of a horizontal plane;
   storing a comparison of the first set of elevation data points to the second set of elevation data points when it is determined that an elevation difference exists between corresponding data points of the first set of elevation data points and the second set of elevation data points; and
   generating an automated report displaying the comparison, the report defining a high spot or a low spot on the existing surface when an elevation difference exists between corresponding data points of the first set of elevation data points and the second set of elevation data points.

2. The method of claim 1, wherein the existing surface includes at least one of a subgrade or a concrete pavement surface in a plastic state.

3. The method of claim 1, further comprising:
   deriving the intended surface at least in part from at least one of a string line elevation profile or three dimensional theoretical elevation data.

4. The method of claim 1, wherein the existing surface is a subgrade.

5. The method of claim 4, further comprising:
   deriving the intended surface at least in part from at least one of a string line elevation profile or three dimensional theoretical elevation data, wherein the report indicates a surface irregularity in the subgrade to be corrected prior to introducing a paving material to the subgrade.

6. The method of claim 4, further including:
   receiving a user input regarding at least one of a length, a width, or a depth of a pavement portion to form onto the subgrade.

7. The method of claim 6, further including:
   calculating a design volume of the pavement portion; and
   determining a predicted volume difference between the design volume and a volume between the subgrade and the intended surface.

8. The method of claim 1, wherein receiving a first set of elevation data points defining at least a portion of an existing surface includes:
   establishing a communicative connection with a source of the first set of elevation data points to receive the first set of elevation data points.

9. The method of claim 8, wherein the communicative connection includes a wireless network connection.

10. The method of claim 1, wherein receiving a first set of elevation data points includes:
    uploading a first set of elevation data points from a memory of a source of the first set of elevation data points.

11. A apparatus for analyzing roadway information, comprising:
    means for receiving a first set of elevation data points defining at least a portion of an existing surface;
    means for receiving a second set of elevation data points defining at least a portion of an intended surface, the intended surface is configured as an exterior concrete surface prior to pavement, the exterior concrete surface is configured for travel upon by a motorized vehicle;
    means for receiving at least one angle of incidence corresponding to the first set of elevation data points;
    means for adjusting the first set of elevation data points based on the at least one angle of incidence to ensure that the first set of elevation data points and second set of elevation data points correspond to substantially parallel planes;

means for comparing the first set of elevation data points to the second set of elevation data points to determine whether an elevation difference exists between corresponding data points of the first set of elevation data points and the second set of elevation data points, where a data point of the first set of elevation data points is a corresponding data point to a data point of the second set of elevation data points when the data point of the first set of elevation data points and the data point of the second set of elevation data points has a same x and y coordinate of a horizontal plane;

means for storing a comparison of the first set of elevation data points to the second set of elevation data points when it is determined that an elevation difference exists between corresponding data points of the first set of elevation data points and the second set of elevation data points; and means for generating an automated report displaying the comparison, the report defining a high spot or a low spot on the existing surface when an elevation difference exists between corresponding data points of the first set of elevation data points and the second set of elevation data points.

12. The apparatus of claim 11, wherein the existing surface includes at least one of a subgrade or a concrete pavement surface in a plastic state.

13. The apparatus of claim 11, further comprising:
means for deriving the intended surface at least in part from at least one of a string line elevation profile or three dimensional theoretical elevation data.

14. The apparatus of claim 11, wherein the existing surface is a subgrade.

15. The apparatus of claim 14, further comprising: means for deriving the intended surface at least in part from at least one of a string line elevation profile or three dimensional theoretical elevation data, and wherein the report indicates a surface irregularity in the subgrade to be corrected prior to introducing a paving material to the subgrade.

16. The apparatus of claim 14, further including:
means for receiving a user input regarding at least one of a length, a width, or a depth of a pavement portion to form onto the subgrade.

17. The apparatus of claim 16, further including:
means for calculating a design volume of the pavement portion; and
means for determining a predicted volume difference between the design volume and a volume between the subgrade and the intended surface.

18. The apparatus of claim 11, further including:
means for establishing a communicative connection with a source of the first set of elevation data points.

19. The apparatus of claim 18, wherein the means for communicative connection includes a wireless network connection.

20. The apparatus of claim 11, wherein the means for receiving a first set of elevation data points includes:
means for uploading a first set of elevation data points from a memory of a source of the first set of elevation data points.

21. A method for analyzing roadway information, comprising:

receiving a first set of elevation data points defining at least a portion of a concrete surface in a plastic state;

receiving a second set of elevation data points defining at least a portion of an intended surface, the intended surface being derived from at least one of a string line elevation profile or three dimensional theoretical elevation data;

receiving at least one angle of incidence corresponding to the first set of elevation data points;

adjusting the first set of elevation data points based on the at least one angle of incidence to ensure that the first set of elevation data points and second set of elevation data points correspond to substantially parallel planes;

comparing, via a computer processing device, the first set of elevation data points to the second set of elevation data points to determine whether an elevation difference exists between corresponding data points of the first set of elevation data points and the second set of elevation data points, where a data point of the first set of elevation data points is a corresponding data point to a data point of the second set of elevation data points when the data point of the first set of elevation data points and the data point of the second set of elevation data points has a same x and y coordinate of a horizontal plane;

storing a comparison of the first set of elevation data points to the second set of elevation data points when it is determined that an elevation difference exists between corresponding data points of the first set of elevation data points and the second set of elevation data points; and generating an automated report displaying the comparison, the report defining at least one of (a) a high spot or a low spot on the existing surface when an elevation difference exists between corresponding data points of the first set of elevation data points and the second set of elevation data points or (b) a yield of concrete to provide the existing surface as compared to a yield of concrete to provide the intended surface.

* * * * *